(12) United States Patent
Sasaki et al.

(10) Patent No.: US 9,661,320 B2
(45) Date of Patent: May 23, 2017

(54) ENCODING DEVICE, DECODING DEVICE, PLAYBACK DEVICE, ENCODING METHOD, AND DECODING METHOD

(75) Inventors: Taiji Sasaki, Osaka (JP); Hiroshi Yahata, Osaka (JP); Tomoki Ogawa, Osaka (JP); Takahiro Nishi, Nara (JP); Toru Kawaguchi, Osaka (JP); Yuka Ozawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 565 days.

(21) Appl. No.: 13/990,597

(22) PCT Filed: Sep. 13, 2012

(86) PCT No.: PCT/JP2012/005850
§ 371 (c)(1),
(2), (4) Date: May 30, 2013

(87) PCT Pub. No.: WO2013/038679
PCT Pub. Date: Mar. 21, 2013

(65) Prior Publication Data
US 2013/0243103 A1    Sep. 19, 2013

Related U.S. Application Data

(60) Provisional application No. 61/533,971, filed on Sep. 13, 2011.

(51) Int. Cl.
*H04N 13/00* (2006.01)
*H04N 11/04* (2006.01)
(Continued)

(52) U.S. Cl.
CPC ............. *H04N 19/00* (2013.01); *H04N 13/00* (2013.01); *H04N 13/0048* (2013.01);
(Continued)

(58) Field of Classification Search
CPC .......... H04N 13/00; H04N 11/04; H04N 7/26; G06K 9/36
See application file for complete search history.

(56) References Cited

U.S. PATENT DOCUMENTS

| | | |
|---|---|---|
| 2007/0211796 A1 | 9/2007 | Kim |
| 2007/0258652 A1 | 11/2007 | Kazui et al. |
| 2012/0294374 A1* | 11/2012 | Said ..................... H04N 19/507 375/240.25 |

FOREIGN PATENT DOCUMENTS

| | | |
|---|---|---|
| EP | 1 843 598 | 10/2007 |
| JP | 9-261653 | 10/1997 |

(Continued)

OTHER PUBLICATIONS

International Search Report issued Dec. 18, 2012 in International (PCT) Application No. PCT/JP2012/005850.
(Continued)

*Primary Examiner* — Sath V Perungavoor
*Assistant Examiner* — Patricia I Young
(74) *Attorney, Agent, or Firm* — Wenderoth, Lind & Ponack, L.L.P.

(57) ABSTRACT

An encoding device that, when encoding frame image groups which represent scenes respectively viewed from plurality of viewpoints over predetermined time period, generates base-view video stream by encoding frame image group of standard viewpoint without using, as reference image, any frame image of other viewpoints, generates first-type dependent-view video stream by encoding frame image group of first-type viewpoint by using, as reference image, frame image of same time of base-view video stream or of another first-type dependent-view video stream, first-type viewpoint being positioned such that at least one viewpoint is present between first-type viewpoint and standard viewpoint, and generates second-type dependent-view
(Continued)

video stream by encoding frame image group of second-type viewpoint by using, as reference images, frame images of same time of two viewpoints sandwiching second-type viewpoint, second-type viewpoint being neither standard viewpoint nor first-type viewpoint.

14 Claims, 52 Drawing Sheets

(51) Int. Cl.
*G06K 9/36* (2006.01)
*H04N 19/00* (2014.01)
*H04N 7/26* (2006.01)
*H04N 19/597* (2014.01)
*H04N 19/70* (2014.01)
*H04N 19/577* (2014.01)

(52) U.S. Cl.
CPC ......... *H04N 19/597* (2014.11); *H04N 19/577* (2014.11); *H04N 19/70* (2014.11)

(56) References Cited

FOREIGN PATENT DOCUMENTS

| | | |
|---|---|---|
| JP | 2008-21210 | 1/2008 |
| WO | 2006/072993 | 7/2006 |
| WO | 2007/013194 | 2/2007 |
| WO | 2010/126608 | 11/2010 |
| WO | 2010/126613 | 11/2010 |

OTHER PUBLICATIONS

Akio Ishikawa et al., "A study on an inter-view prediction method in multiview video coding for2D-array camera arrangement", FIT 2006, Aug. 21, 2006, pp. 291-292.

ISO/IEC14496-10, Dec. 1, 2003 "MPEG-4 Part 10 Advanced Video Coding".

Supplementary European Search Report issued Feb. 12, 2015 in Application No. EP 12 83 2158.5.

Hideaki Kimata et al., "System Design of Free Viewpoint Video Communication", Computer and Information Technology, 2004. CIT '04. The Fourth International Conference on, IEEE, Los Alamitos, CA, USA, Sep. 14, 2004, pp. 52-59.

\* cited by examiner

FIG. 1
(i)
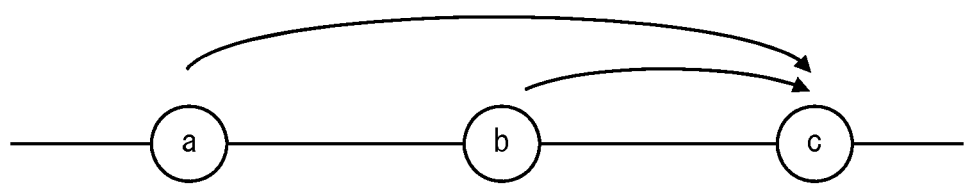
Standard viewpoint
(ii)
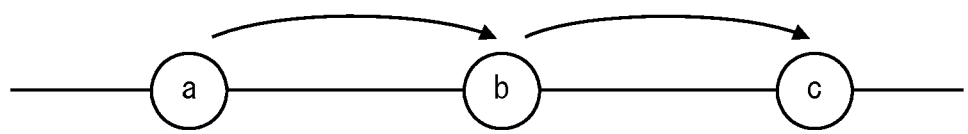
Standard viewpoint
(iii)
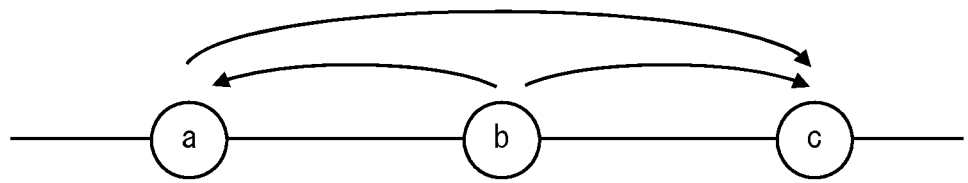
Standard viewpoint

| Viewpoint video 201 | Referenced video 202 |
|---|---|
| a | e |
| b | a, e |
| c | a, e |
| d | a, e |
| e | 0 |
| f | e, i |
| g | e, i |
| h | e, i |
| i | e |

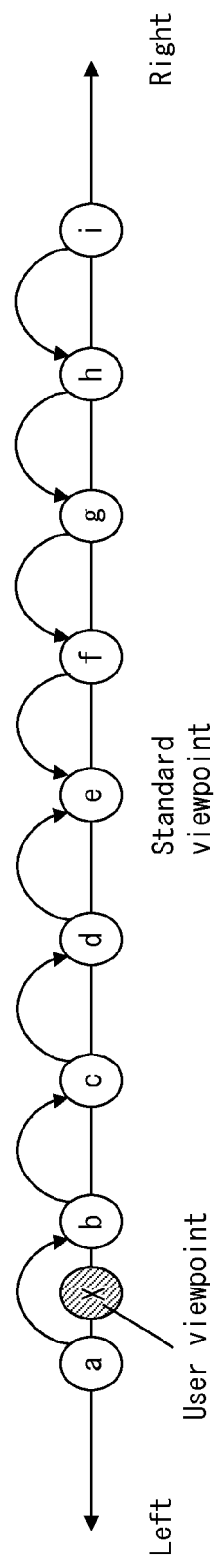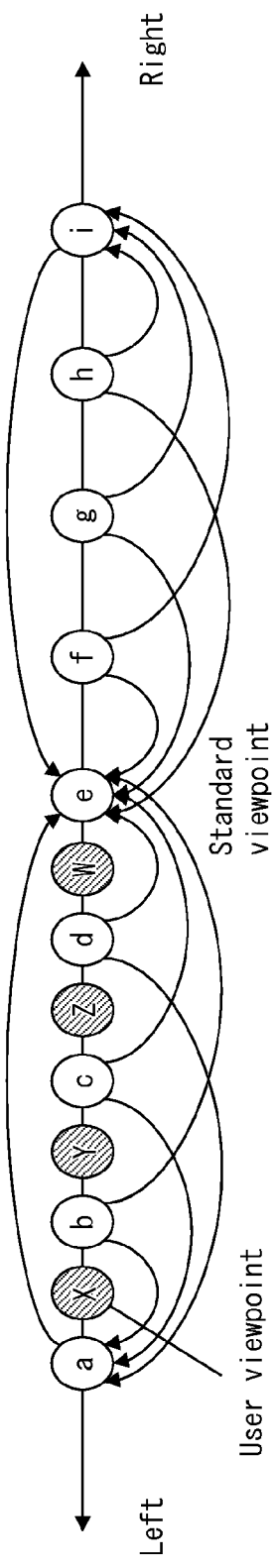
FIG. 7

FIG. 12

MVC info descriptor

| Field name | Meaning |
|---|---|
| Playback mode | Signaling of playback mode<br>1:2D playback<br>2:3D video playback of Stereo (L/R)<br>3:3D video playback of 2D+Depth<br>4:Multi-view<br>5:Reserved (for color extension, etc.) |
| Playback mode descriptor | Playback mode 1: MVC 2D descriptor<br>Playback mode 2: MVC stereo 3D descriptor<br>Playback mode 3: MVC 2D+Depth descriptor<br>Playback mode 4: MVC multi-view descriptor |

FIG. 13

MVC stereo 3D descriptor

| Field name | Meaning |
|---|---|
| base_view_left_flag | Indicating whether or not base view is left eye<br>0: Left eye  1: Right eye |
| LR_same_content_flag | Indicating whether or not contents of base and dependent views are same<br>0: Different  1: Same |
| interview_reference_flag | Indicating whether or not inter-view reference between base and dependent views is present<br>0: No  1: Present |
| interview_reference_type | Indicating reference method when interview_reference_flag is set to 1<br>0: Only I-pictures including SPS (heads of GOPs) of base view are referenced<br>1: Referenced when base view includes only I-pictures<br>2: Referenced when base view includes only I- and/or P-pictures<br>3: Referenced regardless of pictures in base view |
| sub_audelimiter_flag | Indicating whether or not sub AU ID code is present<br>0: No  1: Present |
| base_view_first_flag | Indicating whether or not it is ensured that I-picture of base precedes corresponding picture of dependent<br>0: No  1: Ensured |
| dept_view_end_flag | Indicating whether or not it is ensured that I-picture of base succeeds corresponding picture of preceding dependent<br>0: No  1: Ensured |
| num_of_sub_bistreams | Number of sub bitstreams<br>1: Base and dependent are multiplexed with same PID<br>2: Base and dependent are multiplexed with different PIDs |

FIG. 14

MVC stereo 3D descriptor (Cont.)

| Field name | Meaning |
|---|---|
| max_disparity | Maximum disparity between base and dependent views |
| assumed_TV_size | Assumed TV size (inch) |
| BB_during_popup | Indicating whether or not video is played back as 2D video when popup menu (OSD) is displayed |
| pg_for_3D | Minimum age for 3D parental lock |
| closed_caption_for_3D_flag | Indicating whether or not closed caption for 3D is present<br>0: No  1: Present<br>⇒When this flag is set to 0, to display closed caption, video needs to be played back as 2D video |
| base_2D_preferable_flag | Indicating which view is preferable to be displayed as 2D video<br>0: Base view is preferable to be displayed as 2D video<br>1: Dependent view is preferable to be displayed as 2D video |
| profile, level | Indicating performances necessary for playback of 3D video<br>Corresponding to profile_idc, level_idc in MPEG-4 MVC |

FIG. 15

MVC Stereo 3D stream descriptor

| Field name | Meaning |
|---|---|
| num_of_views | Number of views |
| for(i=0;i<num_of_views;i++) | |
| view_id | View ID<br>Corresponding to view_id in MPEG-4 MVC |
| profile, level | Indicating performances necessary for playback of 3D video<br>Corresponding to profile_idc, level_idc in MPEG-4 MVC |
| interviewed_flag | Indicating whether or not present view is referenced by another view by inter-view reference |
| interview_flag | Indicating whether or not present view references another view by inter-view reference |
| } | |

FIG. 16

MVC multi-view descriptor

| Field name | Meaning |
|---|---|
| num_of_subbitstreams | Number of sub bitstreams |
| sub_bitstreams_order[num_of_subbitstreams] | Multiplexing order of sub bitstreams |
| for( i=0; i< num_of_subbitstreams; i++ ){ | |
| sub_bitstream_id | Sub bitstream ID |
| PID | Info identifying stream. PID may be replaced with ID of tag defined by hierarchy descriptor or the like. |
| num_of_views | Number of views |
| for( n=0; n<num_of_views; n++ ){ | |
| view_id | View ID |
| view_type | Attribute info indicating reference relation between pictures: SI, SP, or SB |
| profile, level | Indicating performances necessary for playback of 3D video Corresponding to profile_idc, level_idc in MPEG-4 MVC |
| view_ids_refers_to_this_view[] | List of view_ids referencing present view by inter-view reference |
| view_ids_refered_to_by_this_view[] | List of view_ids referenced by present view by inter-view reference |
| left_position_view_id, distance_to_left | View_id of view on left side of present view, distance (mm) to view on left side |
| right_position_view_id, distance_to_right | View_id of view on right side of present view, distance (mm) to view on right side |
| up_poisiton_view_id , distance_to_up | View_id of view on upper side of present view, distance (mm) to view on upper side |
| down_position_view_id ,distance_to_down | View_id of view on lower side of present view, distance (mm) to view on lower side |
| } | |
| view_id_order[num_of_views] | Arrangement order of views in sub bitstream |
| } | |

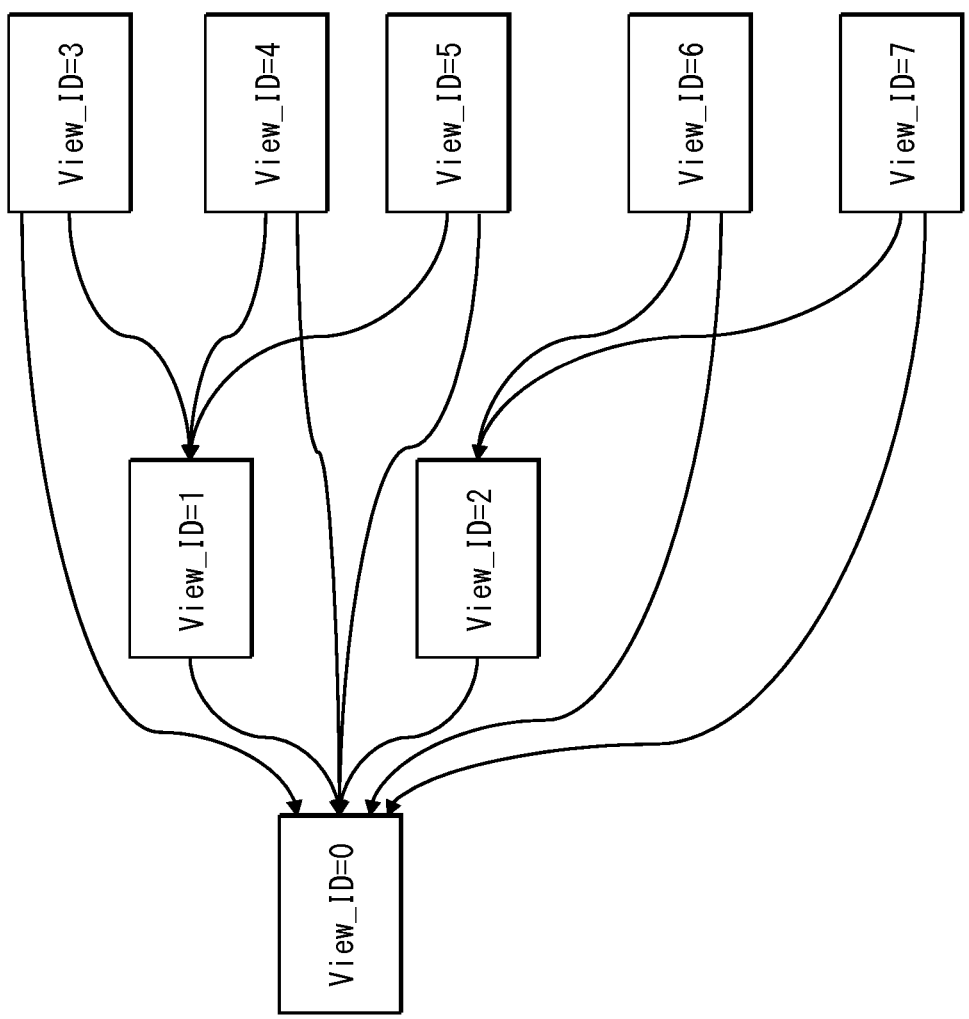

FIG. 37
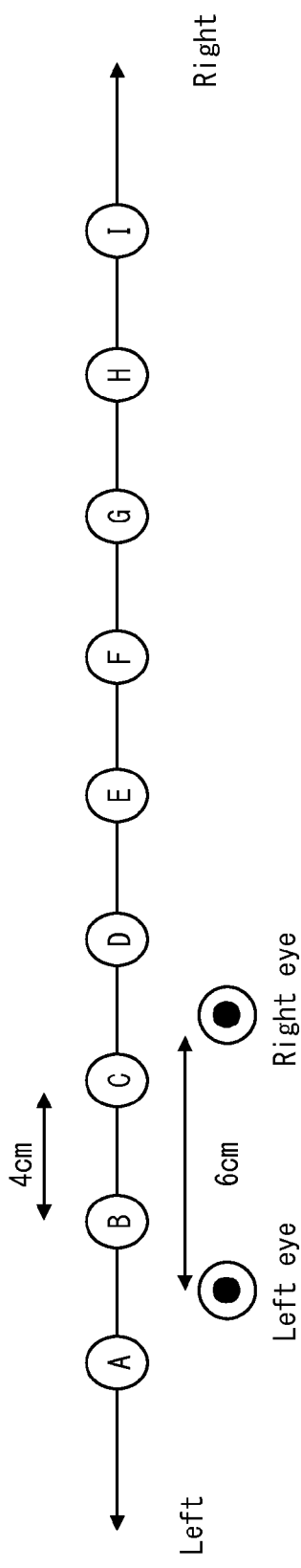
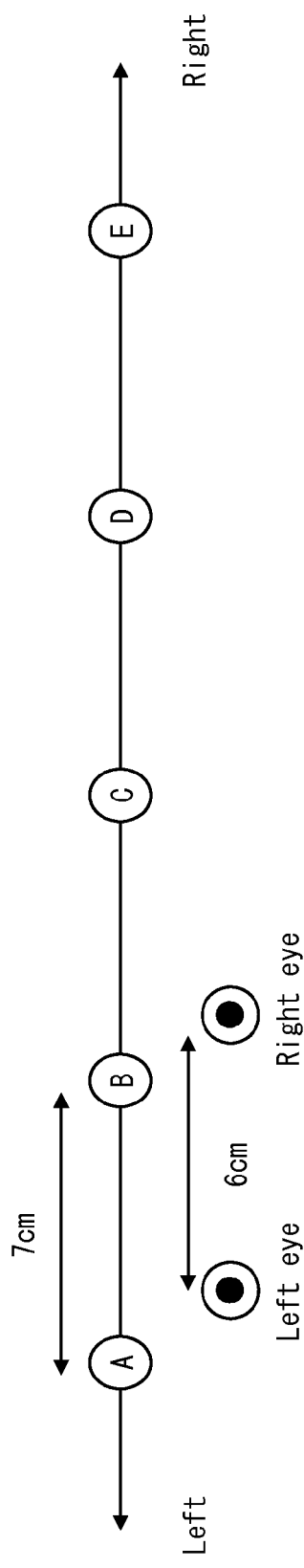

FIG. 43B When viewing left-view video  FIG. 43C When viewing right-view video

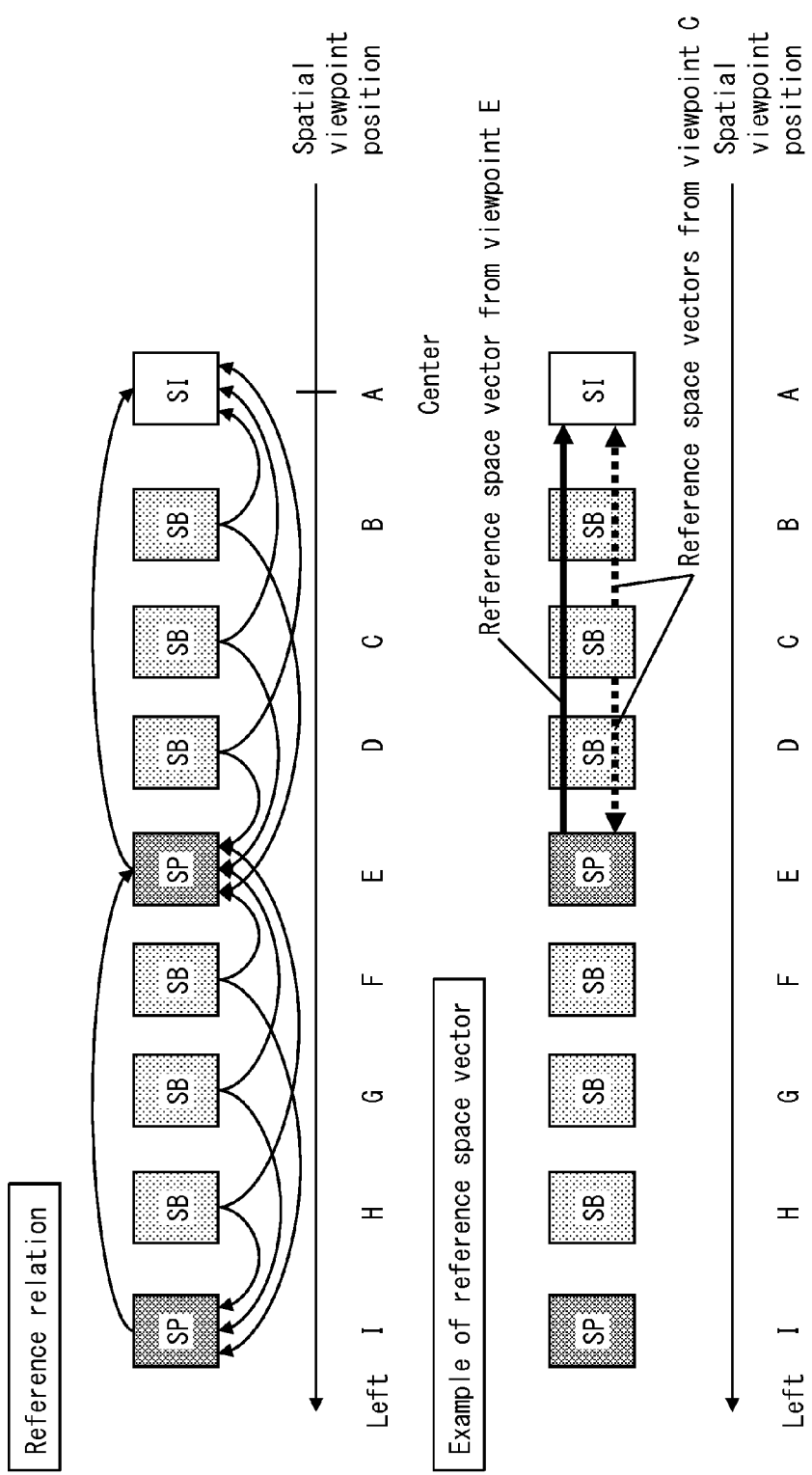

ENCODING DEVICE, DECODING DEVICE, PLAYBACK DEVICE, ENCODING METHOD, AND DECODING METHOD

This application claims benefit to the U.S. Provisional Application No. 61/533,971, filed Sep. 13, 2011.

TECHNICAL FIELD

The present invention relates to a technology for encoding video for recording or transmission thereof and decoding encoded video for playback, and in particular to a technology for encoding and decoding a multi-viewpoint video.

BACKGROUND TECHNOLOGY

The free-viewpoint video technology is a technology for playing back video composed of images shot by the user at arbitrary viewpoint positions.

In the free-viewpoint video technology, among videos shot at different viewpoints by a plurality of cameras (hereinafter a video which is shot at one viewpoint is referred to as a "viewpoint video"), a viewpoint video that is closest to a viewpoint position selected by the viewer is played back, or a video of the viewpoint position of the viewer, which is generated by interpolation by using a viewpoint video that is closest to the viewpoint position of the viewer, is played back (Patent Literature 1).

In such free-viewpoint video technology, to accurately play back videos which are shot at various viewpoint positions, as many viewpoint videos as possible are required.

CITATION LIST

Patent Literature

Patent Literature 1

Japanese Patent Application Publication No. 2008-21210

Non-Patent Literature

Non-Patent Literature 1:
"MPEG-4 Part 10 Advanced Video Coding", ISO/IEC, 14496-10, 2003

SUMMARY OF INVENTION

Technical Problem

However, in the case of distribution of a lot of viewpoint videos (hereinafter a group of many viewpoint videos is referred to as a "multi-viewpoint video"), the amount of distributed data increases, compared with distribution of a viewpoint video of a single viewpoint, or a 3D video of a fixed viewpoint.

When viewpoint videos are distributed via broadcast waves, for example, since the bandwidths that can be used for transmission of broadcast waves are limited, it is desirable that the amount of data of the whole video streams to be distributed is as small as possible.

It is therefore an object of the present invention to provide an encoding device and encoding method for generating a video stream that enables the amount of data of the whole video streams to be reduced when encoding a multi-viewpoint video, and to provide a decoding device, playback device, and decoding method for the video stream.

Solution to Problem

The above object is fulfilled by an encoding device for generating a video stream by encoding a plurality of frame image groups which represent a plurality of scenes respectively viewed from a plurality of viewpoints over a predetermined time period, the encoding device comprising: an input unit configured to receive the plurality of frame image groups; a base view encoding unit configured to set one of the plurality of frame image groups as a frame image group of a standard viewpoint, and generate a base-view video stream by encoding the frame image group of the standard viewpoint without using, as a reference image, any frame image of a viewpoint other than the standard viewpoint; a first dependent view encoding unit configured to generate a first-type dependent-view video stream by encoding a frame image group of a first-type viewpoint by using, as a reference image, a frame image of a same time of the base-view video stream or of another first-type dependent-view video stream, the first-type viewpoint being positioned such that at least one viewpoint is present between the first-type viewpoint and the standard viewpoint; a second dependent view encoding unit configured to generate a second-type dependent-view video stream by encoding a frame image group of a second-type viewpoint by using, as reference images, frame images of a same time of two viewpoints sandwiching the second-type viewpoint, the second-type viewpoint being neither the standard viewpoint nor the first-type viewpoint; and a video stream output unit configured to output the base-view video stream, the first-type dependent-view video stream, and the second-type dependent-view video stream.

The above object is also fulfilled by an encoding method for generating a video stream by encoding a plurality of frame image groups which represent a plurality of scenes respectively viewed from a plurality of viewpoints over a predetermined time period, the encoding method comprising: an input step of receiving the plurality of frame image groups; a base view encoding step of setting one of the plurality of frame image groups as a frame image group of a standard viewpoint, and generating a base-view video stream by encoding the frame image group of the standard viewpoint without using, as a reference image, any frame image of a viewpoint other than the standard viewpoint; a first dependent view encoding step of generating a first-type dependent-view video stream by encoding a frame image group of a first-type viewpoint by using, as a reference image, a frame image of a same time of the base-view video stream or of another first-type dependent-view video stream, the first-type viewpoint being positioned such that at least one viewpoint is present between the first-type viewpoint and the standard viewpoint; a second dependent view encoding step of generating a second-type dependent-view video stream by encoding a frame image group of a second-type viewpoint by using, as reference images, frame images of a same time of two viewpoints sandwiching the second-type viewpoint, the second-type viewpoint being neither the standard viewpoint nor the first-type viewpoint; and a video stream output step of outputting the base-view video stream, the first-type dependent-view video stream, and the second-type dependent-view video stream.

The above object is further by a decoding device comprising: an obtaining unit configured to obtain the stream data generated by the encoding device defined above; a base view decoding unit configured to obtain a frame image group of the standard viewpoint by decoding the base-view video stream included in the stream data; a first dependent view decoding unit configured to obtain each frame image constituting the first-type frame image group by first obtaining frame images constituting a frame image group of a viewpoint to be referenced, and decoding encoded frame images constituting the first-type dependent-view video stream by referencing the obtained frame images of a same time; a second dependent view decoding unit configured to obtain each frame image constituting the second-type frame image group by first obtaining each pair of frame images of a same time constituting respective two frame image groups of two viewpoints to be referenced, and decoding each encoded frame image constituting the second-type dependent-view video stream by referencing the obtained each pair of frame images; and an output unit configured to output the frame image groups obtained by the base view decoding unit, the first dependent view decoding unit, and the second dependent view decoding unit.

The above object is still further fulfilled by a playback device for receiving and playing back the transport stream transmitted from the encoding device defined above, the playback device comprising: a stream receiving unit configured to receive the transport stream; a base view decoding unit configured to obtain a frame image group of the standard viewpoint by decoding the base-view video stream included in the transport stream; an attribute information extracting unit configured to extract attribute information from the transport stream; a first dependent view decoding unit configured to obtain a frame image group by decoding the first-type dependent-view video stream included in the transport stream based on the attribute information; a second dependent view decoding unit configured to obtain a frame image group by decoding the second-type dependent-view video stream included in the transport stream based on the attribute information; and a playback unit configured to play back the frame image groups obtained by the base view decoding unit, the first dependent view decoding unit, and the second dependent view decoding unit.

The above object is still further fulfilled by a decoding method for decoding the stream data generated by the encoding device defined above, the decoding method comprising: an obtaining step of obtaining the stream data; a base view decoding step of obtaining a frame image group of the standard viewpoint by decoding the base-view video stream included in the stream data; a first dependent view decoding step of obtaining each frame image constituting the first-type frame image group by first obtaining each frame image of a same time constituting a frame image group of a view point to be referenced, and decoding each encoded frame image constituting the first-type dependent-view video stream by referencing the obtained each frame image; a second dependent view decoding step of obtaining each frame image constituting the second-type frame image group by first obtaining each pair of frame images of a same time constituting respective two frame image groups of two viewpoints to be referenced, and decoding each encoded frame image constituting the second-type dependent-view video stream by referencing the obtained each pair of frame images; and an output step of outputting the frame image groups obtained by the base view decoding step, the first dependent view decoding step, and the second dependent view decoding step.

Advantageous Effects of Invention

With the above-described structure, the encoding device and the encoding method of the present invention can generate a video stream that enables the amount of data of the whole video streams to be reduced when encoding a multi-viewpoint video.

Also, the decoding device and the decoding method of the present invention can decode such a video stream.

Furthermore, the playback device of the present invention can play back multi-view video by decoding a transport stream containing such a video stream.

BRIEF DESCRIPTION OF DRAWINGS

FIG. 1 is a schematic diagram illustrating the reference relation between viewpoints when a plurality of viewpoint videos are encoded: (i) illustrating a case where only one viewpoint video is referenced; (ii) illustrating a case where a closest viewpoint video is referenced; and (iii) illustrating a case where two viewpoint videos sandwiching a viewpoint video is referenced by the viewpoint video.

FIG. 4 illustrates an example of the structure of the reference information 200 indicating the reference relation between viewpoint videos when a viewpoint video is encoded as a dependent view.

FIG. 7 is a conceptual diagram illustrating the reference relation between viewpoints when a multi-view video is encoded: (i) illustrating a case where each viewpoint video references an adjacent viewpoint video; and (ii) illustrating the reference relation in the present embodiment.

FIG. 12 illustrates the structure of the MVC information descriptor.

FIG. 13 illustrates the MVC Stereo 3D descriptor, continued to FIG. 14.

FIG. 14 illustrates the MVC Stereo 3D descriptor, continued from FIG. 13.

FIG. 15 illustates the MVC Stereo 3D stream descriptor.

FIG. 16 illustates the MVC multi-view descriptor.

FIG. 17 is a conceptual diagram illustrating the reference relation between views in the inter-view reference.

FIG. 37 is a conceptual diagram illustrating one example of the distance between viewpoint positions when a 3D video is generated based on viewpoint videos.

FIGS. 43A-43D illustrate a 3D digital TV supporting playback of a 3D video, and a 2D digital TV supporting playback of a 2D video.

FIG. 52 illustrates reference relation between a plurality of types of pictures in a modification.

DESCRIPTION OF EMBODIMENTS

1. Embodiment 1

<1-1 Summary>

Figure 2:
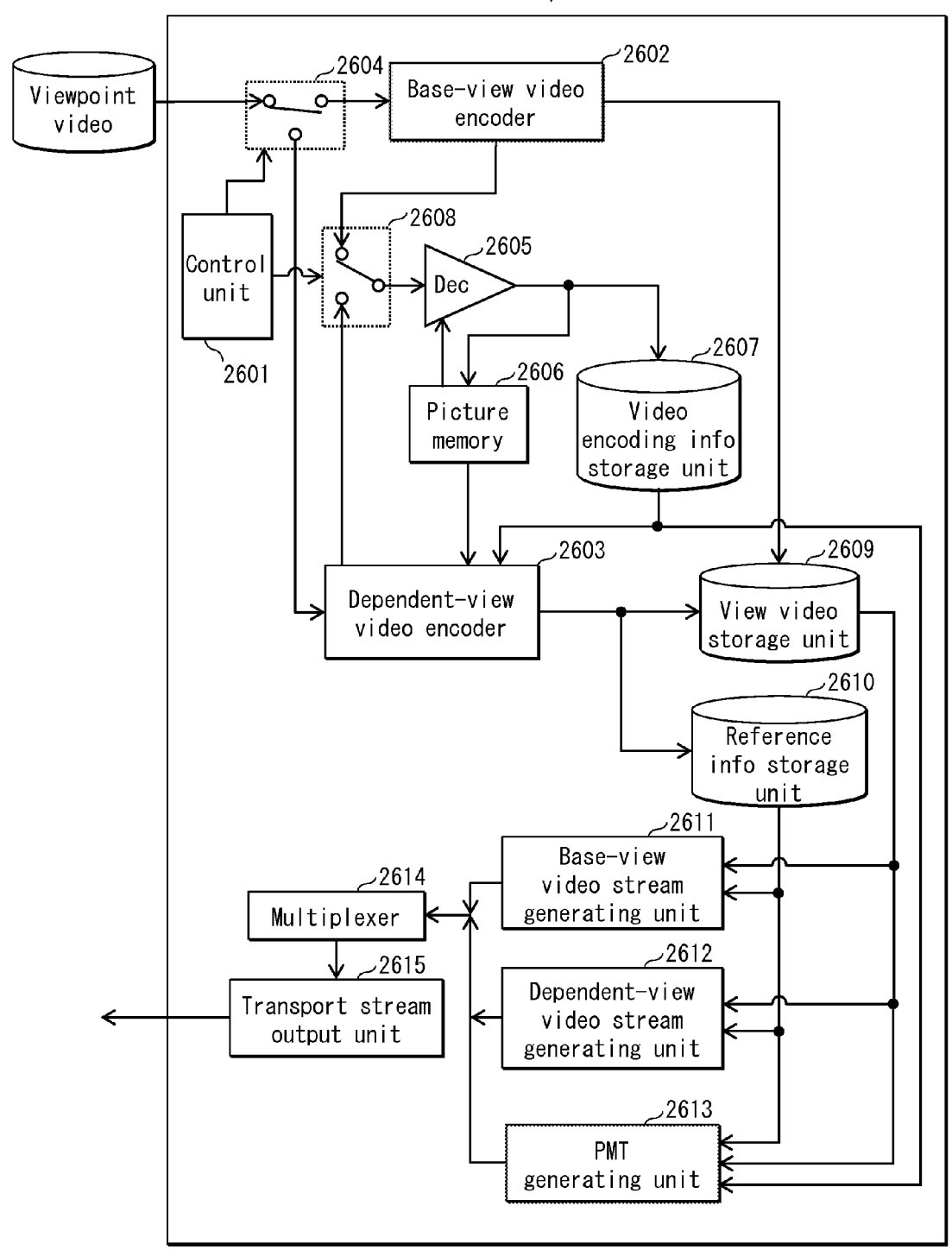
FIG. 2 is a block diagram illustrating the structure of an encoding device 2600.

FIG. 1 is a schematic diagram illustrating the reference relation between viewpoints when a plurality of viewpoint videos are encoded.

FIG. 1 illustrates one example of reference relation between viewpoint videos a-c.

The viewpoint videos are each composed of a group of pictures which represent a scene changing with time at a corresponding viewpoint, namely, a plurality of images shot by a camera continuously in time. Each picture constitutes an image of one screen played back by a playback device, namely, constitutes an image of one frame or field.

Each arrow in FIG. 1 indicates a reference relation where a viewpoint video at the tail of an arrow references a viewpoint video at the point of the arrow. For example, the portion (i) of FIG. 1 indicates that a picture of a certain time in the viewpoint video "a" references a picture of the same time in the viewpoint video "c" when the picture of the viewpoint video "a" is encoded.

In the case of viewpoint videos having the reference relation illustrated in the portion (i) of FIG. 1, a base view is generated by compress-encoding the viewpoint video "c" in conformance with MPEG-4 MVC (Multi View Coding). Subsequently, dependent views are generated by the inter-picture predictive coding by compress-encoding pictures of a certain time in the viewpoint videos "a" and "b" that reference a picture of the same time in the base view. The pictures of viewpoint videos of the same time that are close to each other have similarity (correlate highly with each other). The higher the correlation between pictures is, the smaller the difference between pictures is. In the compress-encoding by the MPEG-4 MVC, in general, the smaller the difference between pictures is, the smaller the amount of encoded data is. As a result, the dependent views, which are generated by compress-encoding the differences, are each smaller in amount than the base view, making it possible to reduce the data amount. Note that hereinafter the base view and the dependent view may be merely referred to as "view", for the sake of simplicity. Also, referencing a picture in a view of a different viewpoint is called "inter-view reference".

In the case of the reference relation illustrated in the portion (ii) of FIG. 1, a dependent view is generated by the inter-picture predictive coding by compress-encoding a picture of a certain time in the viewpoint video "a" that is referencing a picture of the same time in the viewpoint video "b", not the viewpoint video "c".

Here, the picture in the viewpoint video "b", which is referenced by the picture in the viewpoint video "a", is referencing a picture in a viewpoint video that is closer than in the case of the portion (i) of FIG. 1. In this case, it is considered that the pictures correlate highly with each other, and the compress-encoding can be performed with reduced amount of data. However, in this case, to decode the picture in the viewpoint video "a", the picture in the viewpoint video "b" needs to be decoded as well, which is not necessary in the case of the portion (i) of FIG. 1. In this way, in the method of encoding viewpoint videos that are respectively referencing the adjacent viewpoint videos, there is a problem that the larger the number of viewpoint videos is, the larger the number of viewpoint videos that need to be decoded is when viewpoint videos located away from the standard viewpoint are played back.

In the case of the reference relation illustrated in the portion (iii) of FIG. 1, with regard to the viewpoint video "a", as in the case of the portion (i), a dependent view is generated by encoding a picture in the viewpoint video "a" that is referencing a picture in the viewpoint video "c", but with regard to the viewpoint video "b", a dependent view is generated by the inter-picture predictive coding by encoding a picture in the viewpoint video "b" that is referencing pictures in the viewpoint videos "a" and "c". In this case, the viewpoint video "b" is referencing pictures in both the viewpoint videos "a" and "c". As a result, compared with the cases of the portions (i) and (ii) of FIG. 1 in which a picture in a viewpoint that is references a picture in one other viewpoint is encoded, the encoding is performed with a further reduced amount of data. In this case, compared with the cases of the portions (i) and (ii) of FIG. 1, it is considered that the larger the number of viewpoint videos that are each referencing pictures in two viewpoint videos is, the more the amount of reduced data is, as a whole of the plurality of viewpoint videos to be encoded.

In view of this, the encoding device in the present embodiment, when encoding a viewpoint video that is referencing pictures in two viewpoint videos, performs the encoding by using viewpoint videos that are in the reference relation illustrated in the portion (iii) of FIG. 1, namely, two viewpoint videos that are sandwiching and being referenced by the viewpoint video to be encoded. With this structure, it is possible to perform encoding by reducing the amount data as a whole of the plurality of viewpoint videos to be encoded. The compress-encoding method for use in the present embodiment may be the same as a method conforming to MPEG-2 or MPEG-4 MVC for encoding a B-picture in the time direction, namely, an encoding method in which motion vectors of an object in the picture is obtained by referencing two pictures that precedes and succeeds the picture, and the differences therebetween are compress-encoded in units of macro blocks.

Note that in the present embodiment, the picture in the encoding is classified into three types: "SI (Spacial Intra) picture"; SP (Spatial Predictive) picture"; and SB (Spatial Bi-directionally Predictive) picture".

The SI picture is a base-view picture that does not reference a picture in another viewpoint video, and can be decoded independently.

The SP picture is a dependent-view picture that is obtained by encoding a picture in an encoding target viewpoint video that is referencing one of views that are obtained by encoding viewpoint videos other than the encoding target viewpoint video.

The SB picture is a dependent-view picture that is obtained by encoding a picture in an encoding target viewpoint video that is referencing two different views among a plurality of views that are obtained by encoding viewpoint videos other than the encoding target viewpoint video. The SB picture is not referenced when another viewpoint video is encoded. An SB picture that is referenced when another viewpoint video is encoded is particularly called "SBr picture".

The encoding device of the present embodiment generates a view video stream by encoding pictures of the same picture type through the whole of the viewpoint videos. A view video stream composed of SI pictures is called "SI picture video"; a view video stream composed of SP pictures is called "SP picture video"; a view video stream composed of SB pictures is called "SB picture video"; and a view video stream composed of SBr pictures is called "SBr picture video".

The following describes a playback device including the encoding device and the decoding device in one embodiment of the present invention.

<1-2. Encoding Device>

<1-2-1. Structure>

FIG. 2 is a block diagram illustrating the structure of an encoding device 2600 in the present embodiment.

The encoding device 2600 receives input of a plurality of viewpoint videos, encodes the viewpoint videos, and outputs a transport stream storing a base-view video stream and a dependent-view video stream respectively of data formats that are described below.

The encoding device 2600 includes a control unit 2601, a base-view video encoder 2602, a dependent-view video encoder 2603, an encoder selector 2604, a video decoder 2605, a picture memory 2606, a view video encoding information storage unit 2607, a decode video selector 2608, a view video storage unit 2609, a reference information storage unit 2610, a base-view video stream generating unit 2611, a dependent-view video stream generating unit 2612, a PMT (Program Map Table) generating unit 2613, a multiplexer 2614, and a transport stream output unit 2615.

The encoding device 2600 further includes a processor and a memory that are not illustrated, and the functions of the control unit 2601, base-view video stream generating unit 2611, dependent-view video stream generating unit 2612, and PMT generating unit 2613 are realized when the processor executes a program stored in the memory.

(Control Unit 2601)

The control unit 2601 has a function to, for each viewpoint video input therein, instruct the encoder selector 2604 to output the input viewpoint video to either the base-view video encoder 2602 or the dependent-view video encoder 2603.

The control unit 2601 selects a video encoder to which the viewpoint video is to be output, based on encode type information of each of the plurality of viewpoint videos (for example, an encode type table 100 described below) that is specified in advance by a provider of the viewpoint videos. The provider of the viewpoint videos specifies encode types of the viewpoint videos so that the viewpoint videos can be encoded and decoded as efficiently as possible. For example, when the viewpoint videos are arranged on a straight line: a viewpoint video at the center viewpoint position, which is assumed to be a main viewpoint video viewed by the user, is defined as a viewpoint video of the standard viewpoint; the viewpoint video of the standard viewpoint is specified to be encoded as an SI picture video; two viewpoint videos that are respectively located farthest from the standard viewpoint are specified to be encoded as SP picture videos; and the remaining viewpoint videos are specified to be encoded as SB picture videos.

Figure 3:
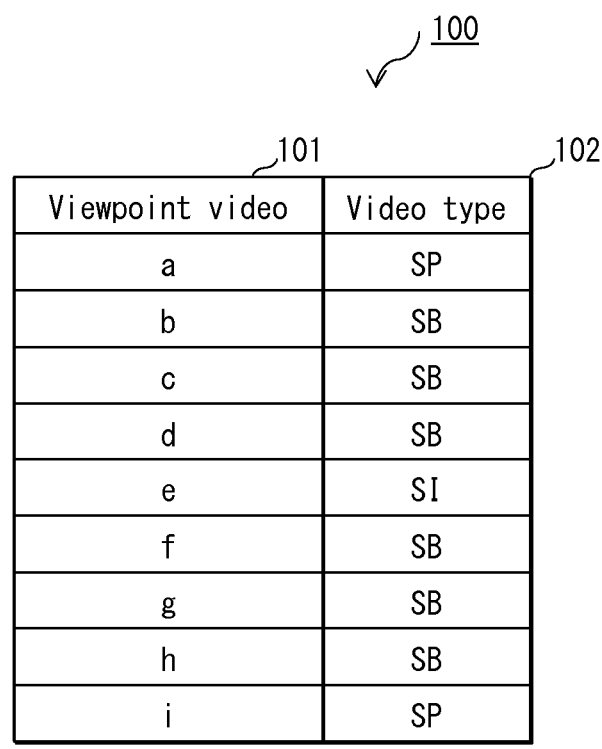
FIG. 3 illustrates an example of the structure of the encode type table 100.

FIG. 3 illustrates an example of the encode type table 100 indicating the encode types of picture videos.

The encode type table 100 is a table associating viewpoint video 101 with video type 102. The viewpoint video 101 is identification information identifying each of viewpoint videos to be encoded. The video type 102 is information indicating video types of the viewpoint videos identified in the viewpoint video 101 that are to be encoded. The video type is represented by the SI picture, SP picture, or SB (SBr) picture, which is encoded as the picture in the viewpoint video. For example, according to the example illustrated in FIG. 3, the viewpoint video "e" is encoded as an SI picture video of the standard viewpoint, the viewpoint videos "a" and "i" are encoded as SP picture videos, and the viewpoint videos "b", "c", "d", "f", "g", and "h" are encoded as SB picture videos.

The control unit 2601 references the encode type table 100 and performs a control so that viewpoint videos are encoded in the order of the SI picture video, SP picture videos, and SB picture videos as indicated in the video type 102. When the encode type of an input viewpoint video is the SI picture video, the control unit 2601 instructs the encoder selector 2604 to output the input viewpoint video to the base-view video encoder 2602, and when the encode type of an input viewpoint video is the SP or SB (including SBr) picture video, the control unit 2601 instructs the encoder selector 2604 to output the input viewpoint video to the dependent-view video encoder 2603.

Also, the control unit 2601 has a function to, when the dependent-view video encoder 2603 encodes a picture of a certain time in a viewpoint video that is referencing a picture of the same time in another viewpoint video, identify the referenced picture of the same time based on the view video encoding information described below, and instruct the decode video selector 2608 to output a view of the referenced viewpoint video to the video decoder 2605 so that the video decoder 2605 can decode the picture of the same time in the referenced viewpoint video. For example, when encoding the viewpoint video "a" illustrated in the portion (iii) of FIG. 1, the control unit 2601 instructs the decode video selector 2608 to output an SI picture video, which is obtained by the base-view video encoder 2602 by encoding the viewpoint video "c", to the video decoder 2605. Also, when encoding the viewpoint video "b" illustrated in the portion (iii) of FIG. 1, the control unit 2601 instructs the decode video selector 2608 to select, for each picture to be encoded, either an SI picture video obtained by the base-view video encoder 2602 by encoding the viewpoint video "c", or an SI picture video obtained by the dependent-view video encoder 2603 by encoding the viewpoint video "a", and output the selected picture video to the video decoder 2605.

(Base-View Video Encoder 2602)

The base-view video encoder 2602 has a function to generate an encoded base view by encoding, in conformance with the MPEG-4 MVC format and without referencing another viewpoint video, a viewpoint video that is input via the encode selector 2604, and output the encoded base view to the video decoder 2605 and the view video storage unit 2609 that are described below.

(Dependent-View Video Encoder 2603)

The dependent-view video encoder 2603 has a function to generate an encoded dependent view by encoding a viewpoint video that is input via the encode selector 2604, by using the inter-view reference in conformance with the MPEG-4 MVC format, and output the encoded dependent view to the video decoder 2605 and the view video storage unit 2609. The dependent-view video encoder 2603 encodes a picture in the target viewpoint video by referencing, as the inter-view reference based on the view video encoding information that is described below, pictures of the same time (hereinafter referred to as "decoded pictures") that are obtained by the video decoder 2605 by decoding referenced viewpoint videos. The dependent-view video encoder 2603 further has a function to generate reference information 200 described below, based on information identifying the viewpoint videos referenced in this encoding, and output the reference information 200 to the reference information storage unit 2610.

(Encoder Selector 2604)

The encoder selector 2604 has a function to select an encoder to which the input viewpoint video is to be output, in accordance with an instruction from the control unit 2601. The encoder selector 2604 outputs the input viewpoint video to the base-view video encoder 2602 when it is instructed by the control unit 2601 to output an SI picture video, and outputs the input viewpoint video to the dependent-view video encoder 2603 when it is instructed by the control unit 2601 to output an SP picture video or an SB picture video.

(Video Decoder 2605)

The video decoder 2605 has a function to decode pictures that are referenced when the dependent-view video encoder compress-encodes a picture.

The video decoder 2605 has the same function as existing decoders conforming to the MPEG-4 MVC, and output information such as DTS and PTS that are used for synchronization between views of viewpoint videos in the order of display or decoding during the decoding, together with the pictures obtained by the decoding. Based on these information, the dependent-view video encoder 2603 can perform encoding by using the same PTSs as the pictures in the referenced viewpoint videos.

The video decoder 2605, when a target picture in a viewpoint video is encoded, decodes pictures of the same time as the target picture in an SI picture video and an SP picture video that have already been encoded, and outputs the pictures obtained by the decoding to the picture memory 2606. For example, when a viewpoint video is encoded as an SP picture video, the video decoder 2605 decodes, in accordance with an instruction from the control unit 2601, an SI picture video that has already been encoded and is input via the decode video selector 2608, outputs the picture obtained by the decoding to the picture memory 2606 as a picture for the inter-view reference, and outputs the view video encoding information regarding the decoded view. The view video encoding information is described below.

(Picture Memory 2606)

The picture memory 2606 is a readable/writable memory (for example, DRAM: Dynamic Random Access Memory), and has a function to store pictures decoded by the video decoder 2605. The pictures stored in the picture memory 2606 are referenced when the dependent-view video encoder 2603 encodes a viewpoint video.

(View Video Encoding Information Storage Unit 2607)

The view video encoding information storage unit 2607 is, for example, a nonvolatile memory, and stores the view video encoding information which includes: attribute information of views obtained by decoding performed by the video decoder 2605 (resolution, aspect ratio, frame rate, specification of progressive or interlace, etc.); picture attribute information of the corresponding picture (picture type, etc.); GOP (Group of Pictures) structure which is described below; and picture memory management information.

The picture memory management information is information associating: memory addresses of decoded pictures in the picture memory 2606; and display order information (PTS: Presentation Time Stamp) of the pictures; and encoding order information (encoding order of files and DTS: Decoding Time Stamp).

These information are obtained when the video decoder 2605 decodes picture videos, and basically the same as information obtained when conventional decoding conforming to the MPEG-4 MVC is performed.

(Decode Video Selector 2608)

The decode video selector 2608 is a selector having a function to, in accordance with an instruction from the control unit 2601, select a view to be decoded for the inter-view reference, and output the selected view to the video decoder 2605.

(View Video Storage Unit 2609)

The view video storage unit 2609 is, for example, a hard disk and stores data of views encoded by the base-view video encoder 2602 and the dependent-view video encoder 2603.

(Reference Information Storage Unit 2610)

The reference information storage unit 2610 is, for example, a hard disk and stores the reference information 200 that indicates reference relation between a viewpoint video and another viewpoint video referenced by the viewpoint video when the viewpoint video is encoded to generate a dependent view.

FIG. 4 illustrates one example of the reference information 200. The reference information 200 is a table associating viewpoint video 201 with referenced video 202. The viewpoint video 201 is identification information identifying each of viewpoint videos to be encoded. The referenced video 202 is identification information identifying viewpoint videos referenced when the viewpoint videos identified in the viewpoint video 201 are encoded. The sign "0" indicated in the referenced video 202 means that no viewpoint video is referenced when a corresponding viewpoint video identified in the viewpoint video 201 is encoded. That is to say, the viewpoint video identified in the viewpoint video 201 that corresponds to the sign "0" in the referenced video 202 is encoded as an SI picture video which is the base view. In the case of the example illustrated in FIG. 4, when the viewpoint videos are encoded, the viewpoint video "e" does not reference another viewpoint video, the viewpoint videos "a" and "i" reference the viewpoint video "e", the viewpoint videos "b", "c" and "d" reference the viewpoint videos "a" and "e", and the viewpoint videos "f", "g" and "h" reference the viewpoint videos "e" and "i".

(Base-View Video Stream Generating Unit 2611)

The base-view video stream generating unit 2611 has a function to generate, from the data of the base view that has been encoded by the base-view video encoder 2602 and stored in the view video storage unit 2609, a base-view video stream, which is to be multiplexed into a transport stream together with a dependent-view video stream by the multiplexer 2614.

(Dependent-View Video Stream Generating Unit 2612)

The dependent-view video stream generating unit 2612 has a function to generate, from the data of the dependent view that has been encoded by the dependent-view video encoder 2603 and stored in the view video storage unit 2609, a dependent-view video stream, which is to be multiplexed into a transport stream together with a base-view video stream by the multiplexer 2614.

(PMT Generating Unit 2613)

The PMT generating unit 2613 has a function to generate a PMT that includes: a PMT header; various descriptors pertaining to the transport stream; and stream information pertaining to streams of video, audio, subtitle, etc. contained in the transport stream.

The multiplexer 2614 has a function to multiplex the base-view and dependent-view video streams output from the base-view video stream generating unit 2611 and the dependent-view video stream generating unit 2612, convert the multiplexed streams into PES (Packetized Elementary Stream) packets, and output the packets in units of TS packets. Note that, when there are an audio stream and/or a subtitle stream that are to be played back in synchronization with the viewpoint videos, the multiplexer 2614 multiplexes the audio stream and/or the subtitle stream together with the video streams, and outputs the multiplexed streams in units of TS packets.

(Transport Stream Output Unit 2615)

The transport stream output unit 2615 is an interface having a function to divide the PES packets received from the multiplexer into TS packets and output the TS packets in sequence as a transport stream.

<1-2-3. Data Format>

The following describes the data format with reference to the attached drawings.

In the present embodiment, the data obtained by encoding the pictures constituting the viewpoint videos has the MPEG-4 MVC data format.

Figure 5:
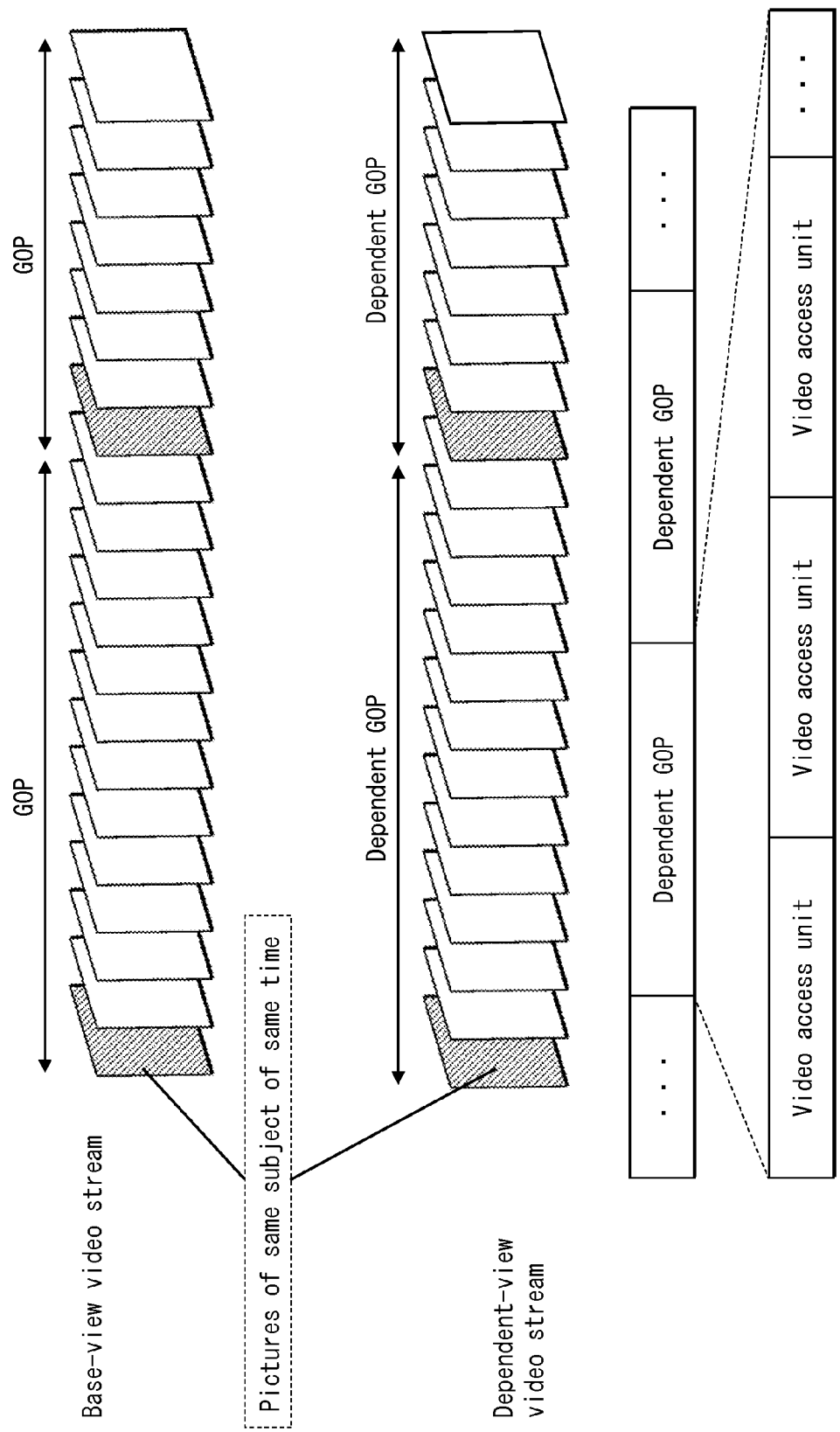
FIG. 5 illustrates the GOP structure of the base-view video stream and the dependent-view video stream.

FIG. 5 illustrates the GOP structure of the base-view video stream and the dependent-view video stream in the present embodiment. The GOP structure is the same as the GOP structure of the video streams conforming to the MPEG-4 MVC.

Each GOP is composed of one or more video access units (hereinafter the video access unit is referred to as "AU"). The AU is a unit of storing compress-encoded picture data, and one AU stores picture data of one frame. Each of the base-view video stream and the dependent-view video stream is composed of one or more GOPs, and each GOP is composed of one or more AUs. Note that the AUs in the present embodiment have the same structure as the AUs of the conventional video streams, and detailed description thereof is provided below.

The base-view video stream is composed of the same number of encoded GOPs as the dependent-view video stream (hereinafter the GOP contained in the dependent-view video stream is referred to as "dependent GOP") so that a playback device can perform special playbacks such as the direct playback. As a result, the starting picture of each dependent GOP is assigned with the same PTS as the starting I-picture of each GOP constituting the base-view video stream.

Also, management information storing entry map information, which indicates locations of starting pictures of GOPs in files, is generated based on the MPEG-4 MVC standard. Here, the entry map information stored in the management information indicates not only the locations of starting pictures of GOPs of the base-view video stream, but also the locations of the pictures of the dependent views of the same times as the starting pictures of GOPs of the base-view video stream.

The following describes the reference relation between the base view and the dependent view obtained by encoding the viewpoint videos of the multi-viewpoint in conformance with the MPEG-4 MVC format, and the structure of the multi-view access unit.

Figure 6:
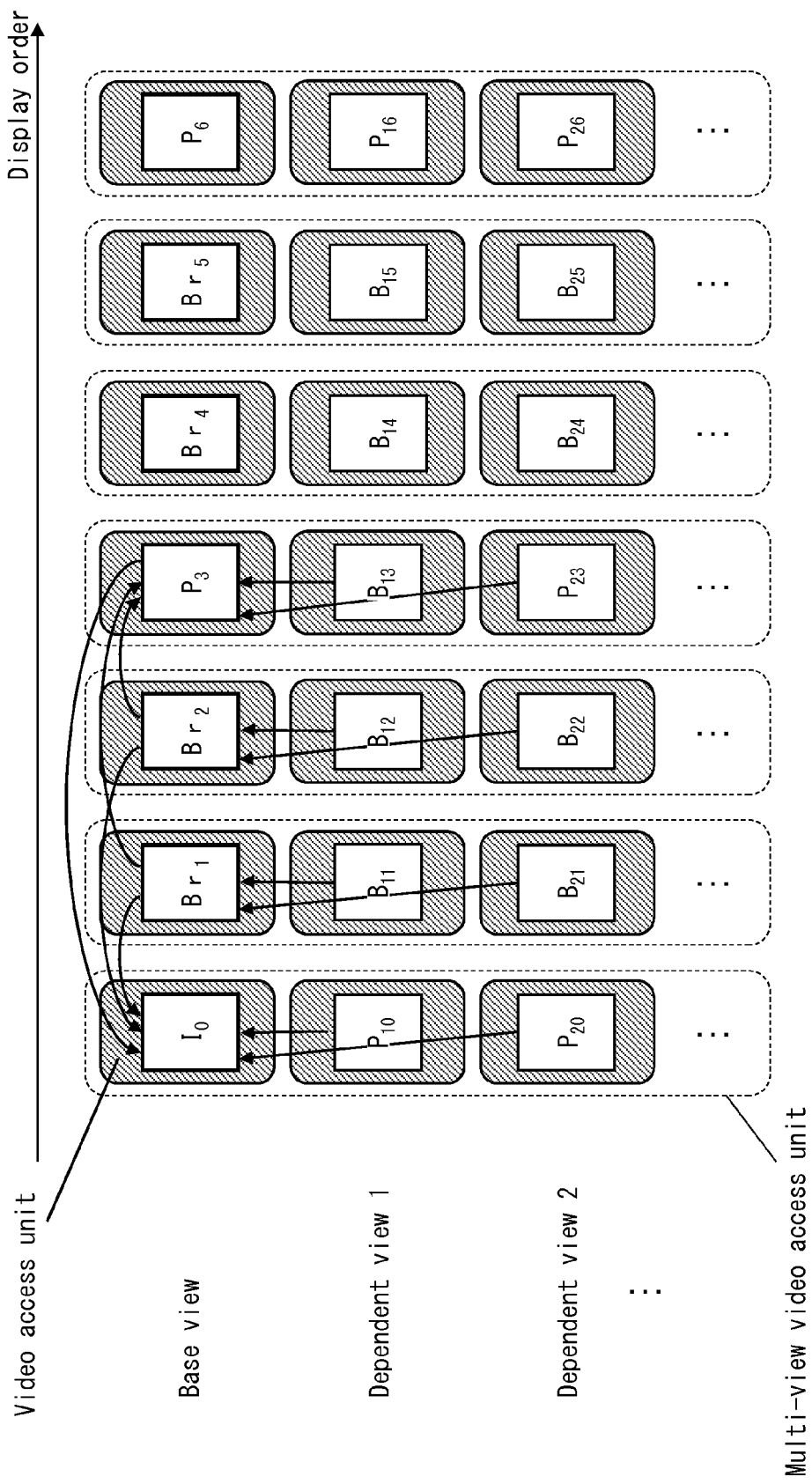
FIG. 6 is a conceptual diagram illustrating the reference relation between pictures constituting the base view and the dependent view conforming to the MPEG-4 MVC coding format.

FIG. 6 is a conceptual diagram illustrating the reference relation between pictures constituting the base view and the dependent view. The reference relation between pictures is classified into: temporal reference relation in the same view; and spatial reference relation between views.

Each arrow in FIG. 6 indicates a reference relation where a picture at the tail of an arrow references a picture at the point of the arrow. For example, FIG. 6 indicates that picture 10 of the base view is referenced by pictures Br1, Br2 and P3 of the base view in the time direction, and referenced by picture P10 of dependent view 1 and picture P20 of dependent view 2 in the spatial direction.

Each multi-view video access unit (hereinafter referred to as "multi-view AU") is composed of an AU of a base view and AUs of a plurality of dependent views of the same time as the base view. The playback device performs decoding in units of multi-view AUs. A video stream composed of a group of multi-view AUs is called a multi-view video stream. The multi-view AU is described in detail below.

Here, the following describes the relation between the base view and the dependent view that are obtained by encoding a multi-view video, with reference to a specific example.

FIG. 7 is a conceptual diagram illustrating the reference relation between viewpoints when a multi-view video is encoded. FIG. 7 illustrates an example of a multi-view video including nine viewpoint videos "a" to "i".

The portion (i) of FIG. 7 illustrates the case of generating a base view by encoding the viewpoint video "e" which is the viewpoint video of the standard viewpoint. Subsequently, two encoded dependent views are generated by encoding viewpoint videos "d" and "f" that are adjacent to the viewpoint video "e" and referencing the base view of the viewpoint video "e".

Furthermore, an encoded dependent view is generated by encoding the viewpoint video "c" that is adjacent to the viewpoint video "d" and referencing the encoded dependent view of the viewpoint video "d". In this way, viewpoint videos referencing the encoded views of the adjacent viewpoint videos are encoded in sequence.

Meanwhile, for a playback device to generate a video at the position of the user viewpoint X in the portion (i) of FIG. 7, the viewpoint videos "a" and "b" are required. To obtain the viewpoint videos "a" and "b", first the base view of the viewpoint video "e" needs to be decoded, and then the dependent views of the viewpoint videos "d", "c", "b", and "a" need to be decoded in the stated order. That is to say, the views of the five viewpoint videos "a" to "e" need to be decoded. In that case, the farther the target viewpoint video is, the larger the load for the playback device to perform the decoding is. Hereinafter, the number of views, which need to be decoded to obtain pictures that are referenced when a view of the decoding target is decoded, is called "the number of views to decode". In the case of this example, the number of views to decode is five.

On the other hand, the portion (ii) of FIG. 7 illustrates one example of the reference relation between views used by the encoding device 2600.

In the portion (ii) of FIG. 7, as in the portion (i) of FIG. 7, a base view is generated by encoding the viewpoint video "e" as the viewpoint video of the standard viewpoint.

Subsequently, two encoded dependent views are generated by encoding viewpoint videos "a" and "i" that are at opposite ends of the sequence of the viewpoint videos and referencing the encoded base view of the viewpoint video "e". Subsequently, encoded dependent views are generated by encoding viewpoint videos "b", "c" and "d" that are located between the viewpoint videos "e" and "a" and referencing the encoded dependent views of the viewpoint videos "e" and "a". Furthermore, encoded dependent views are generated by encoding viewpoint videos "f", "g" and "h" that are referencing the encoded views of the viewpoint videos "e" and "i".

In the above case of encoding illustrated in the portion (ii) of FIG. 7, for a playback device to generate a video at the position of the user viewpoint X, the viewpoint videos "a" and "b" are required as is the case of encoding illustrated in the portion (i) of FIG. 7. However, different from the previous example case, the viewpoint video "a" can be obtained by decoding the view of the viewpoint video "e", and the viewpoint video "b" can be obtained by decoding the views of the viewpoint videos "a" and "e". In this case, the number of views to decode is three, which is smaller than the case of the portion (i) of FIG. 7. That is to say, this makes it possible to reduce the number of views to decode compared with the case of the portion (i) of FIG. 7. Furthermore, even if the number of viewpoint videos between the viewpoint videos "a" and "e" increases, the number of views to decode when a viewpoint video between the viewpoint videos "a" and "e" is decoded is always three, and the number of views to decode does not increase.

The following describes the reference relation between the views when the viewpoint videos having the reference relations indicated by the portions (i) and (ii) of FIG. 7 are encoded in conformance with the MPEG-4 MVC format.

Figure 8:
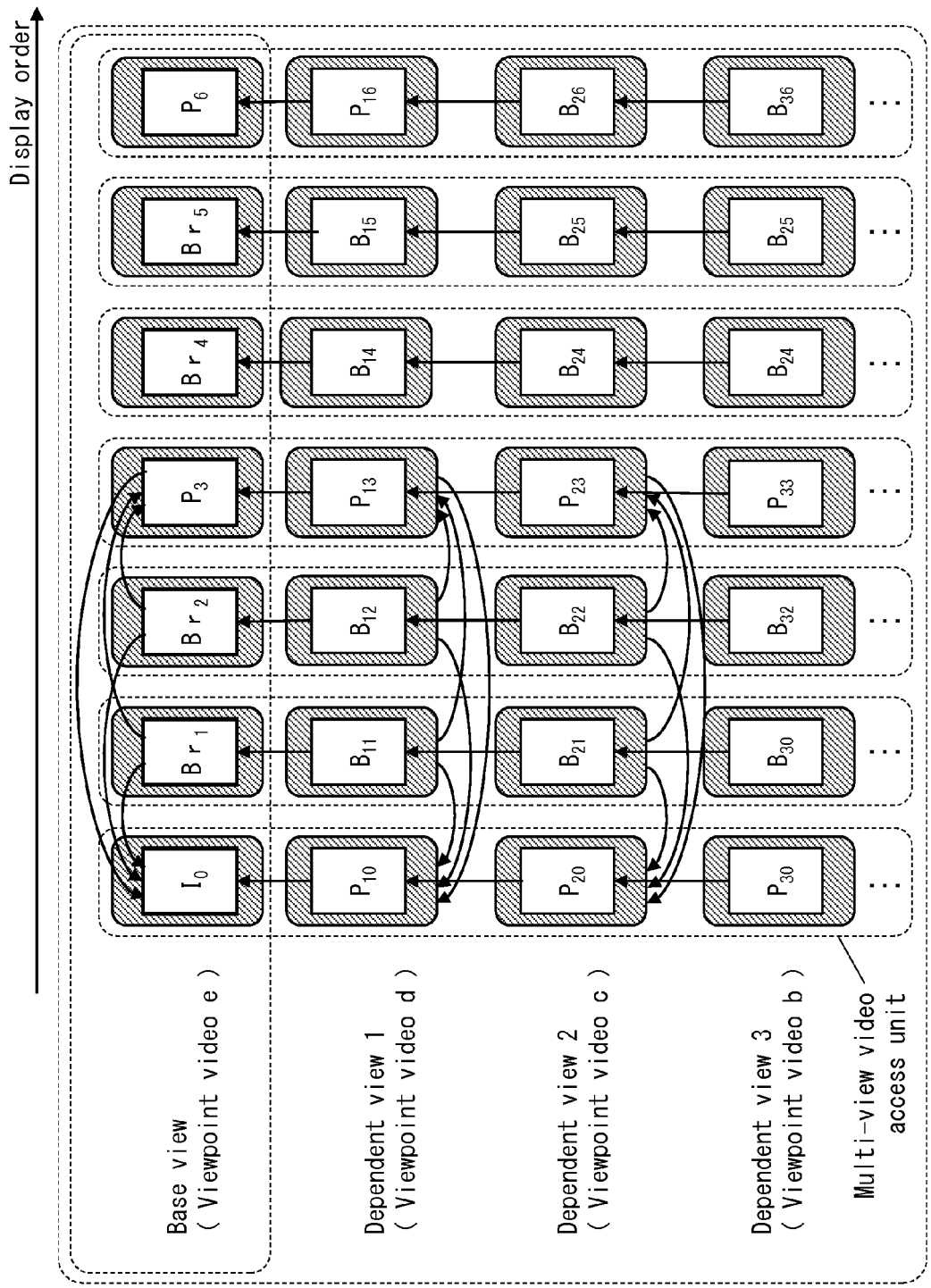
FIG. 8 is a conceptual diagram illustrating the reference relation between video streams when the viewpoint videos having the reference relation indicated by the portion (i) of FIG. 7 are encoded.

FIG. 8 is a conceptual diagram illustrating the reference relation between views when the viewpoint videos having the reference relation indicated by the portion (i) of FIG. 7 are encoded.

In FIG. 8, the base view corresponds to the viewpoint video "e", and the dependent views 1, 2 and 3 correspond to viewpoint videos "d", "c" and "b", respectively. When the viewpoint videos are encoded, the dependent view 1 references the base view, the dependent view 2 references the dependent view 1, and the dependent view 3 references the dependent view 2. Accordingly, for example, to decode the picture P20 in the dependent view 2, first the picture I0 in the base view needs to be decoded, and then the picture P10 in the dependent view 1 needs to be decoded. Also, to decode the dependent view 3, similarly, the picture I0 in the base view, the picture P10 in the dependent view 1, and the picture P20 in the dependent view 2 need to be decoded in the stated order.

Figure 9:
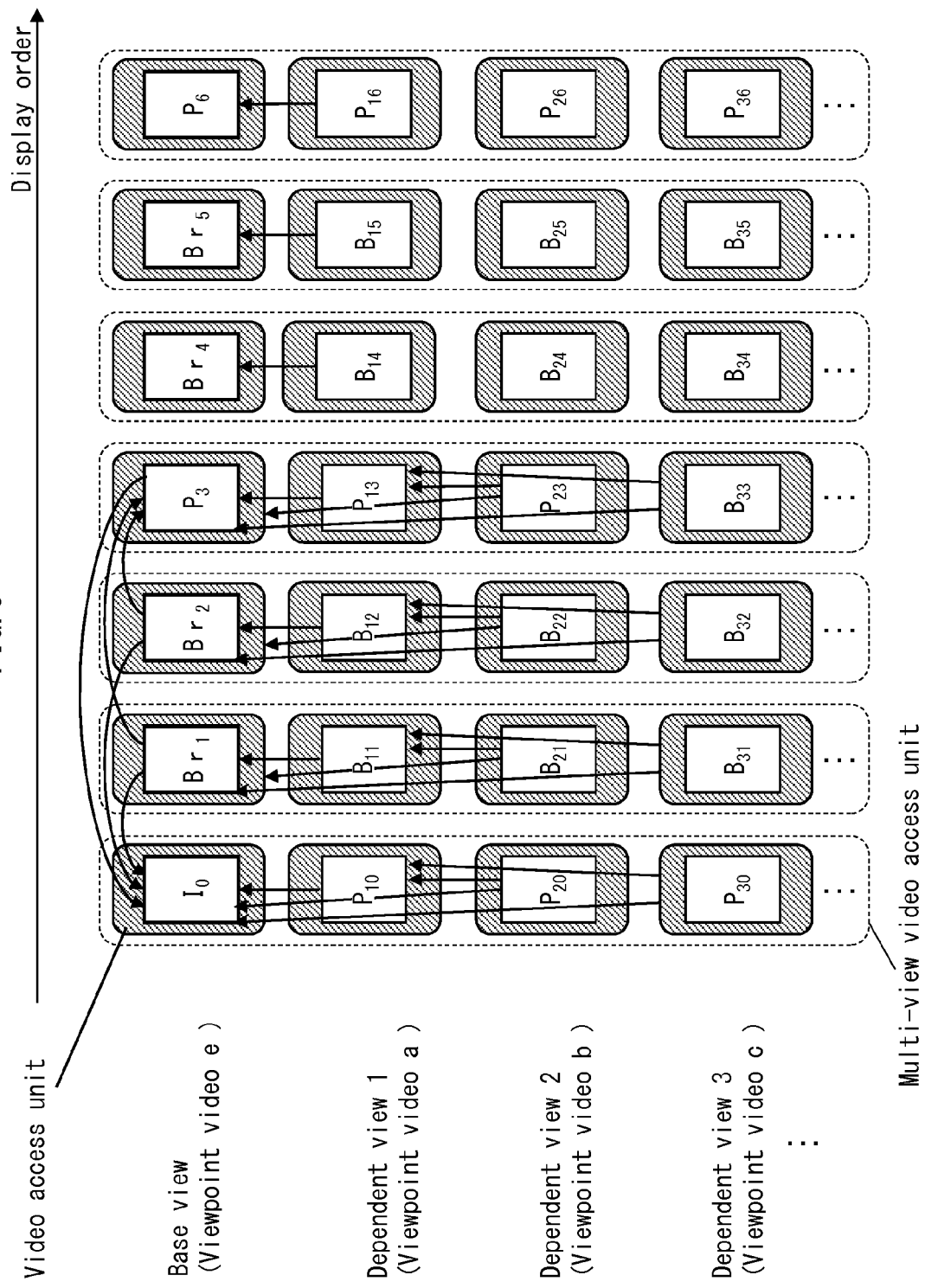
FIG. 9 is a conceptual diagram illustrating the reference relation between video streams when the viewpoint videos having the reference relation indicated by the portion (ii) of FIG. 7 are encoded.

FIG. 9 is a conceptual diagram illustrating the reference relation between views when the viewpoint videos having the reference relation indicated by the portion (ii) of FIG. 7 are encoded.

In FIG. 9, the base view corresponds to the viewpoint video "e", and the dependent views 1, 2 and 3 correspond to viewpoint videos "a", "b" and "c", respectively.

When the viewpoint videos are encoded, the dependent view 1 references the base view, and the dependent views 2 and 3 reference the base view and the dependent view 1. Accordingly, when pictures of the dependent view 3 are decoded, pictures of the dependent view 2 do not need to be decoded, and only pictures of the base view and the dependent view 1 are decoded.

(Multi-View AU)

The following describes the multi-view AU.

Figure 10:
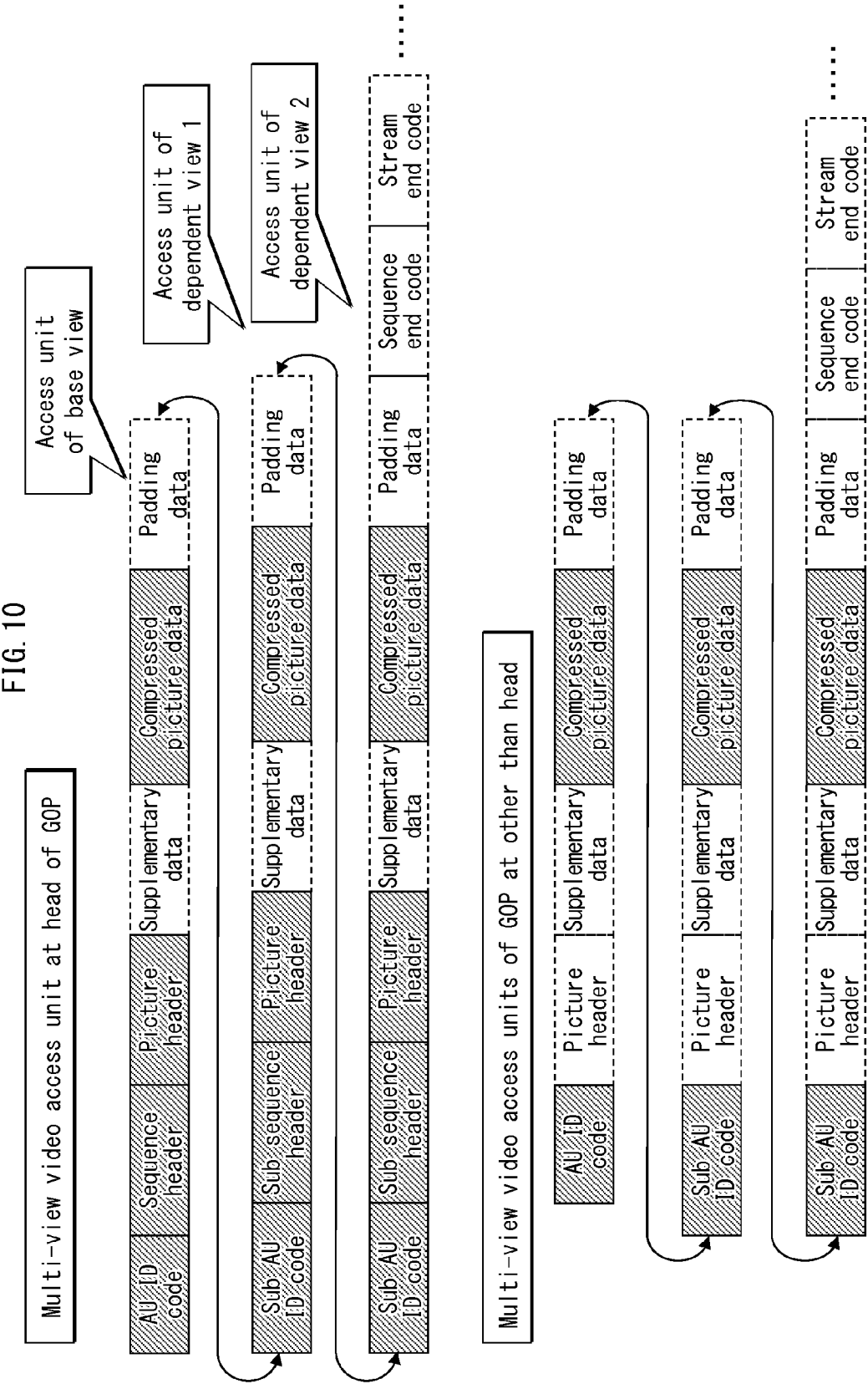
FIG. 10 is a conceptual diagram illustrating the internal structure of the access unit of the video stream.

FIG. 10 is a conceptual diagram illustrating the internal structure of the multi-view AU.

The multi-view AU is formed by concatenating AUs of the same time in the base view and a plurality of dependent views.

The AU at the head of each GOP stores data of I-picture as the compress-encoded picture data, and also stores, without fail, the AU ID code, sequence header, picture header, and compressed picture data. The supplementary data, padding data, sequence end code, and stream end code are stored as necessary.

On the other hand, the AUs other than the AU at the head of GOP store, without fail, the AU ID code and compressed picture data, and store the supplementary data, padding data, sequence end code, and stream end code as necessary.

(MVC Information Descriptor and MVC Stream Descriptor)

The following describes the information that is stored in the transport stream so that a playback device, upon receiving a transport stream representing a multi-view video, can play back the multi-view video.

Transport streams representing various types of videos, such as the multi-view video, 2D video or 3D video, can be distributed via broadcast waves. Thus, upon receiving a transport stream, the playback device needs to identify the type of video represented by the received transport stream. As a result, signaling information, which is used to decode such videos, is included in the PMT (Program Map Table) packet of the transport stream.

Figure 11:
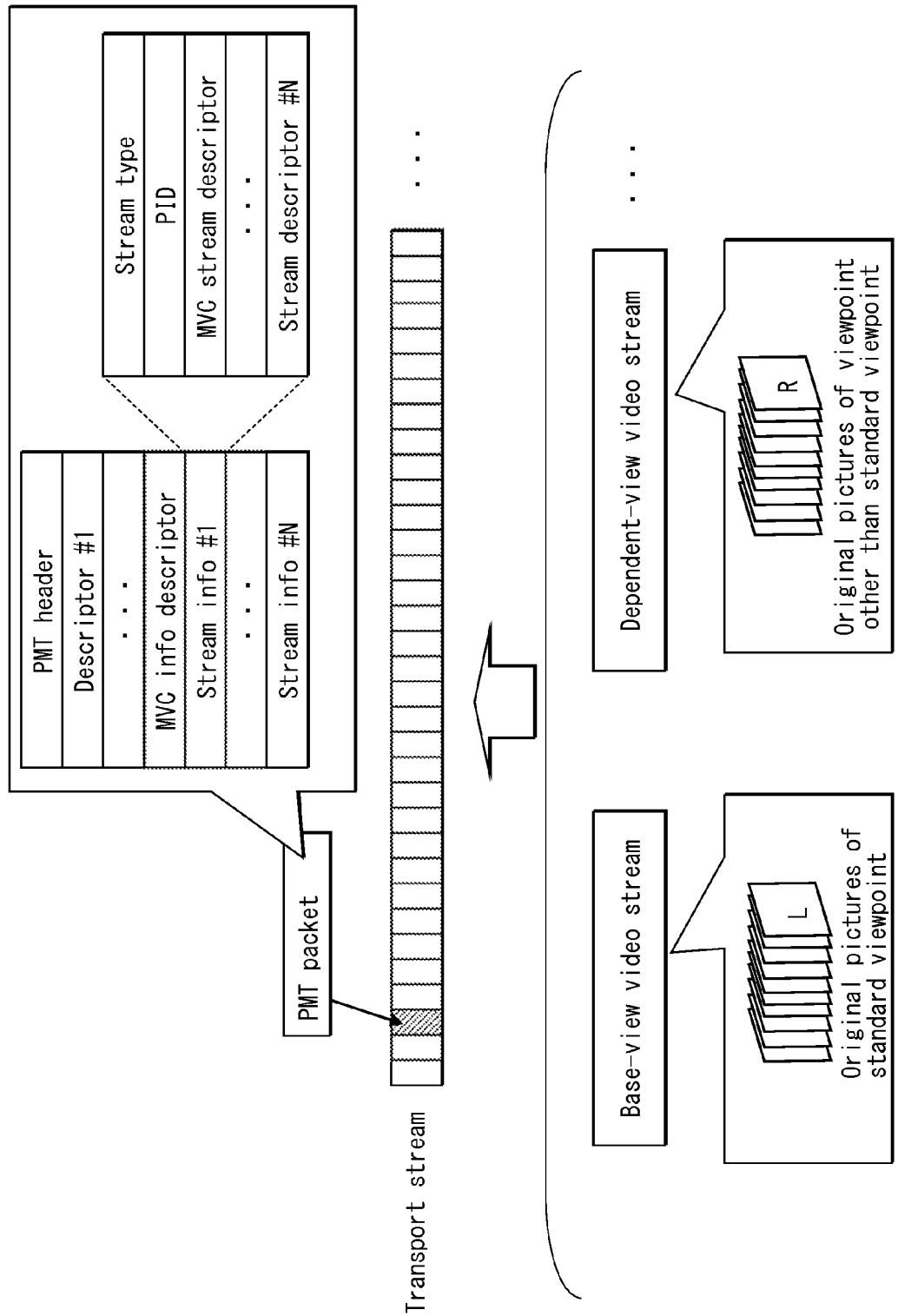
FIG. 11 illustrates the relation between the structure of the transport stream and the PMT.

FIG. 11 illustrates the relation between the structure of the transport stream and the PMT (Program Map Table) packet. As illustrated in FIG. 11, the PMT packet stores MVC information descriptor and MVC stream descriptor. In the MVC information descriptor, the relation between video streams and information such as the start and end of a video playback are described. The MVC stream descriptor is set for each video stream.

The following describes the MVC information descriptor and the MVC stream descriptor stored in the PMT.

FIG. 12 illustrates the structure of the MVC information descriptor.

The MVC information descriptor is composed of playback mode and playback mode descriptor.

The playback mode is information indicating a video playback mode in which the input video stream is to be played back. In the example illustrated in FIG. 12: when the playback mode is set to "1", it indicates the 2D playback; when the playback mode is set to "2", it indicates playback of 3D video using two viewpoint videos; when the playback mode is set to "3", it indicates playback of 3D video using one 2D video and the depth map; when the playback mode is set to "4", it indicates playback using a plurality of viewpoints; and when the playback mode is set to "5", it indicates that the information is reserved for an extension.

In the present embodiment, the value "5" of the playback mode is unused, reserved for an extension, and any playback mode is not assigned. However, in the future, the following playback mode may be assigned.

For example, a playback mode in which the color depth is changed during playback may be assigned to the value "5" of the playback mode that is reserved for an extension. According to this playback mode, a base-view video stream is generated by compress-encoding 2D video with the 8-bit color, a dependent-view video stream is generated by compress-encoding a difference video between a video with the 12-bit color and the base-view video stream, and a transport stream composed of the base-view and dependent-view video streams is distributed. Upon receiving such a transport stream, a playback device can play back the video with a different color depth by overlaying a picture obtained by decoding the base-view video stream with a difference picture obtained by decoding the dependent-view video stream.

The playback mode descriptor is information indicating a type of descriptor used for each playback mode. In the example of FIG. 12: when the playback mode is set to "1: it indicates that the MVC 2D descriptor is used; when the playback mode is set to "2": it indicates that the MVC stereo 3D descriptor is used; when the playback mode is set to "3": it indicates that the MVC 2D+Depth descriptor is used; and when the playback mode is set to "4", it indicates that the MVC multi-view descriptor is used. In the present embodiment, the playback mode in the MVC information descriptor pertaining to the video stream to be generated is set to "4", and the MVC multi-view descriptor is used The following describes in detail the MVC multi-view descriptor that is used in the present embodiment. The MVC multi-view descriptor have many parts in common with the MVC Stereo 3D descriptor that uses two viewpoint videos. Accordingly, first the MVC Stereo 3D descriptor is described, and then the extended part.

(MVC Stereo 3D Descriptor)

FIGS. 13 and 14 illustrate the fields provided in the MVC Stereo 3D descriptor.

The following explains each of the fields.

(Base_View_Left_Flag)

The base_view_left_flag is a flag indicating whether the base view is a left-eye video or a right-eye video. When the base_view_left_flag is set to "0", it indicates that the base view is a left-eye video; and when the base_view_left_flag is set to "1", it indicates that the base view is a right-eye video. The playback device, when displaying a 3D video on a TV, refers to this flag to determine whether to output the base view as a left-eye viewpoint video or a right-eye viewpoint video. Setting this flag to either value eliminates the need to fix the base view to a left-eye video or a right-eye video, and thus increases the degree of freedom in selecting a viewpoint video to be encoded as the base view when encoding a content.

(LR_Same_Content_Flag)

The LR_same_content_flag is a flag indicating whether or not the base view and the dependent view are the same in content. More specifically, when the base view and the dependent view are the same in content, namely, when a 2D video is to be played back, this flag is set to "1". For example, when this flag is set to "1", the playback device only needs to decode the base view and output the same video as the left-eye and right-eye videos. This decreases the processing load when decoding is performed.

(Interview_Reference_Flag)

The interview_reference_flag is a flag indicating whether or not the inter-view reference is present between the base view and the dependent view. When the interview_reference_flag is set to "0", it indicates that the inter-view reference is not present between the base and dependent views. In that case, the playback device, when decoding the base view and the dependent view, can decode the base-view stream and the dependent-view stream in parallel, independently. Also, when the interview_reference_flag is set to "0", decoding can be performed without using the picture memory for inter-view reference.

(Interview_Reference_Type)

The interview_reference_type is information indicating a reference method for the inter-view reference when the interview_reference_flag is set to "1", namely, when the inter-view reference is performed.

When the interview_reference_type is set to "0", it indicates that only pictures at the heads of GOPs of the base view are referenced by the inter-view reference. When the interview_reference_type is set to "1", it indicates that the inter-view reference is performed when the base view includes only I-pictures. When the interview_reference_type is set to "2", it indicates that the inter-view reference is performed when the base view includes only I-pictures and P-pictures. When the interview_reference_type is set to "3", it indicates that the inter-view reference is performed when the base view includes pictures other than the I-pictures and P-pictures, namely even when the base view includes B-pictures as well.

With this structure, the playback device can recognize the reference method for the inter-view reference before starting the decoding process, and thus can determine how to perform the decoding process, in accordance with the reference method. For example, when the interview_reference_type is set to "0", namely, when the inter-view reference is performed between only pictures at the heads of GOPs, the pictures at the heads of GOPs are decoded such that pictures of the base view are decoded first, and then the dependent view is decoded. Furthermore, in this case, with regard to the pictures other than the pictures at the heads of GOPs, pictures of the dependent view can be decoded without referencing the pictures of the base view. As a result, the playback device can decode both pictures in parallel, and thus can reduce the time required for the decoding.

(Sub_Audelimiter_Flag)

The sub_audelimiter_flag is a flag indicating whether or not a sub AU ID code is present. By referencing this flag, the playback device can perform a control depending on whether or not a sub AU ID code is present. For example, when the sub_audelimiter_flag is set to "1", the playback device can identify the position of dependent-view data quickly by checking the sub AU ID code. This makes it possible to reduce the load of the stream analyzing process.

(Base_View_First_Flag)

The base_view_first_flag is a flag indicating whether or not it is ensured that a "starting TS packet of I-picture of the base view" precedes a "starting TS packet of a corresponding picture of the dependent view". Note that in the present embodiment, a position closer to the head of a transport stream than another position is represented as "precedes" the other position, and a position closer to the end of a transport stream than another position is represented as "succeeds" the other position.

When the base_view_first_flag is set to "1", it indicates that a starting TS packet of I-picture of the base view always precedes a starting TS packet of a corresponding picture of the dependent view. Accordingly, the playback device can perform a random-access playback by first playing back a packet of I-picture of the base view and then further read, decode and play back the corresponding data of the dependent view. When the base_view_first_flag is set to "0", a starting TS packet of I-picture of the base view does not necessarily precede a starting TS packet of a corresponding picture of the dependent view. Thus, the playback device, when performing a random-access playback, may not be able to read the TS packet of the dependent view and may not be able to perform a random-access playback in the 3D playback mode. In that case, the playback device may address the situation by playing back only the base view as a 2D video.

(Dept_View_End_Flag)

The dept_view_end_flag is a flag indicating whether or not it is ensured that a "starting TS packet of I-picture of the base view" succeeds a "last TS packet of a picture preceding, in the playback order, a corresponding picture of the dependent view". When the dept_view_end_flag is set to "1", it indicates that a "starting TS packet of I-picture of the base view" always succeeds a "last TS packet of a picture preceding, in the playback order, a corresponding picture of the dependent view". Accordingly, the playback device can read and play back from the start of the I-picture of the base view to the start of the next I-picture so as to play back the corresponding dependent view at the same time. It should be noted here that only the I-picture at the head of a GOP may be used as the standard the I-picture in the base_view_first_flag and the dept_view_end_flag.

(Num_of_Sub_Bitstreams)

The num_of_sub_bitstreams is information indicating the number of sub bitstreams. Note that the sub bitstream is a video stream to which a PID is assigned in a transport stream.

When the num_of_sub_bitstreams is set to "1", it indicates that only one sub bitstream is present, and the base view and the dependent view are combined and stored with the same PID. When the num_of_sub_bitstreams is set to "2", it indicates that two sub bitstreams are present, and the base view and the dependent view are stored with different PIDs.

When there is only one sub bitstream, an elementary stream is structured in units of multi-view AUs which are each a combination of an AU of the base view and AUs of dependent views, as illustrated in FIG. 10, and they are multiplexed with the same PID. The playback device can determine, before analyzing the video stream itself, whether the base view and the dependent view are stored in the streams with the same PID or with different PIDs, by referencing the num_of_sub_bitstreams. This makes it possible to reduce the load of the process of demultiplexing a video stream. Note that values of PIDs may be stored in the loop of the num_of_sub_bitstreams in the MVC multi-view descriptor, in a multi-viewpoint video extended from a video, which case is described below. This makes it possible for the playback device to obtain a PID of a sub bitstream without analyzing the video stream itself.

(Max_Disparity)

The max disparity is information indicating the size of the maximum disparity (by pixels) between the base view and the dependent view. This makes it possible for the playback device to use this information to adjust the size of the disparity by shifting the pictures of the base view and the dependent view. For example, when the disparity is too large relative to the TV size, the 3D display is adjusted by shifting the pictures to decrease the disparity.

(Assumed_TV_Size)

The assumed_TV_size is information indicating a TV size that is defined as the standard for viewing the 3D video. For example, when the disparity is too large, the 3D video may not be appropriate for viewing. Accordingly, when the actual size of the TV for viewing is larger than the TV size indicated by the assumed_TV_size, the playback device having referenced the assumed_TV_size can adjust the disparity to be smaller by shifting the pictures.

(BB_During_PopUp)

The BB_during_PopUp is information indicating a video playback method in the case where the playback device displays the OSD (On Screen Display) popup menu in the 3D viewing mode. When the BB_during_PopUp is set to "0", the playback device performs a control to continue playing back the 3D video, and when the BB_during_PopUp is set to "1", the playback device performs a control to play back only the base view as a 2D video. This makes it possible for the content producer to set, based on the property of the content, an appropriate control for display for menu selection in the 3D video viewing mode.

(pg_for_3D)

The pg_for_3D is information indicating the minimum age for the 3D parental lock. When the value of the parental lock set in the playback device is smaller than the value set in the pg_for_3D, the playback device plays back the video as a 2D video, not as a 3D video. With this structure, the playback device can perform a control to prevent a child, who is in the process of growing and immature in development of eyes, from viewing a 3D video by error.

(Closed_Caption_for_3D_Flag)

The closed_caption_for_3D_flag is a flag indicating whether or not a closed caption for 3D is present. When the closed_caption_for_3D_flag is set to "0", it indicates that a closed_caption_for 3D is not present; and when the closed_caption_for 3D_flag is set to "1", it indicates that a closed_caption_for 3D is present. When the closed_caption_for_3D_flag is set to "0" and a closed caption is to be displayed, the playback device switches from 3D video to 2D video before displaying the closed caption. With this structure, it is possible to prevent a closed caption, which is for 2D video, from being displayed in 3D video.

(base_2D_preferable_flag)

The base_2D_preferable_flag is a flag indicating which view among the base view and the dependent view is preferable to be displayed as 2D video.

When the base_2D_preferable_flag is set to "0", it indicates that the base view is preferable to be displayed as 2D video; and when the base_2D_preferable_flag is set to "1", it indicates that the dependent view is preferable to be displayed as 2D video. In some cases, images in the dependent view are displayed more beautifully than images in the base view. This flag enables the content producer, during encoding, to give priority to either of the base view and the dependent view to be played back as the 2D video.

(Profile, Level)

The "profile" and "level" are information indicating performances necessary for the playback device to play back 3D video. The "profile" and "level" are information respectively corresponding to "profile_idc" and "level_idc" in the MPEG-4 MVC method.

(MVC Stereo 3D Stream Descriptor)

The following describes the MVC Stereo 3D stream descriptor.

FIG. 15 illustates identifiers and the like included in the MVC Stereo 3D stream descriptor. The MVC Stereo 3D stream descriptor is defined for each PID.

(Num_of_Views)

The num_of_views is information indicating the number of views included in each video stream identified by the PID. When both the base view and the dependent view are stored in a video stream (in the case where the num_of_sub_bitstreams in the MVC Stereo 3D descriptor is set to "1"), the num_of_views is set to "2".

(View_Id)

The view_id is an identifier of a view, and corresponds to the view_id defined in the MPEG-4 MVC.

(Profile, Level)

The "profile" and "level" are information indicating performances necessary for the playback device to play back the view, and respectively correspond to the profile_idc and the level_idc defined in the MPEG-4 MVC standard.

(Interviewed_Flag)

The interviewed_flag is a flag indicating whether or not the present view is referenced by another view by the inter-view reference. When the interviewed_flag is set to "1", it indicates that the present view is referenced by another view by the inter-view reference; and when the interviewed_flag is set to "0", it indicates that the present view is not referenced by another view by the inter-view reference.

(Interview_Flag)

The interview_flag is a flag indicating whether or not the present view references another view by the inter-view reference. When the interview_flag is set to "1", it indicates that the present view references another view by the inter-view reference; and when the interview_flag is set to "0", it indicates that the present view does not reference another view by the inter-view reference.

(MVC Multi-View Descriptor)

The following describes the MVC multi-view descriptor.

FIG. 16 illustates identifiers and the like included in the MVC multi-view descriptor. Note that the MVC multi-view descriptor also includes information having the same field names as information in the above-described MVC Stereo 3D descriptor, as well as the information illustrated in FIG. 16.

(Num_of_Sub_Bitstreams)

The num_of_sub_bitstreams, as is the case with the num_of_sub_bitstreams in the MVC Stereo 3D descriptor, is information indicating the number of sub bitstreams.

(Sub_Bitstreams_Order[Num_of_Subbitstreams])

The sub_bitstreams_order[num_of_subbitstreams] is information indicating the multiplexing order of sub bitstreams. The sub_bitstreams_order[num_of_subbitstreams] indicates the arrangement order of the starting TS packets of the starting pictures of the GOPs. The sub_bitstreams_order[num_of_subbitstreams] indicates the arrangement order by using the IDs described in the sub_bitstream_id. For example, when performing a direct playback, the playback device references the sub_bitstreams_order[num_of_subbitstreams] to identify a starting TS packet of a GOP in a sub stream, from which to read all the sub streams.

(Sub_Bitstream_Id)

The sub_bitstream_id is an identifier of a sub bitstream.

(PID)

The PID is a PID of the sub bitstream. The PID may be any information as far as it can distinguish among the video streams to be multiplexed.

(Num_of_Views)

The num_of_views is information indicating the number of viewpoint videos constituting the multi-view video. For example, when nine viewpoint videos are encoded and transmitted as a transport stream as illustrated in FIG. 7, the num_of_views is set to "9".

The view_id is an identifier of a view, and corresponds to the view_id defined in the MPEG-4 MVC.

(View_Type)

The view_type is information indicating a picture type which the present view corresponds to and is one of the SI picture video, SP picture video, and SB (including SBr) picture video.

(Profile, Level)

The "profile" and "level" are information indicating performances necessary for the playback device to play back the view, and respectively correspond to the profile_idc and the level_idc defined in the MPEG-4 MVC standard.

(View_Ids_Refers_to_this_View[ ])

The view_ids_refers_to_this_view[ ] is information indicating a list of view_ids of views that use pictures of the present view in the inter-view reference.

(View_Ids_Referd_to_by_this_View[ ])

The view_ids_referd_to_by_this_view[ ] is information indicating a list of view_ids of views that are referenced by the present view by the inter-view reference.

By referencing the view_ids_refers_to_this_view[ ] and the view_ids_referd_to_by_this_view[ ] of all views, it is possible to recognize the reference relation among the views, and create a tree structure as illustrated in FIG. 17 that indicate the reference relation. In the example illustrated in FIG. 17, a view with view_ID "0" is an SI picture video as the base view that is referenced by views with view_IDs "1" to "7". Also, the views with view_IDs "1" and "2" are SP picture videos, wherein the view with view_ID "1" is referenced by views with view_IDs "3" to "5", and the view with view_ID "2" is referenced by views with view_IDs "6" and "7". The views with view_IDs "3" to "6" are SB picture videos that reference the view with view_ID "0" and the view with view_ID "1" or "2".

(Left_Position_View_Id, Distance_to_Left, Etc.)

The left_position_view_id is an identifier of a view corresponding to a viewpoint video that is closest to a viewpoint video corresponding to the present view, among the views on the left side thereof. The distance_to_left is information indicating the physical distance to the view whose identifier is indicated in the left_position_view_id.

Similarly, the right_position_view_id, up_position_view_id, down_position_view_id are identifiers of views corresponding to viewpoint videos that are closest to the viewpoint video corresponding to the present view, among the views on the right side, upper side, and lower side thereof, respectively. The distance_to_right, distance_to_up, and distance_to_down are information indicating the physical distances to the views whose identifiers are indicated in the right_position_view_id, up_position_view_id, and down_position_view_id, respectively. The playback device determines the positional relation among viewpoint videos corresponding to the views, by referencing these identifiers and information.

(View_Id_Order[Num_of_Views])

The view_id_order[num_of_views] is information storing view_ids in the arrangement order of the corresponding views in a multi-view AU in the case where a plurality of views are stored in a sub bitstream.

Figure 18:
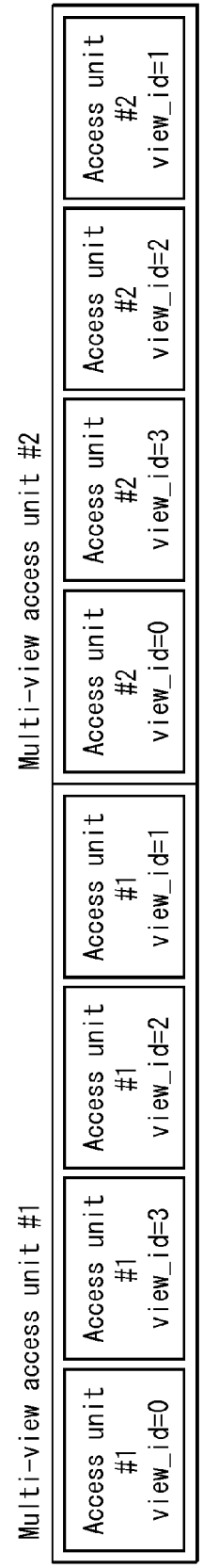
FIG. 18 is a conceptual diagram illustrating an example of the order for storing access units in the multi-view access unit.

FIG. 18 illustrates one example of the storage. As illustrated in FIG. 18, each of the multi-view AU #1 and #2 includes AUs with view_ids "0" to "3", and these AUs are stored therein in the order of "0", "3", "2", and "1". In this case, the view_id_order[num_of_views] stores the values in the order of "0", "3", "2", and "1". This structure enables the playback device to reference the view_id_order[num_of_views] to recognize the order in which AUs are stored in a multi-view AU as illustrated in FIG. 18, and to identify and extract an AU of a view that is to be decoded.

<1-2-4. Operation>

The following describes the operation of the encoding device 2600 in the encoding process.

Figure 19:
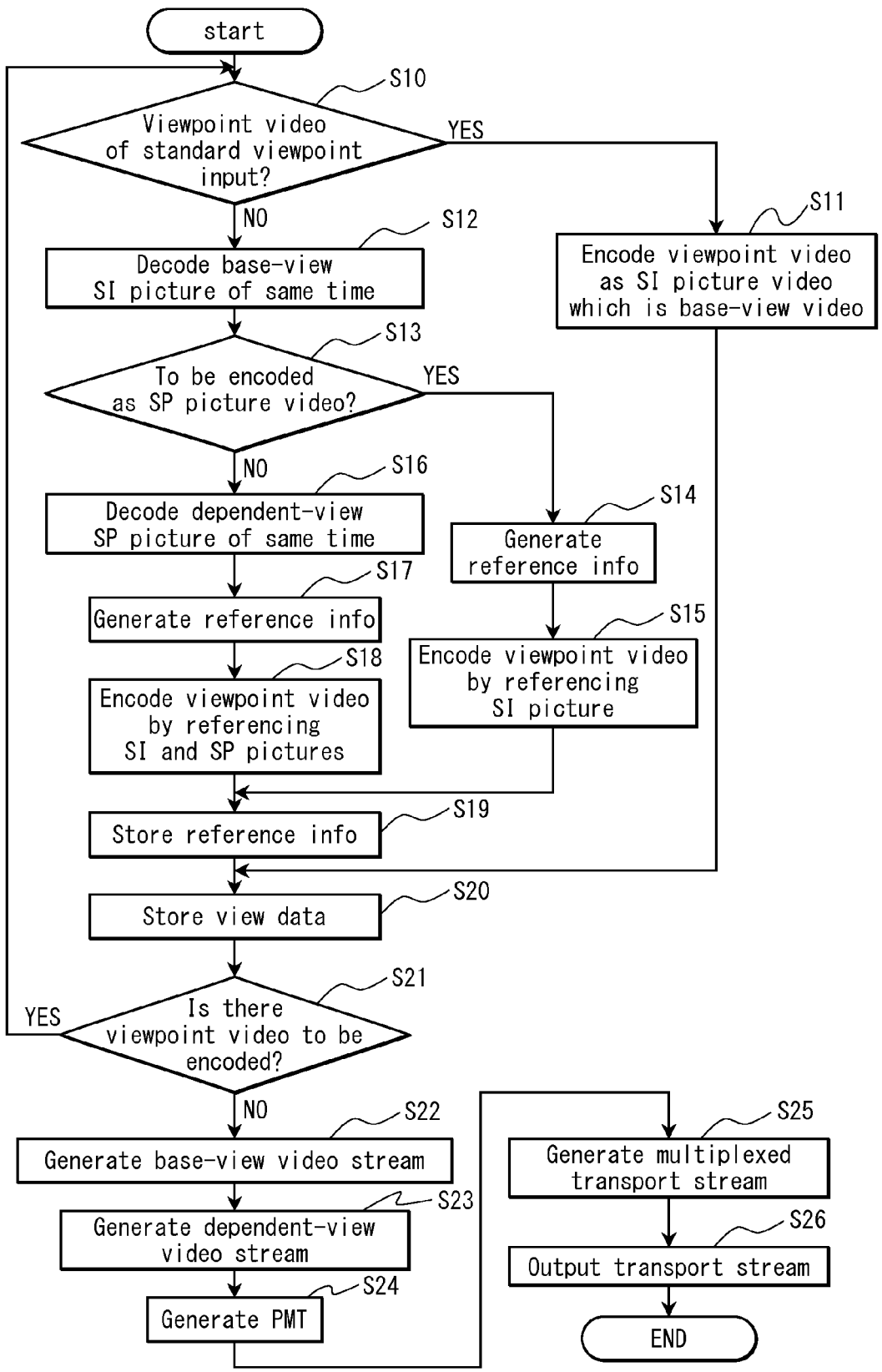
FIG. 19 is a flowchart illustrating the procedure of the encoding process performed by the encoding device 2600.

FIG. 19 is a flowchart illustrating the procedure of the encoding process performed by the encoding device 2600.

When a plurality of cameras are used to shoot respective viewpoint videos, frame images of the same time among the respective viewpoint videos are input to the encoding device 2600 at regular intervals (for example, every 1/30 seconds). Suppose here that the number of shot viewpoint videos is N and that the frame images are input every 1/30 seconds, then it takes N/30 seconds for all the frame images of the same time among the viewpoint videos to be input.

Each of the frame images has been attached with information indicating a picture type (SI picture, SP picture, or SB picture) to which the frame image is encoded, when the frame image is input. Note that, for the sake of explanation, in the following description, "input of a frame image of a viewpoint video" may be represented merely as "input of a viewpoint video" or the like. Also, a case where a frame image of a viewpoint video is output may be represented as "output of a viewpoint video" or the like.

The encoder selector 2604 judges, based on the encode type table 100, whether or not an input viewpoint video is a viewpoint video of the standard viewpoint (step S10). More specifically, the encoder selector 2604 determines the video type of the input viewpoint video by referencing the video type 102 in the encode type table 100 to identify the video type, which is SI, SP or SB, corresponding to the identification information of the input viewpoint video indicated in the viewpoint video 101 of the encode type table 100. For example, when the viewpoint video "e" is input, the encode type table 100 indicates that the video type thereof is SI picture video, thus the encoder selector 2604 judges that the input viewpoint video "e" is a viewpoint video of the standard viewpoint, and outputs the input viewpoint video "e" to the base-view video encoder 2602.

When the encoder selector 2604 judges that the input viewpoint video is a viewpoint video of the standard viewpoint (step S10: YES), and outputs the input viewpoint video to the base-view video encoder 2602, the base-view video encoder 2602 encodes the input viewpoint video as an SI picture video (step S11). Subsequently, the base-view video encoder 2602 outputs the SI picture video to the view video storage unit 2609 and the picture memory 2606, and the view video storage unit 2609 stores the SI picture video (step S20).

Subsequently, the encoder selector 2604 judges whether or not a viewpoint video has been input (step S21), and upon judging that no viewpoint video has been input (step S21: NO), the control proceeds to step S22. When it is judged that a viewpoint video has been input (step S21: YES), the control returns to step S10 to perform the process therefrom.

When the encoder selector 2604 judges that the input viewpoint video is a viewpoint video of a viewpoint other than the standard viewpoint (step S10: NO), it outputs the input viewpoint video to the dependent-view video encoder 2603.

The decode video selector 2608, in accordance with an instruction from the control unit 2601, transfers the encoded SI picture video from the base-view video encoder 2602 to the video decoder 2605 so that the video decoder 2605 can obtain the SI picture that is referenced during the encoding, by decoding the encoded SI picture video. The video decoder 2605 obtains the SI picture by decoding the input encoded SI picture video, and outputs the obtained SI picture to the picture memory 2606, and outputs the view video encoding information, which is obtained during the encoding, to the view video encoding information storage unit 2607 (step S12).

Subsequently, the dependent-view video encoder 2603 judges, by referencing the encode type table 100, whether or not the input viewpoint video is to be encoded as an SP picture video (step S13). More specifically, the dependent-view video encoder 2603 makes the judgment by referencing the video type 102 in the encode type table 100 to identify a video type corresponding to the identification information of the input viewpoint video indicated in the viewpoint video 101 of the encode type table 100. For example, when the viewpoint video "a" is input, the encode type table 100 indicates that the video type thereof is SP picture video, thus the dependent-view video encoder 2603 judges that the input viewpoint video "a" is to be encoded as an SP picture video (step S13: YES).

When it is judged YES in step S13, the dependent-view video encoder 2603 adds, into the reference information 200, information indicating a viewpoint video referenced by the viewpoint video encoded as an SP picture video (step S14). For example, when the viewpoint video "a" illustrated in the portion (ii) of FIG. 7 is input, the dependent-view video encoder 2603 adds, into the reference information 200, a piece of reference information indicating viewpoint video "e" as the viewpoint video referenced by the viewpoint video "a" when the viewpoint video "a" is encoded.

Subsequently, the dependent-view video encoder 2603, based on the view video encoding information, references an SI picture, stored in the picture memory 2606, of the same time as a picture of the input viewpoint video, and encodes the input viewpoint video as an SP picture video (step S15). The dependent-view video encoder 2603 then outputs the reference information 200, in which the piece of reference information has been added newly, to the reference information storage unit 2610, and the reference information storage unit 2610 stores the updated reference information 200 (step S19). Subsequently, the dependent-view video encoder 2603 outputs the SP picture video to the view video storage unit 2609, and the view video storage unit 2609 stores the SP picture video (step S20).

On the other hand, when the dependent-view video encoder 2603 judges that the input viewpoint video is not to be encoded as an SP picture video (step S13: NO), the decode video selector 2608 switches the destination from the dependent-view video encoder 2603 to the video decoder 2605 and outputs an encoded SP picture video to be used to generate an SP picture that is referenced by the dependent-view video encoder 2603 during encoding, to the video decoder 2605. The video decoder 2605 obtains the SI picture by decoding the input encoded SI picture video, and outputs the obtained SI picture to the picture memory 2606, and outputs the view video encoding information, which is obtained during the encoding, to the view video encoding information storage unit 2607 (step S16).

Subsequently, the dependent-view video encoder 2603 adds, into the reference information 200, information indicating a viewpoint video referenced by the viewpoint video encoded as an SB picture video (step S17). For example, when the viewpoint video "b" illustrated in the portion (ii) of FIG. 7 is input, the dependent-view video encoder 2603 adds, into the reference information 200, a piece of reference information indicating viewpoint videos "a" and "e" as the viewpoint videos referenced by the viewpoint video "b" when the viewpoint video "b" is encoded.

The dependent-view video encoder 2603 extracts an SI picture and an SP picture, which have the same PTS as the input viewpoint video, from the picture memory 2606 based on the information of PTS described in the view video encoding information, and encodes the input viewpoint video as an SB picture video by the inter-view reference using the extracted SI and SP pictures (step S18). The dependent-view video encoder 2603 then outputs the reference information 200, in which the piece of reference information has been added newly, to the reference information storage unit 2610, and the reference information storage unit 2610 stores the updated reference information 200 (step S19). Subsequently, the dependent-view video encoder 2603 outputs the SB picture video to the view video storage unit 2609, and the view video storage unit 2609 stores the SB picture video (step S20).

Subsequently, the encoder selector 2604 judges whether or not a viewpoint video has been input (step S21), and upon judging that a viewpoint video has been input (step S21: YES), the control returns to step S10 to perform the process therefrom.

When it is judged that no viewpoint video has been input (step S21: NO), the base-view video stream generating unit 2611 reads the base view that has been obtained by encoding the viewpoint video of the standard viewpoint, from the view video storage unit 2609, and generates a base-view video stream (step S22). Subsequently, the dependent-view video stream generating unit 2612 reads all the dependent views that have been obtained by encoding the viewpoint videos other than the viewpoint video of the standard viewpoint, from the view video storage unit 2609, and generates a dependent-view video stream (step S23).

The PMT generating unit 2613 generates a PMT that includes: the MVC information descriptor pertaining to the base-view video stream and the dependent-view video stream; stream information including the MVC stream descriptor; and descriptors pertaining to the transport stream (step S24). More specifically, the PMT generating unit 2613 sets the playback mode in the MVC information descriptor to "4" indicating a multi-view stream.

Also, the PMT generating unit 2613 sets values in the view_ids_refers_to_this_view[ ] and the view_ids_referred_to_by_this_view[ ] in the MVC multi-view descriptor based on the reference relation described in the reference information 200. More specifically, the PMT generating unit 2613 writes view_ids of viewpoint videos, which are described in the referenced video 202 of the reference information 200, into the view_ids_referred_to_by_this_view[ ] in the MVC multi-view descriptor for each viewpoint video described in the viewpoint video 201 of the reference information 200.

Furthermore, the PMT generating unit 2613 writes view_ids of viewpoint videos, which are described in the viewpoint video 201 of the reference information 200, into the view_ids_refers_to_this_view[ ] in the MVC multi-view descriptor for each viewpoint video described in the referenced video 202 of the reference information 200. For example, "a" described in the viewpoint video 201 of the reference information 200 corresponds to "e" described in the referenced video 202 of the reference information 200. Here, suppose that the view_id of a view corresponding to the viewpoint video "a" is "1", and the view_id of a view corresponding to the viewpoint video "e" is "2". Then the PMT generating unit 2613 writes "1" into the view_ids_refers_to_this_view[ ] in the MVC multi-view descriptor for the view_id "2" of the view corresponding to the viewpoint video described in the referenced video 202 of the reference information 200, and does not write any value into the view_ids_referred_to_by_this_view[ ] thereof since view "1" references view "2", but references view "2" does not reference any other view.

Furthermore, the PMT generating unit 2613 writes "2" into the view_ids_referred_to_by_this_view[ ] in the MVC multi-view descriptor for the view_id "1" of the view corresponding to the viewpoint video described in the referenced video 202 of the reference information 200 since view "2" is referenced by view "1".

As another example, "b" described in the viewpoint video 201 of the reference information 200 corresponds to "a, e" described in the referenced video 202 of the reference information 200. Suppose that the view_id of a view corresponding to the viewpoint video "b" is "3". Then the PMT generating unit 2613 writes "1, 2" into the view_ids_referred_to_by_this_view[ ] in the MVC multi-view descriptor for the view_id "3" of the view corresponding to the viewpoint video described in the referenced video 202 of the reference information 200 since view "3" references views "1" and "2". Also, the PMT generating unit 2613 does not write any value into the view_ids_refers_to_this_view[ ] thereof since view "3" is not referenced by any other view.

Furthermore, in this case, the PMT generating unit 2613 additionally writes "3" into the view_ids_refers_to_this_view[ ] in the MVC multi-view descriptor for the view_id "2" of the view corresponding to the viewpoint video described in the referenced video 202 of the reference information 200 since view "3" references view "2" as well, thereby the view_ids_refers_to_this_view[ ] has values "1, 3".

Also, the PMT generating unit 2613 writes "3" into the view_ids_refers_to_this_view[ ] in the MVC multi-view descriptor for the view_id "1" of the view corresponding to the viewpoint video described in the referenced video 202 of the reference information 200 since view "3" references view "1" as well. In this way, the PMT generating unit 2613 sets values in the view_ids_refers_to_this_view[ ] and the view_ids_referred_to_by_this_view[ ] in the MVC multi-view descriptor based on the reference relation between the viewpoint video 201 and the referenced video 202 for all the viewpoint videos described in the reference information 200.

Other information and identifiers in the MVC multi-view descriptor are described based on the view video encoding information. The values of the information and identifiers are set based on the information described in syntax elements that are created when encoding is performed by the MPEG-4 MVC format. The syntax elements are elements defining attribute information necessary for encoding by a compress-encoding method conforming to the MPEG-4 MVC format.

Subsequently, the multiplexer 2614 generates a multiplexed transport stream by multiplexing the base-view and dependent-view video streams and converting the multiplexed streams into PES packets (step S25).

The transport stream output unit 2615 divides the PES packets received from the multiplexer 2614 into TS packets and output the TS packets in sequence as a transport stream (step S26).

With the above-described processing, the encoding device 2600 outputs an encoded transport stream including data that is obtained by encoding a multi-viewpoint video.

<1-3. Playback Device>

The following describes a playback device 2800 which receives and plays back the encoded transport stream output from the encoding device 2600.

<1-3-1. Structure>

Figure 20:
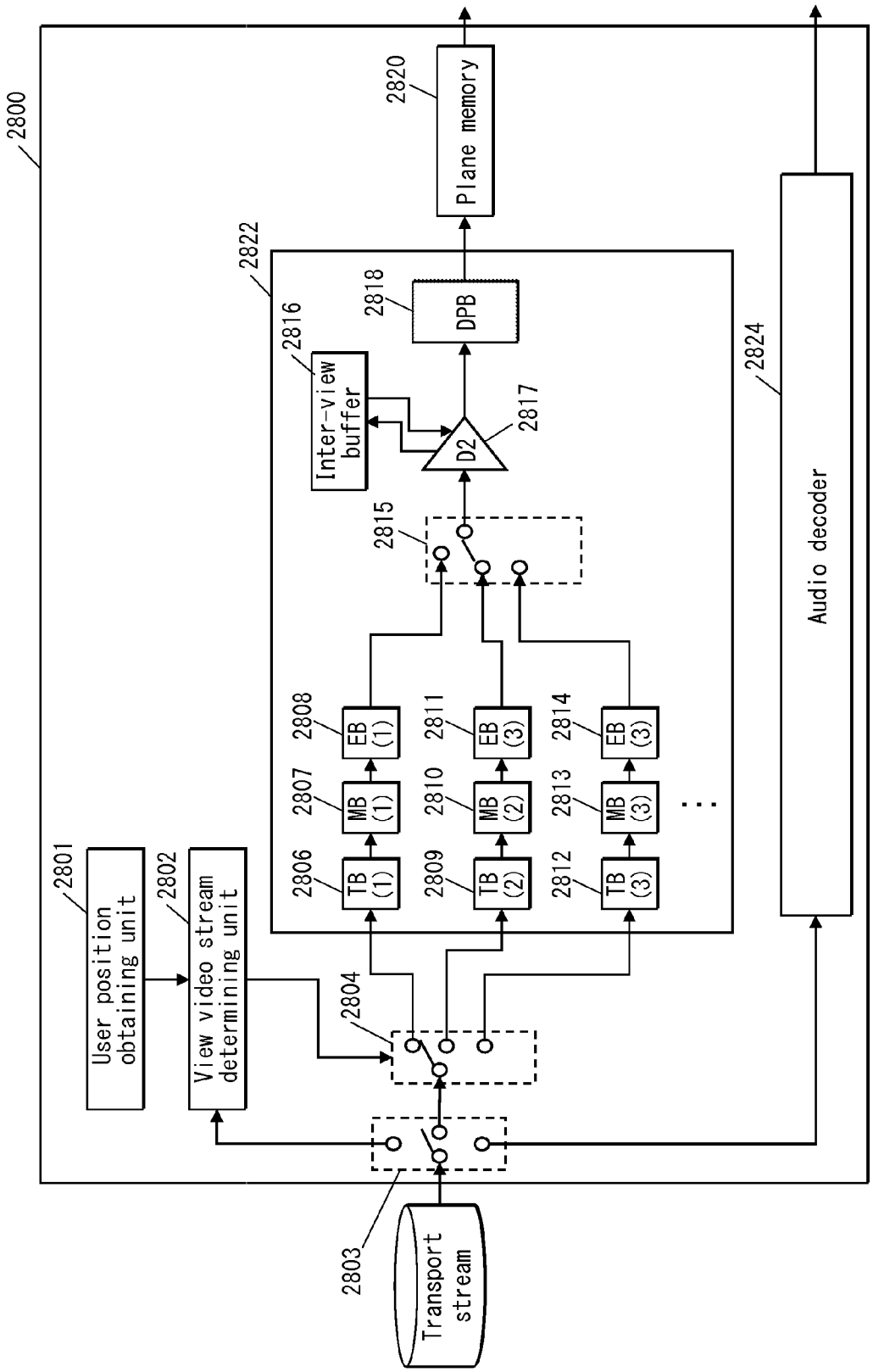
FIG. 20 is a block diagram illustrating the structure of the playback device 2800.

FIG. 20 is a block diagram illustrating the structure of the playback device 2800 in the present embodiment.

The playback device 2800 includes a user position obtaining unit 2801, a view video stream determining unit 2802, a PID filter 2803, a data selector 2804, a multi-view video decoder 2822, a plane memory 2820, and an audio decoder 2824.

The playback device further includes a processor and a memory that are not illustrated, and the functions of the user position obtaining unit 2801 and the view video stream determining unit 2802 are realized when the processor executes a program stored in the memory.

(User Position Obtaining Unit 2801)

The user position obtaining unit 2801 is provided with a camera for shooting video of a user by taking successively a plurality of images of the user, and has a function to detect a position of the face of the user by applying a face recognition technology onto the images of the user taken by the camera, identify a viewpoint position of the user based on the detected face position, and output information pertaining to the viewpoint position (for example, coordinate values of the viewpoint position) to the view video stream determining unit 2802.

(View Video Stream Determining Unit 2802)

The view video stream determining unit 2802 has a function to identify a viewpoint video to be decoded, based on the information pertaining to the viewpoint position (for example, coordinate values of the viewpoint position) received from the user position obtaining unit 2801, and select a video stream corresponding to the identified viewpoint video. More specifically, the view video stream determining unit 2802 obtains data called PMT that is output as a result of filtering performed by the PID filter 2803, compares the positional information (left_position_view_id, distance_to_left, etc.) of each view described in the MVC information descriptor and the MVC stream descriptor contained in the PMT, with the information pertaining to the viewpoint position received from the user position obtaining unit 2801, and selects, as a decoding target view, a view that is closest to the viewpoint position of the user. The view video stream determining unit 2802 then instructs the data selector 2804 to select a TB (Transport Stream Buffer) to which view video stream data including the selected view is to be output, based on the video type of the selected view. For example, when the video type of the view included in the input view video stream data is the SI picture video, the view video stream determining unit 2802 instructs the data selector 2804 to output the view video stream data to TB(1); and when the video type is the SP or SB picture video, the view video stream determining unit 2802 instructs the data selector 2804 to output the view video stream data to TB(2) or TB(3). With the structure illustrated in FIG. 20, it is possible to perform parall processing by inputting different SP picture videos into TB(2) and TB(3) respectively. The TB is described below.

(PID Filter 2803)

The PID filter 2803 has a function to filter the input transport stream, in accordance with an instruction from the view video stream determining unit 2802. More specifically, the PID filter 2803 outputs the input TS packets to the multi-view video decoder 2822 or the audio decoder 2824 via the data selector 2804, in accordance with the PID of the TS packets.

The PID filter 2803 analyzes the PMT packet to identify a stream corresponding to the PID. For example, suppose that the base-view video stream and the dependent-view video stream have been generated as video streams having different PIDs, and that the encoding device has written "0x1012" in the PMT as the PID of the base-view video stream. Then the PID filter 2803 references the PID of the input TS packet, judges the TS packet having PID "0x1012"

as a TS packet of the base-view video stream, and outputs the TS packet to the multi-view video decoder 2822 via the data selector 2804. When the input TS packet has a PID indicating that it is an audio data stream, the PID filter 2803 outputs the TS packet to the audio decoder 2824.

(Data Selector 2804)

The data selecter 2804 has a function to, in accordance with an instruction from the view video stream determining unit 2802, output the TS packet received from the PID filter 2803 to a TB instructed by the view video stream determining unit 2802.

(Multi-View Video Decoder 2822)

The multi-view video decoder 2822 includes a TB(1) 2806, an MB (Multiplexing Buffer) (1) 2807, an EB (Elementary Stream Buffer) (1) 2808, a TB(2) 2809, an MB(2) 2810, an EB(2) 2811, a TB(3) 2812, an MB(3) 2813, an EB(3) 2814, a decode switch 2815, an inter-view buffer 2816, a D2 2817, and a DPB (Decoded Picture Buffer) 2818.

(TB, MB, EB)

The TB(1) 2806 is a buffer for temporarily storing TS packets of the base-view video stream received from the data selector 2804 as they are.

The MB(1) 2807 is a buffer that, when a video stream is output from the TB(1) 2806 to the EB(1) 2808, stores PES packets temporarily. When data is transferred from the TB(1) 2806 to the MB(1) 2807, the TS header and adaptation field of each TS packet are removed.

The EB(1) 2808 is a buffer for storing compress-encoded pictures (I-, B- and P-pictures). When data is transferred from the MB(1) 2806 to the EB(1) 2808, the PES header is removed.

The TB(2) 2809, MB(2) 2810 and EB(2) 2811 have the same function as the TB(1) 2806, MB(1) 2807 and EB(1) 2808, respectively, but differ therefrom in that they store the dependent-view video stream.

The TB(3) 2812, MB(3) 2813 and EB(3) 2814 have the same function as the TB(2) 2809, MB(2) 2810 and EB(2) 2811, respectively.

The decode switch 2815 references DTSs in the EB(1) 2808, EB(2) 2811 and EB(3) 2814, extracts AUs assigned with the DTSs from the buffers, constructs a multi-view AU by the extracted AUs, and outputs the multi-view AU to the D2 2817.

(D2 2817, Inter-View Buffer 2816)

The D2 2817 is a decoder for generating frame images by decoding the multi-view AU output from the decode switch 2815. The D2 2817 has a function to decode a dependent-view video stream in the MPEG-4 MVC format.

The inter-view buffer 2816 is a readable/writable memory (for example, DRAM) for storing pictures among which the inter-view reference is performed by the D2 2817 during the decoding process.

The pictures decoded by the D2 2817 are temporarily stored in the inter-view buffer 2816. The D2 2817 decodes a picture of the dependent view by referencing a decoded picture of the base view or a decoded picture of the dependent view stored in the inter-view buffer 2816 that have the same PTS as the decoding-target picture.

Also, the D2 2817 has a function to output the picture obtained by the decoding to the plane memory 2820 via the DPB 2818 in accordance with the value of the PTS.

(DPB 2818)

The DPB 2818 is a readable/writable memory (for example, DRAM) for temporarily storing the picture decoded by the D2 2817 so that the picture obtained by the decoding is output in accordance with the value of the PTS. The picture stored in the DPB 2818 is used for reference when the D2 2817 decodes an AU of a P-picture or a B-picture by the inter-picture predictive coding mode in the time direction.

(Plane Memory 2820)

The plane memory 2820 is a readable/writable memory (for example, DRAM) for storing the picture output from the DPB 2818 in accordance with the value of the PTS. The picture obtained by the decoding is output via the plane memory. The output picture is displayed on a display device connected with the playback device 2800.

(Audio Decoder 2824)

The audio decoder 2824 has a function to decode audio TS packets output from the PID filter 2803, and output audio data. The output audio data is played back on a speaker or the like connected with the playback device 2800.

<1-3-2. Operation>

The following describes the operation of the playback device 2800 in the decoding process.

Figure 21:
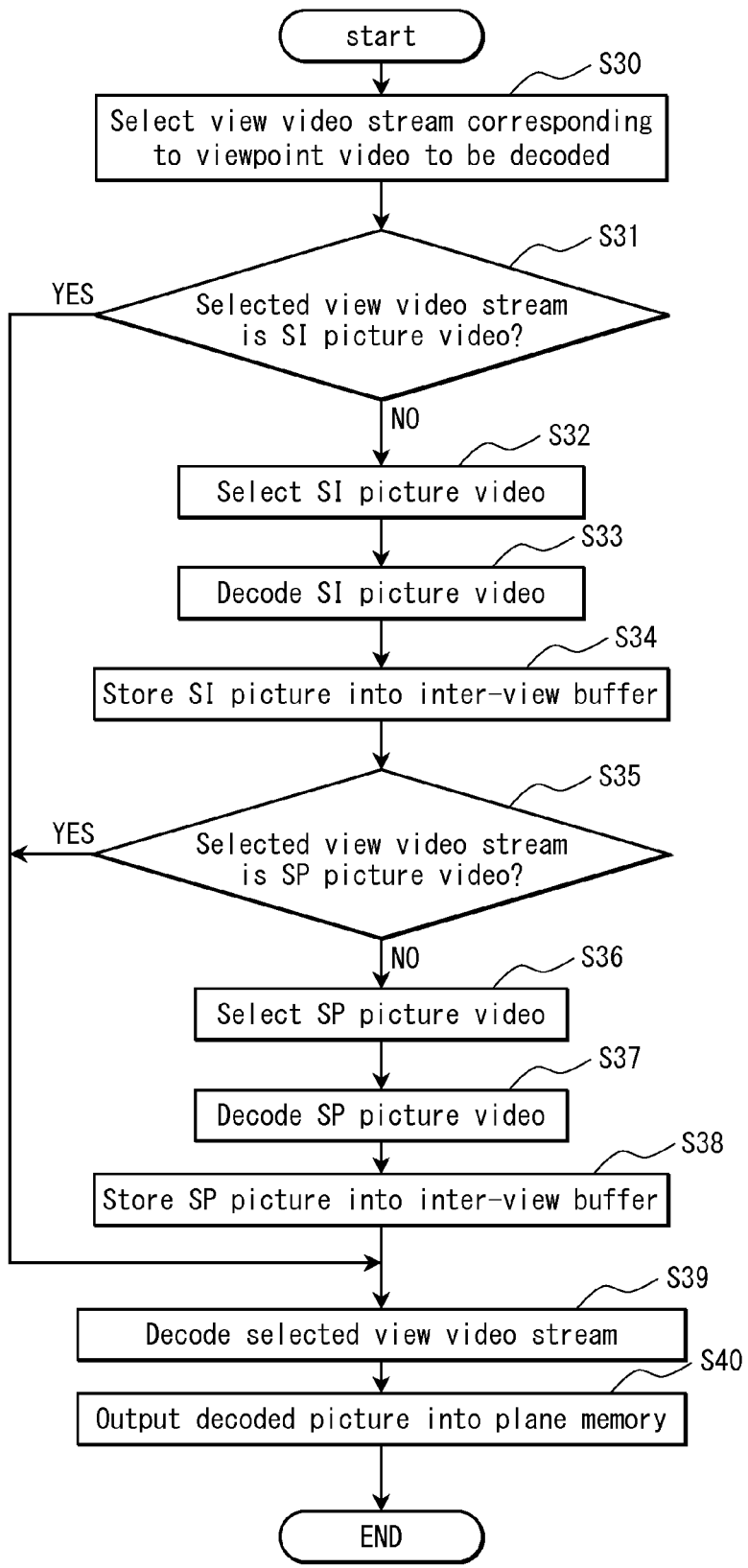
FIG. 21 is a flowchart illustrating the procedure of decoding a multi-view video stream performed by the playback device 2800.

FIG. 21 is a flowchart illustrating the procedure of decoding a multi-view video stream performed by the playback device 2800.

The view video stream determining unit 2802 selects a view video stream to be decoded, based on the information pertaining to the user viewpoint position received from the user position obtaining unit 2801 (step S30). More specifically, the user position obtaining unit 2801 outputs, as information indicating the user viewpoint position, coordinate values in a coordinate system on an x-y plane including viewpoint videos, the origin of the coordinate system being the position of the standard viewpoint. The view video stream determining unit 2802 calculates a distance between the user viewpoint position and each of the viewpoint videos, by using the coordinate values of the user viewpoint position and the positional information (left_position-_view_id, distance_to_left, etc.) of each view described in the MVC multi-view descriptor, and selects a view video stream including a view corresponding to a viewpoint video that is closest to the user viewpoint position.

Subsequently, the view video stream determining unit 2802 judges whether or not the video type of the selected view is the SI picture video (step S31). More specifically, the view video stream determining unit 2802 makes the judgment by judging whether or not the value of the view_type corresponding to the view ID of the selected view in the MVC multi-view descriptor is "SI".

When the video type of the selected view is SI (step S31: YES), the view video stream determining unit 2802 instructs the data selector 2804 to output the view video stream including the selected view to the TB(1) 2806, and the data selector 2804 outputs the selected view video stream to the TB(1) 2806. The D2 2817 decodes the view video stream from which the header and the like have been removed in the MB(1) 2807 and EB(1) 2808, and outputs the decoded view video stream to the DPB 2818 (step S39).

On the other hand, when it is judged that the video type of the selected view is not the SI picture video (step S31: NO), views to be referenced by the selected view need to be decoded first since the selected view cannot be decoded alone. Thus the view video stream determining unit 2802 first selects an SI picture video which is a view that can be decoded alone and is to be referenced by the selected view (step S32). More specifically, the view video stream determining unit 2802 references the view_ids_refers_to_this_view[ ] in the MVC multi-view descriptor, identifies view_ids of the referenced video stream, and selects, from among the identified view_ids, a view_id of a view whose view type is "SI".

Subsequently, the view video stream determining unit 2802 instructs the data selector 2804 to output the selected SI picture video to the TB(1) 2806, and in accordance with the instruction, the data selector 2804 outputs the video stream of the SI picture video to the TB(1) 2806.

The D2 2817 decodes the SI picture video from which the header and the like have been removed in the MB(1) 2807 and EB(1) 2808 (step S33), and stores the picture obtained by the decoding into the inter-view buffer 2816 (step S34).

Subsequently, the view video stream determining unit 2802 judges whether or not the video type of the selected view is the SP picture video (step S35). More specifically, as is the case with the judgment in step S31, the view video stream determining unit 2802 makes the judgment based on the value of the view_type of the selected view.

When the video type of the selected view is SP (step S35: YES), the view video stream determining unit 2802 instructs the data selector 2804 to output the view video stream including the selected view to the TB(2) 2809, and the data selector 2804 outputs the selected view video stream to the TB(2) 2809.

The D2 2817 decodes the SP picture video from which the header and the like have been removed in the MB(2) 2810 and EB(2) 2811, by referencing a decoded picture, which has the same PTS as the decoding-target picture, of the SI picture video that has already been decoded and stored in the inter-view buffer 2816, and outputs the picture obtained by the decoding to the DPB 2818 (step S39).

On the other hand, when it is judged that the video type of the selected view is not the SP picture video (step S35: NO), the view video stream determining unit 2802 selects an SP picture video to be referenced by the selected view (step S36). More specifically, the view video stream determining unit 2802 references the view_ids_refers_to_this_view[ ] in the MVC multi-view descriptor, identifies view_ids of the referenced video stream, and selects, from among the identified view_ids, a view_id of a view whose view type is "SP".

Subsequently, the view video stream determining unit 2802 instructs the data selector 2804 to output the selected SP picture video to the TB(2) 2809, and the data selector 2804 outputs the SP picture video to the TB(2) 2809 in accordance with the instruction.

The D2 2817 then decodes the SP picture video from which the header and the like have been removed in the MB(2) 2810 and EB(2) 2811, by referencing a decoded picture, which has the same PTS as the decoding-target picture, of the SI picture video that has already been decoded and stored in the inter-view buffer 2816 (step S37), and outputs the SP picture obtained by the decoding to the inter-view buffer 2816 (step S38).

Subsequently, the view video stream determining unit 2802 instructs the data selector 2804 to output a view video stream including the selected view to the TB(3) 2812, and the data selector 2804 outputs the view video stream to the TB(3) 2812 in accordance with the instruction by the view video stream determining unit 2802.

The D2 2817 then decodes the SB picture video from which the header and the like have been removed in the MB(3) 2813 and the EB(3) 2814, by referencing pictures, which has the same PTS as the decoding-target picture, of an SI picture video and an SP picture video that have already been decoded and stored in the inter-view buffer 2816, and outputs the SB picture obtained by the decoding to the DPB 2818 (step S39).

The DPB 2818 outputs the decoded picture to the plane memory 2820 in accordance with the value of the PTS (step S40). The picture output to the plane memory 2820 is displayed on a display device connected with the playback device 2800.

<1-4 Summary>

When encoding viewpoint videos shot from a plurality of viewpoints at the same time, the encoding device 2600 compress-encodes a viewpoint video, which is sandwiched by two viewpoint videos, by referencing the two viewpoint videos by the inter-view reference, thereby generating a transport stream with a video stream with a reduced data amount multiplexed therein.

Also, the playback device 2800, by using the transport stream generated by the encoding device 2600, selects a viewpoint video that is closest to the viewpoint position of the user, from among a plurality of viewpoint videos corresponding to a plurality of viewpoint positions, and decodes a video stream corresponding to the selected viewpoint video and plays back the decoded viewpoint video.

<1-5. Supplementary Note)

A supplementary description is given of how a multi-viewpoint video realized by the encoding device or playback device of the present embodiment is viewed.

As described above, as a technology for realizing viewing of an object from a plurality of viewpoints, the free-viewpoint video technology is known.

To generate a free-viewpoint video as a live-action video, a multi-viewpoint video composed of a plurality of viewpoint videos shot by a plurality of cameras at the same time is used. A video of a viewpoint position which is not shot by a camera may be generated by interpolation by using viewpoint videos shot by cameras. Accordingly, the shorter the distance between the cameras is, the higher the quality of the free-viewpoint video is.

Figure 22:
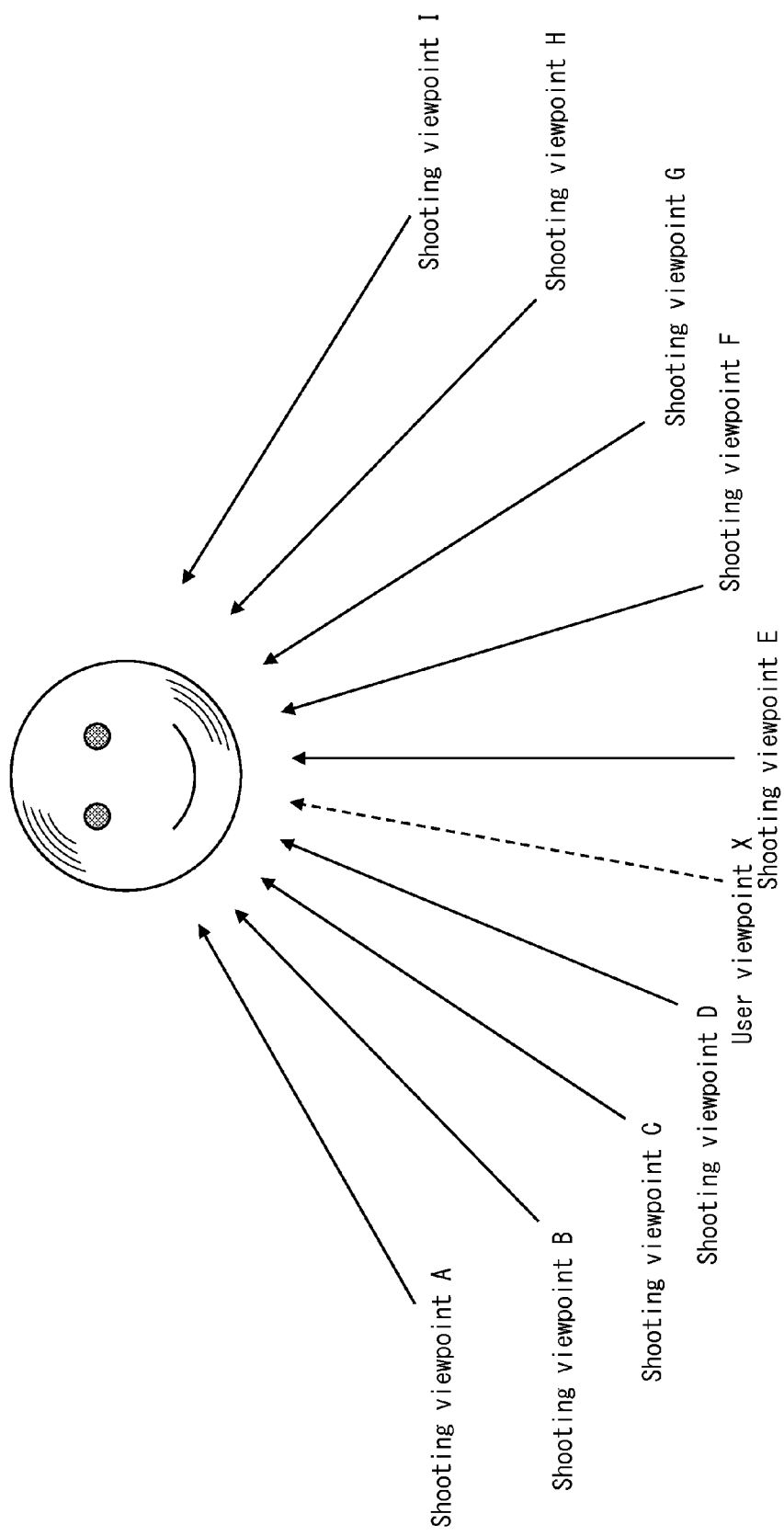
FIG. 22 is a conceptual diagram illustrating one example of viewpoint positions when shooting an object from a plurality of viewpoint positions.

FIG. 22 is a conceptual diagram illustrating one example of viewpoint positions in a shooting using cameras.

In the example illustrated in FIG. 22, an object is shot from nine viewpoint positions (shooting viewpoints A-I) at the same time. The viewpoint videos shot at the shooting viewpoints A-I correspond to the viewpoint videos "a"-"i" illustrated in FIG. 7. When a viewpoint of the user is, like position X, different from any of the shooting viewpoint positions (hereinafter the viewpoint of the user is referred to as "user viewpoint", and, for example, when the user viewpoint is postion X, the postion is referred to as "user viewpoint X"), a composite video of the user viewpoint is generated by composing viewpoint videos shot at near viewpoints. In FIG. 22, when a video shot at the user viewpoint X is generated, a viewpoint video "d" shot at shooting viewpoint D and a viewpoint video "e" shot at shooting viewpoint E are used. As one example, a composite video may be generated by the following method. That is to say, first, depth maps of viewpoint videos "d" and "e" are generated based on the correspondence between viewpoint videos "d" and "e" in feature of the shooting object. Furthermore, the object in each of the viewpoint videos "d" and "e" is shifted, based on the depth maps, to be the object viewed from the user viewpoint, thereby generating the video corresponding to the user viewpoint X.

Figure 23:
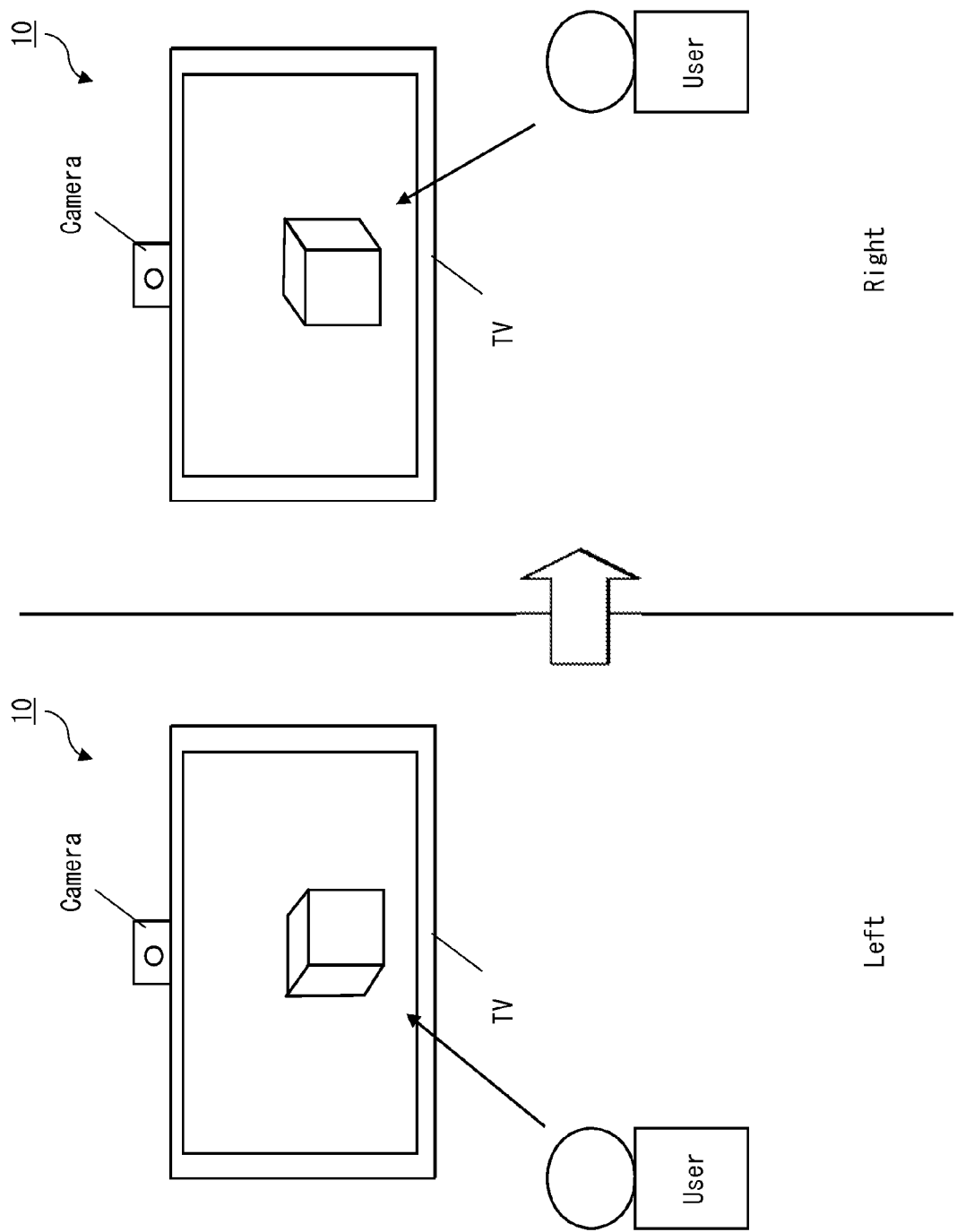
FIG. 23 is a schematic diagram illustrating a free-viewpoint TV as one example of the use form of receiving such a multi-viewpoint video.

FIG. 23 is a schematic diagram illustrating a free-viewpoint TV as one example of the use form of receiving such a multi-viewpoint video.

Figure 24:
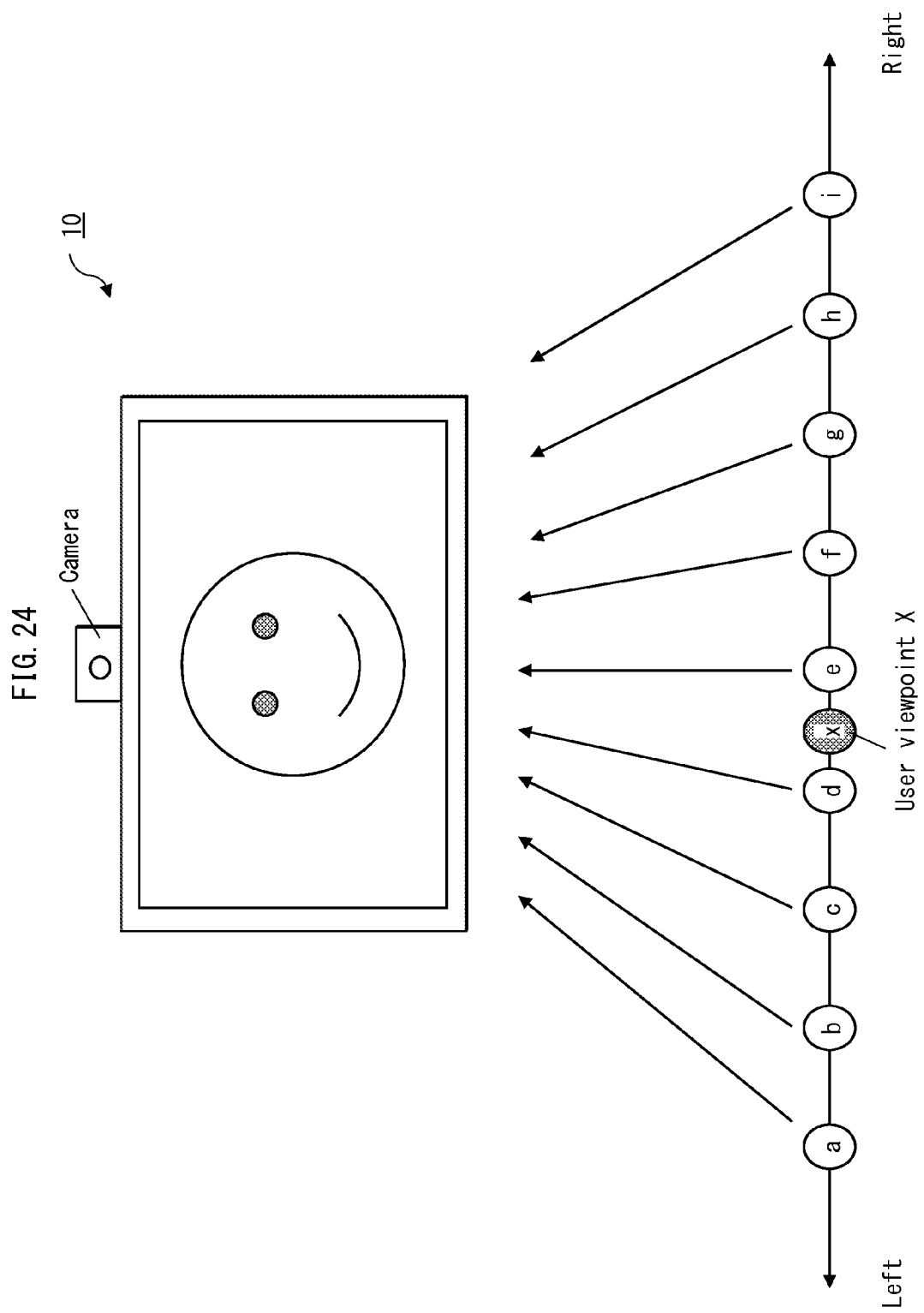
FIG. 24 is a schematic diagram illustrating one example of viewpoint positions received by a free-viewpoint TV.

A free-viewpoint TV 10 plays back video of the user viewpoint. The free-viewpoint TV 10 identifies the position of the user by taking pictures of the user with a camera, which is mounted on the display, and recognizing the face of the user by the face recognition technology. As illustrated in FIG. 24, the free-viewpoint TV 10 receives nine viewpoint videos "a"-"i" from an encoding device, and generates and displays a viewpoint video corresponding to the user position. In the case of the example illustrated in FIG. 24, the free-viewpoint TV 10 generates the viewpoint video corresponding to the user viewpoint X by using the viewpoint videos "d" and "e" that are located nearest to the user viewpoint X on both sides of it.

To realize the above free-viewpoint TV, simultaneous distribution of a plurality of videos is required, and it is desirable that the amount of distributed data is as small as possible.

Meanwhile, a plurality of viewpoint videos, which are videos of the same object shot at the same time, are correlated highly with each other. MPEG-4 MVC is one of technologies that use the correlation between different videos to reduce the amount of data when compress-encoding the videos. MPEG-4 MVC is an encoding method used for the compress-encoding of a 3D video, namely a pair of viewpoint videos, for BD (Blu-ray Disc™). Note that, although for the 3D viewing, only two videos, left-eye and right-eye videos, need to be encoded, MPEG-4 MVC is defined to be able to compress-encode two or more videos at once.

Figure 25:
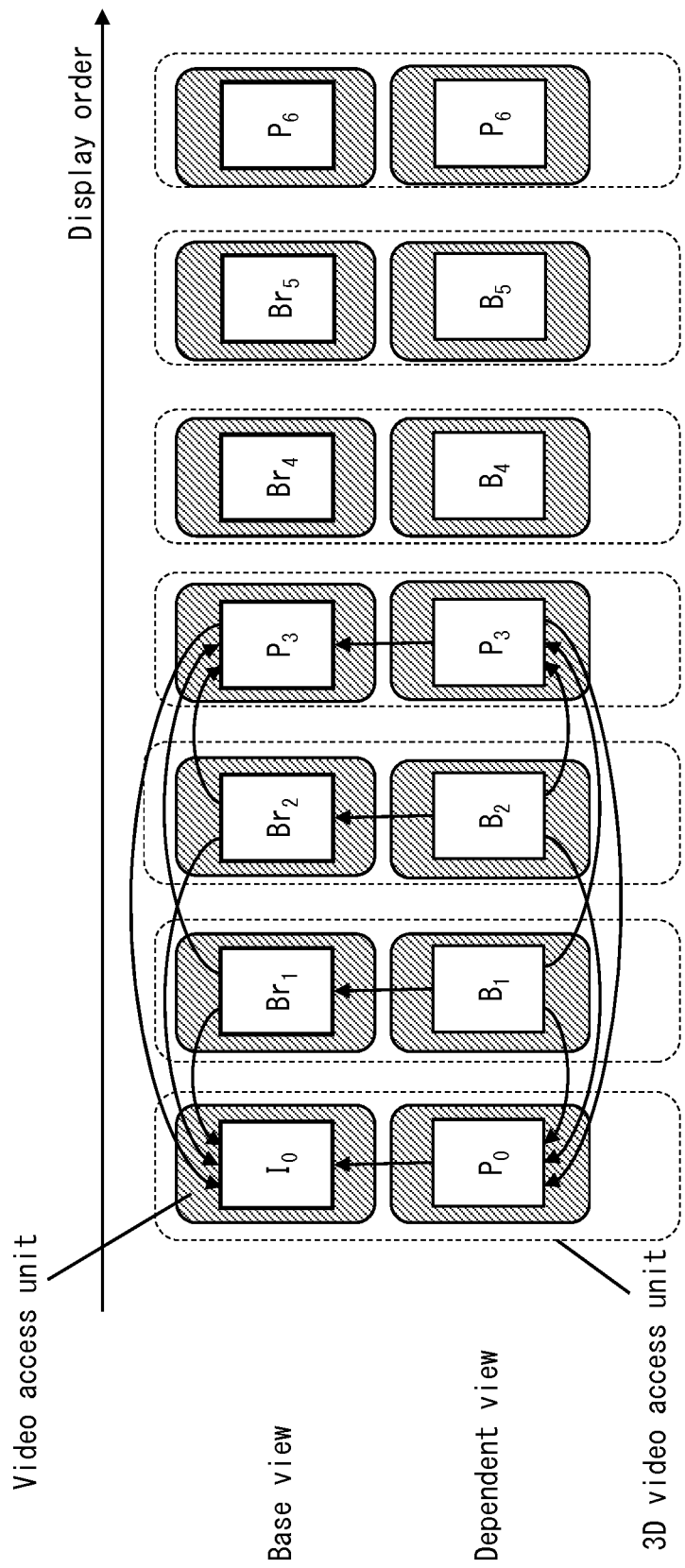
FIG. 25 is a conceptual diagram illustrating the reference relation between views in the encoding conforming to the MPEG-4 MVC.

FIG. 25 is a conceptual diagram illustrating the reference relation between views in the encoding conforming to the MPEG-4 MVC.

According to the MPEG-4 MVC, a multi-viewpoint video is encoded as one base view and one or more dependent views. Note that FIG. 25 provides an example in the case of two viewpoints, illustrating reference relation between one base view and one dependent view.

Each arrow in FIG. 25 indicates a reference relation between pictures where a picture at the tail of an arrow references a picture at the point of the arrow. For example, FIG. 25 indicates that the picture P0, the starting P-picture of the dependent view, references the picture 10 that is an I-picture of the base view. Also, the picture B1 that is a B-picture of the dependent view references the picture Br1 that is a Br-picture of the base view. Also, the picture P3 that is the second P-picture of the dependent view references the picture P3 that is a P-picture of the base view.

The base view does not reference any picture of the dependent view. Accordingly, the base view can be decoded and played back independently.

On the other hand, the dependent view is decoded by referencing the base view. Thus, the dependent view cannot be decoded or played back independently. However, the following should be noted. That is to say, in the inter-picture predictive coding, each picture constituting the dependent view is encoded by referencing each picture of the same time of another viewpoint of the base view. Pictures of the same time belonging to different viewpoints that are close to each other have similarity (are highly correlated with each other). As a result, by compress-encoding the differences between macro blocks, which are similar, of the pictures in units of macro blocks, it is possible to reduce the data amount of the dependent view compared with the base view.

2. Modifications

Although the present invention has been fully described by way of examples with reference to the accompanying drawings, the present invention is not limited to the encoding device and playback device described, as one example, in the above embodiment, but the encoding device and playback device can be modified, for example, as follows.

(1) In the encoding device 2600, when the viewpoint videos are arranged on a straight line: a viewpoint video at the center viewpoint position defined as a viewpoint video of the standard viewpoint and is encoded as an SI picture video; and two viewpoint videos that are respectively located farthest from the standard viewpoint are specified to be encoded as SP picture videos. However, the viewpoint videos to be encoded as SP picture videos are not limited to the viewpoint videos at the opposite ends of the sequence. When there are a plurality of viewpoint videos between the standard viewpoint and the viewpoint videos at the opposite ends, some of the plurality of viewpoint videos may be encoded as SP picture videos. For example, as illustrated in the portion (i) of FIG. 26, not only the viewpoint video corresponding to the viewpoint position I at the leftmost end, but the viewpoint video corresponding to the viewpoint position E between the viewpoint positions A and I may be encoded as an SP picture video. With this structure, the distance between the referencing and referenced pictures becomes shorter, and thus the difference therebetween becomes smaller, which makes it possible to further reduce the data amount of the dependent-view video.

In that case, the provider of the multi-viewpoint sets an encode type table 100 indicating the SP pictures that are separated from each other by a predetermined number of viewpoint videos, starting with the standard viewpoint. For example, in the table illustrated in FIG. 3, the video types of the viewpoint video "e" and "g" may be set as SP, instead of SB.

Furthermore, one of SB picture videos sandwiched by the SI picture video and an SP picture video may be an SBr picture video that is referenced by another viewpoint video. For example, in the example illustrated in the portion (ii) of FIG. 26, the viewpoint video corresponding to the viewpoint position E may be encoded as an SBr picture video, the viewpoint videos corresponding to the viewpoint positions B, C and D may be encoded by referencing the SBr picture video and the SI picture video corresponding to the viewpoint position A, and the viewpoint videos corresponding to the viewpoint positions F, G and H may be encoded by referencing the SBr picture video and the SP picture video corresponding to the viewpoint position I. With this structure, compared with the case where the SP picture video is referenced, the distance between the referencing and referenced pictures becomes shorter, and thus the difference therebetween becomes smaller, which makes it possible to encode the viewpoint videos corresponding to the viewpoint positions B, C, D, F, G and H with a further high reduction rate.

Figure 26:
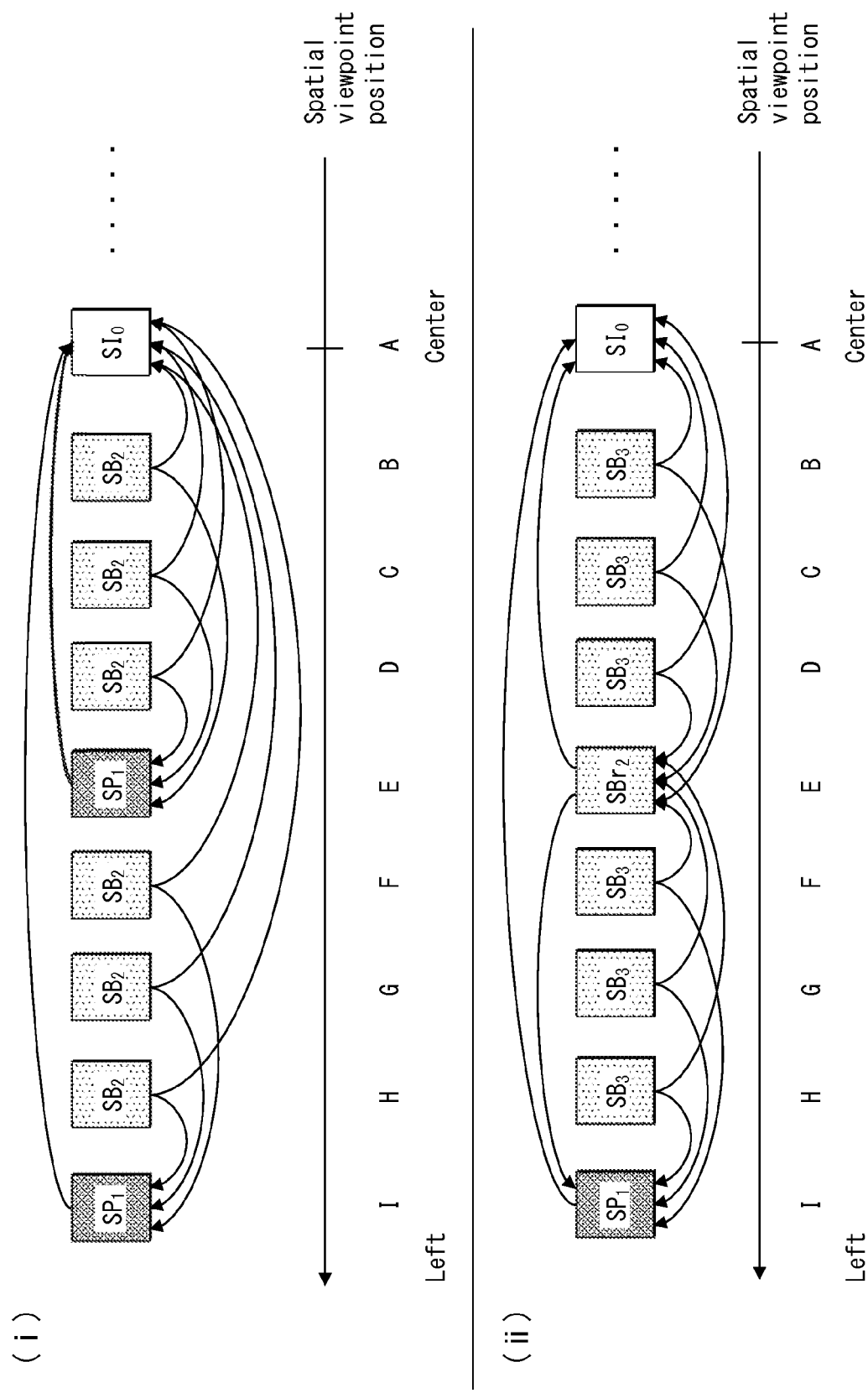
FIG. 26 illustrates modifications of the reference relation in the encoding of picture videos: (i) illustrating a case where an SP picture video is set between an SI picture video and an SP picture video; and (ii) illustrating a case where an SBr picture video, which is referenced by other viewpoint videos, is set.

Note that the numeral attached to each of SI, SP and SB in FIG. 26 indicates the number of viewpoint videos that need to be decoded before the picture is obtained. This also applies to the numeral attached to each of SI, SP, SB and SBr in FIGS. 27, 30 31, 32, 33 and 36.

For example, "0" in SI0 illustrated in FIG. 26 indicates that no other viewpoint video needs to be decoded, and "1" in SP1 indicates that one viewpoint video, namely the SI picture video, needs to be decoded. Also, "2" in SB2 indicates that two viewpoint videos, namely the SI picture video and an SP picture video, need to be decoded. Furthermore, as illustrated in the portion (ii) of FIG. 26, when the viewpoint video E is encoded as SBr2, picture videos SI, SP1 and SBr need to be decoded to obtain picture videos for viewpoint videos B, C and D. Thus, picture videos corresponding to these are represented as SB3.

Figure 28:
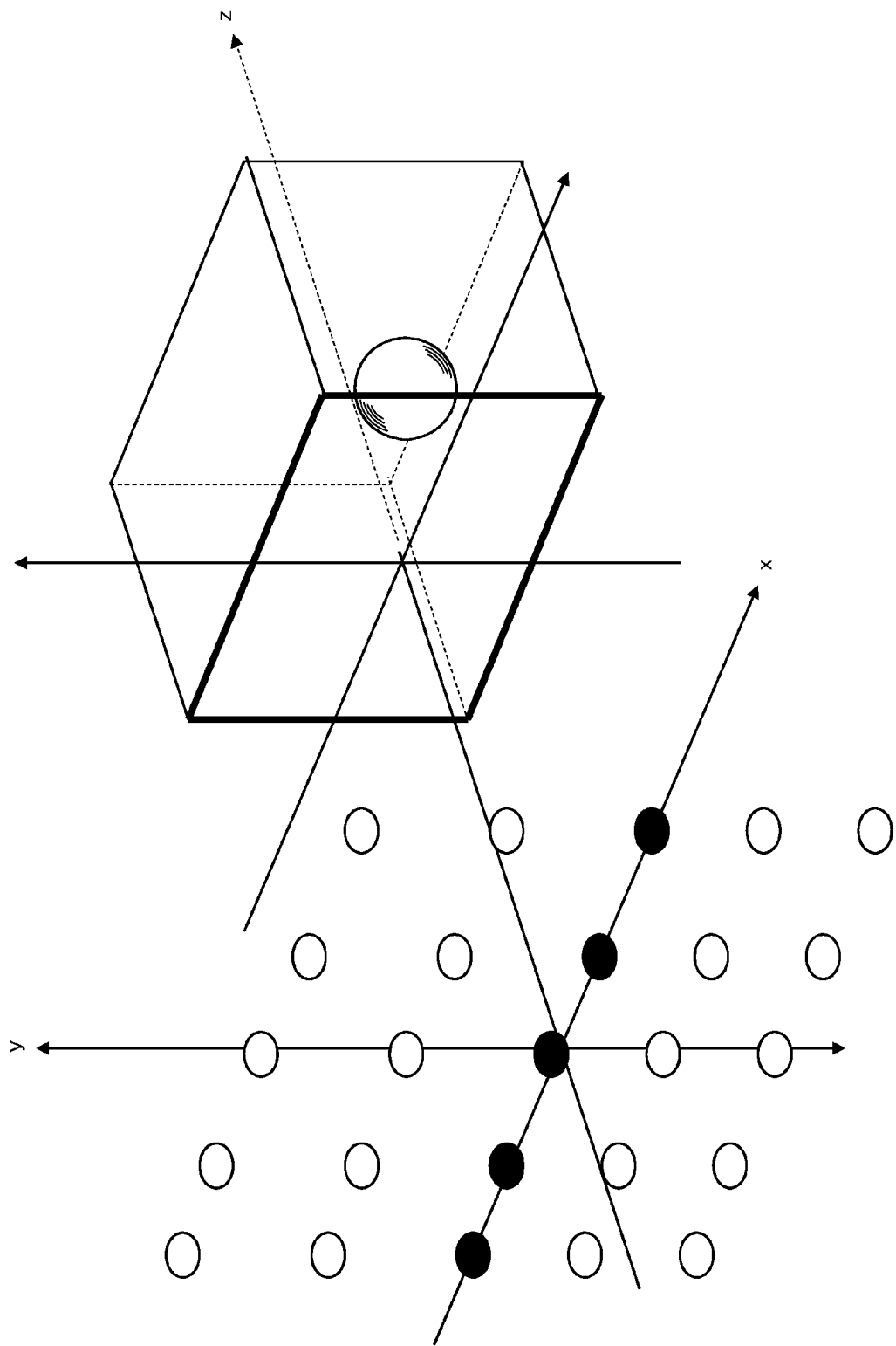
FIG. 28 is a conceptual diagram illustrating one example of viewpoint positions of viewpoint videos arranged in a two-dimensional matrix.

(2) In the above embodiment, an example case where viewpoint positions of the viewpoint videos are arranged on a straight line. However, the viewpoint positions are not limited to being on a straight line. The viewpoint positions may have any positional relationship. For example, as illustrated in FIG. 28, the viewpoint positions may be arranged in a two-dimensional matrix. The white and black circles arranged on an xy plane of FIG. 28 both indicate viewpoint positions. In particular, the black circles correspond to the viewpoint positions arranged on a straight line, which is explained in the above embodiment. As illustrated in FIG. 28, the horizontal direction is represented by the x axis, the vertical direction is represented by the y axis, and a direction extending from the center toward the object is represented by the z axis.

The MVC multi-view descriptor describes positional relationship among the viewpoint positions that are extended on the xy plane.

Figure 29:
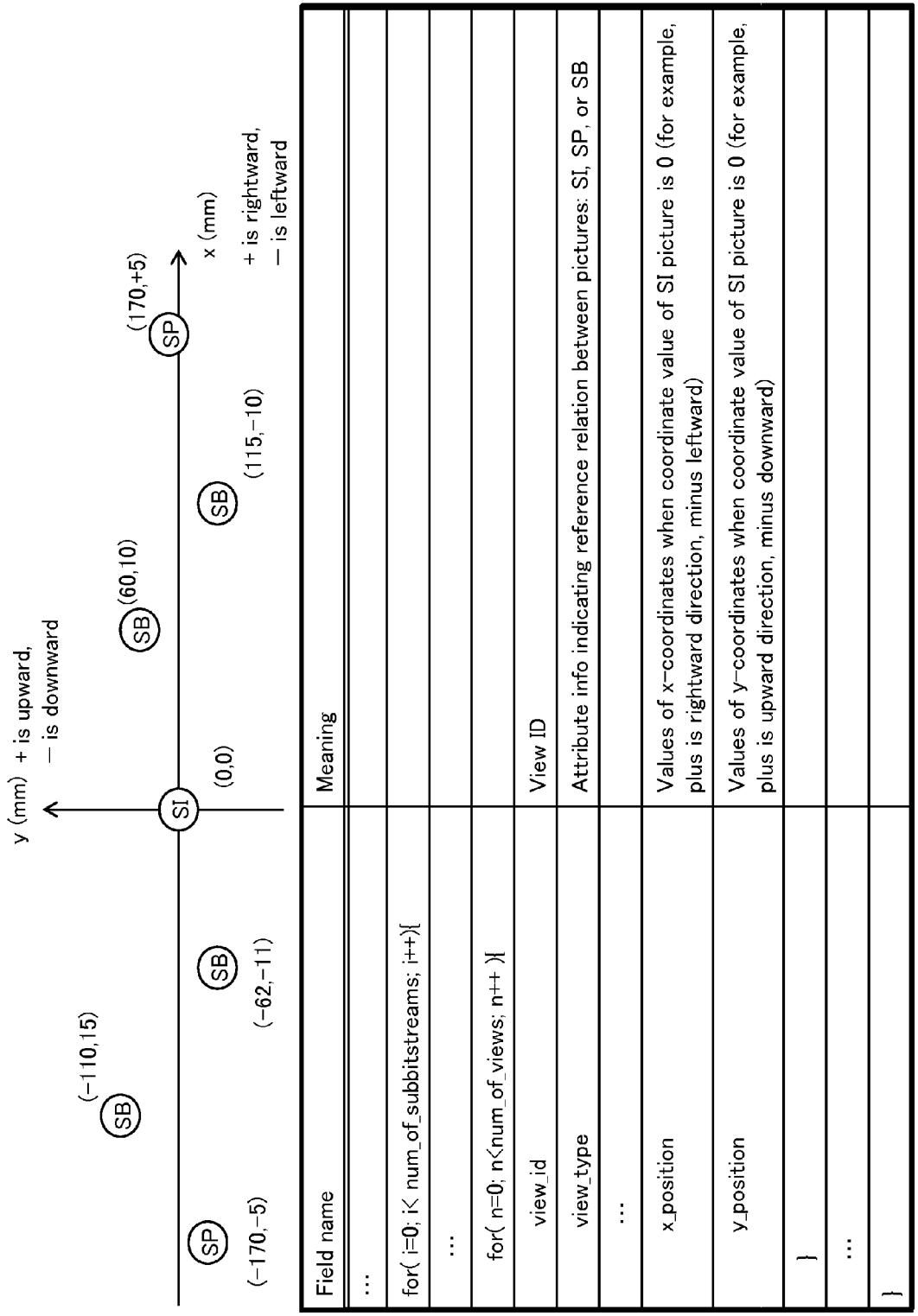
FIG. 29 illustrates a modification of the MVC multi-view descriptor.

FIG. 29 illustrates one example of the MVC multi-view descriptor that additionally includes information defining positional relationship among the viewpoint positions. Compared with the MVC multi-view descriptor illustrated in FIG. 16, x_position and y_position has been added in the MVC multi-view descriptor illustrated in FIG. 29.

The x_position is information indicating a coordinate value of a picture video in the x axis direction, when coordinate values of a viewpoint position of the SI picture video, which is the standard viewpoint, on the xy plane are represented as (x,y)=(0,0).

Similarly, the y_position is information indicating a coordinate value of the picture video in the y axis direction.

The playback device can recognize the positional relationship among the viewpoint positions by identifying the viewpoint positions on the xy plane by referencing the x_position and the y_position.

Note that the xy plane may be extended to a xyz space by adding z_position such that the viewpoint positions are arranged in a three-dimensional matrix. In the xyz space, the z_position is described in the same manner as the x_position and the y_position, wherein the direction extending from the center toward the object is a plus direction represented by the z axis, and coordinate values of the standard viewpoint position in the xyz space are represented as (x,y,z)=(0,0,0).

Figure 30:
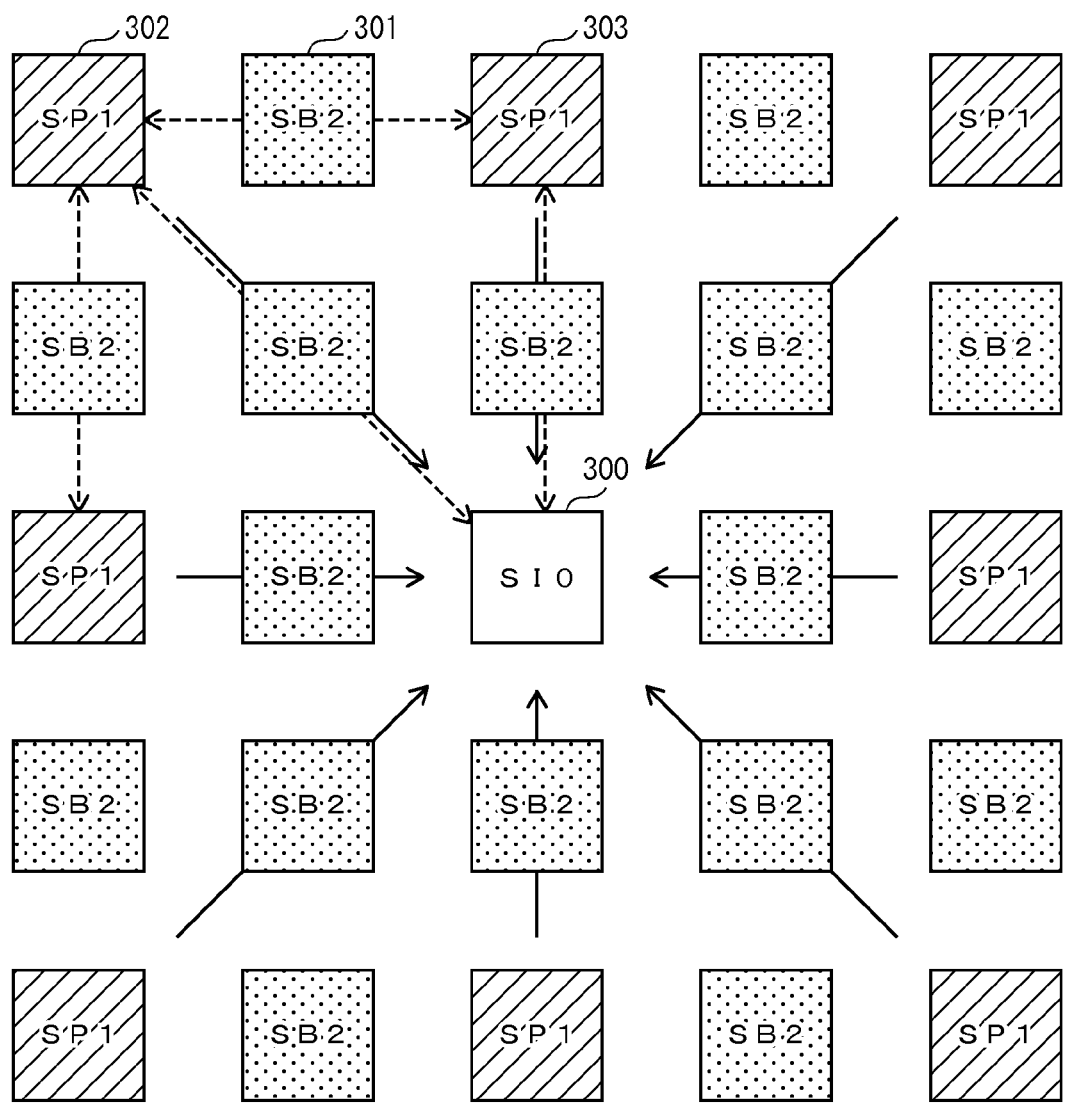
FIG. 30 is a conceptual diagram illustrating an example of the reference relation among viewpoint positions arranged in a two-dimensional matrix.

FIG. 30 schematically illustrates the reference relation among viewpoint videos when the viewpoint positions are arranged in a two-dimensional matrix. Each arrow in FIG. 30 indicates a reference relation where a viewpoint video at the tail of an arrow references a viewpoint video at the point of the arrow. Note that for the sake of simplicity, only part of the reference relation is represented by the arrows in FIG. 30.

In the example illustrated in FIG. 30, the viewpoint video 300 at the center is set as the standard viewpoint and encoded as an SI picture video. Also, viewpoint videos, which are respectively located farthest from the standard viewpoint in the vertical, horizontal, and diagonal directions, are encoded as SP picture videos. The viewpoint videos corresponding to the remaining viewpoint positions are encoded as SB picture videos by referencing the viewpoint videos indicated by the dashed arrows. For example, FIG. 30 indicates that a viewpoint video 301 is encoded as an SB picture video by referencing viewpoint videos 302 and 303 that are SP picture videos located on both sides of the viewpoint video 301.

Figure 31:
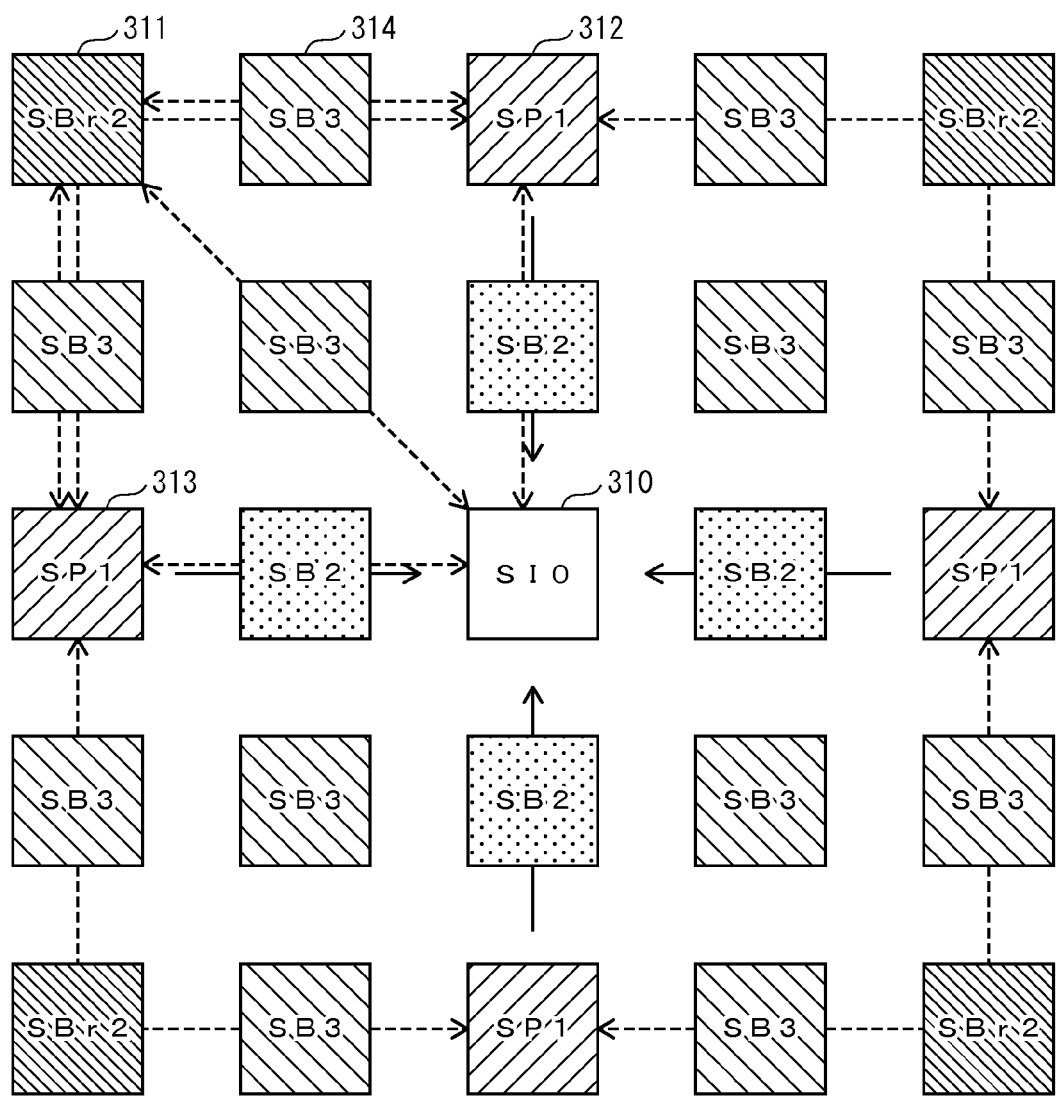
FIG. 31 is a conceptual diagram illustrating a first modification of the reference relation among viewpoint positions arranged in a two-dimensional matrix.

Also, the viewpoint videos may be encoded based on the reference relation illustrated in FIG. 31.

The reference relations illustrated in FIG. 31 and FIG. 30 differ as follows. That is to say, in FIG. 30, the viewpoint videos at the four corners in diagonal directions are encoded as SP picture videos, while in FIG. 31, the viewpoint videos at the four corners are encoded as SBr picture videos.

For example, a viewpoint video 311 is encoded as an SBr picture video by referencing viewpoint videos 312 and 313 that are SP picture videos. Also, a viewpoint video 314 is encoded as an SB picture video by referencing the viewpoint video 311, which is an SBr picture video, and the viewpoint video 312, which is an SP picture video. Encoding viewpoint videos as SBr picture videos instead of as SP picture videos makes it possible to further reduce the data amount.

Figure 32:
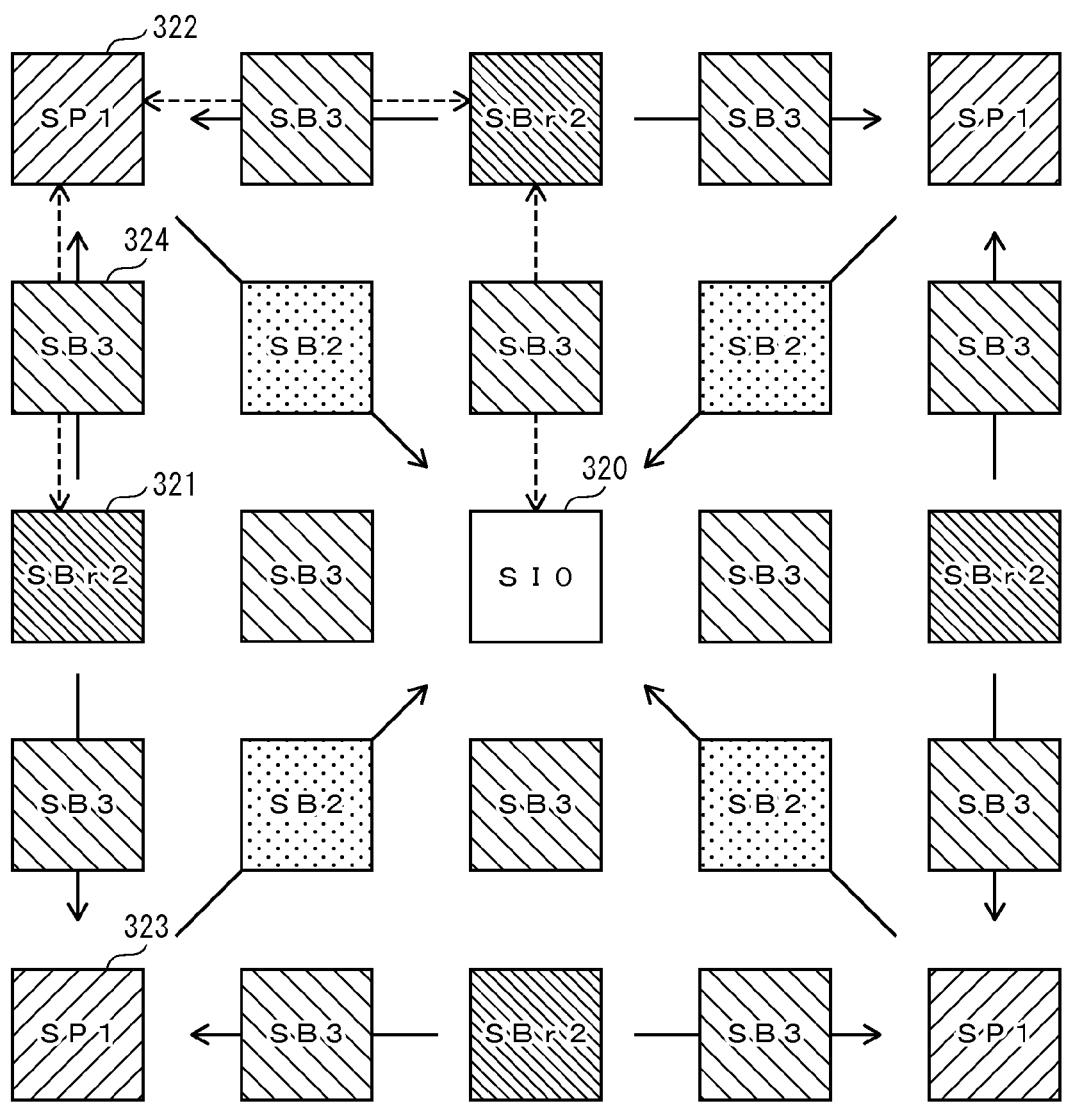
FIG. 32 is a conceptual diagram illustrating a second modification of the reference relation among viewpoint positions arranged in a two-dimensional matrix.

Also, the viewpoint videos may be encoded based on the reference relation illustrated in FIG. 32.

The reference relations illustrated in FIG. 32 and FIG. 30 differ as follows. That is to say, in FIG. 30, the viewpoint videos at the farthest viewpoint positions from the standard viewpoint in the horizontal and vertical directions are encoded as SP picture videos, while in FIG. 32, those viewpoint videos are encoded as SBr picture videos.

For example, a viewpoint video 321 is encoded as an SBr picture video by referencing viewpoint videos 322 and 323 that are SP picture videos. Also, a viewpoint video 324 is encoded as an SB picture video by referencing the viewpoint video 321, which is an SBr picture video, and the viewpoint video 322, which is an SP picture video.

As is the case with FIG. 31, encoding viewpoint videos as SBr picture videos instead of as SP picture videos makes it possible to further reduce the data amount.

Figure 33:
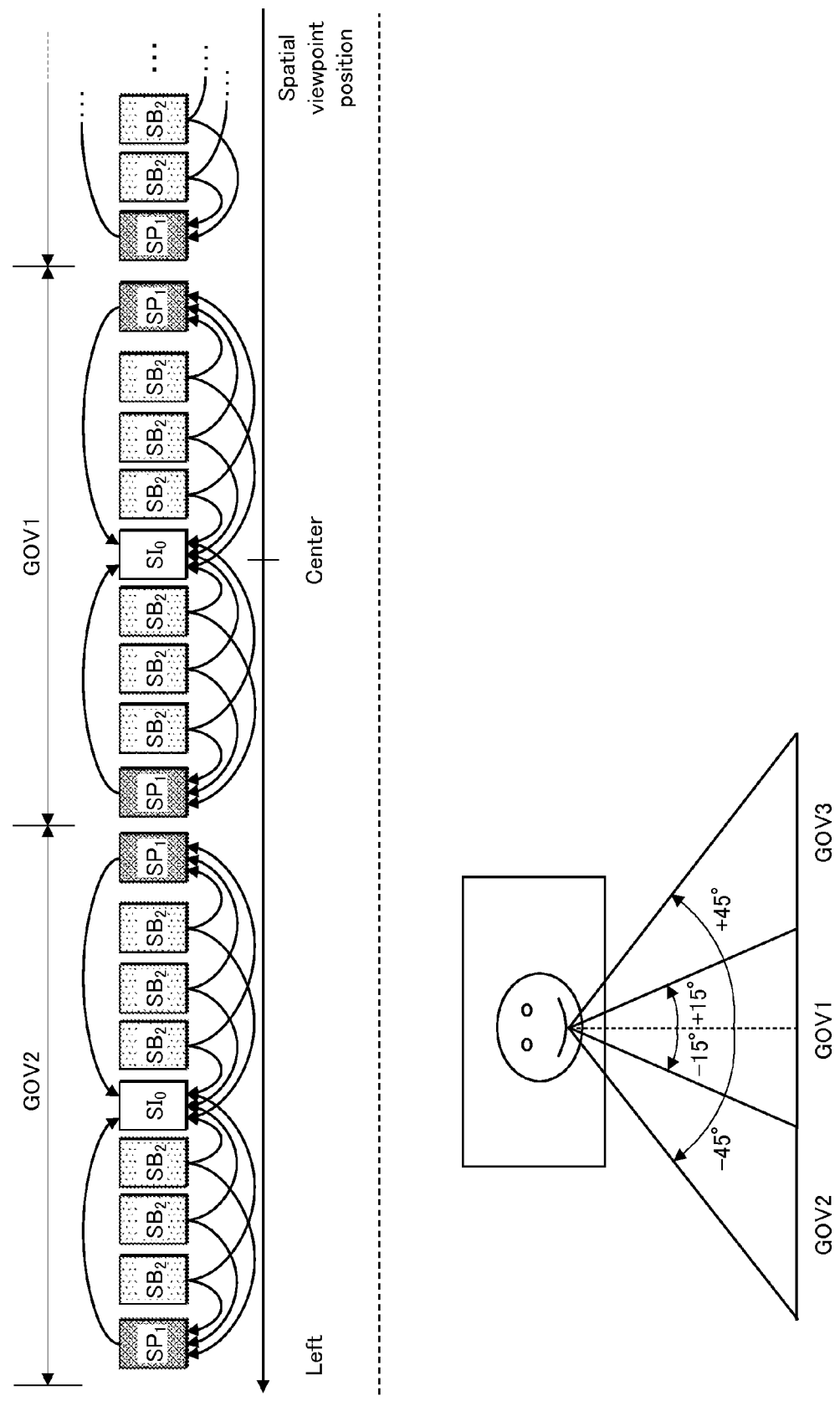
FIG. 33 is a conceptual diagram illustrating an example of dividing a plurality of viewpoint videos into a plurality of GOVs.

(3) In the above embodiment, the standard viewpoint is one viewpoint video. However, the number of standard viewpoints is not limited to one, but may be two or more. A plurality of standard viewpoints may be set. For example, as illustrated in FIG. 33, a plurality of viewpoint videos may be divided into a plurality of groups, and one standard viewpoint may be set for each of the groups. In that case, each picture is permitted to reference, by the inter-view reference, only pictures in the viewpoint videos of the same group, and is prohibited from referencing pictures in the viewpoint videos of the other groups. The above-described group of viewpoint videos is referred to as GOV (Group of Views).

In the example illustrated in FIG. 33, a group of viewpoint videos included in a range of angles from −15 to +15 degrees centering around the front of the object is denoted as GOV1, a group of viewpoint videos included in a range of angles from −15 to −45 degrees is denoted as GOV2, and a group of viewpoint videos included in a range of angles from +15 to +45 degrees is denoted as GOV3.

In each GOV, a viewpoint video at the center is defined as a viewpoint video of the standard viewpoint, and the viewpoint videos are encoded in each GOV. Furthermore, different transport streams are generated in correspondence with respective GOVs. In this way, it is possible to reduce the number of viewpoint videos included in one transport stream by dividing a plurality of viewpoint videos into a plurality of groups. That is to say, it is possible to reduce the amount of data included in one transport stream. With this structure, the playback device only needs to decode and play back a transport stream that corresponds to a GOV containing a viewpoint video of a viewpoint position to be played back.

(4) In the above embodiment, encoding is performed by fixing the standard viewpoint to a viewpoint video. However, the standard viewpoint does not need to be fixed to a viewpoint video. The standard viewpoint may be changed from a viewpoint video to another viewpoint video among a plurality of viewpoint videos, in the middle of encoding.

Figure 34:
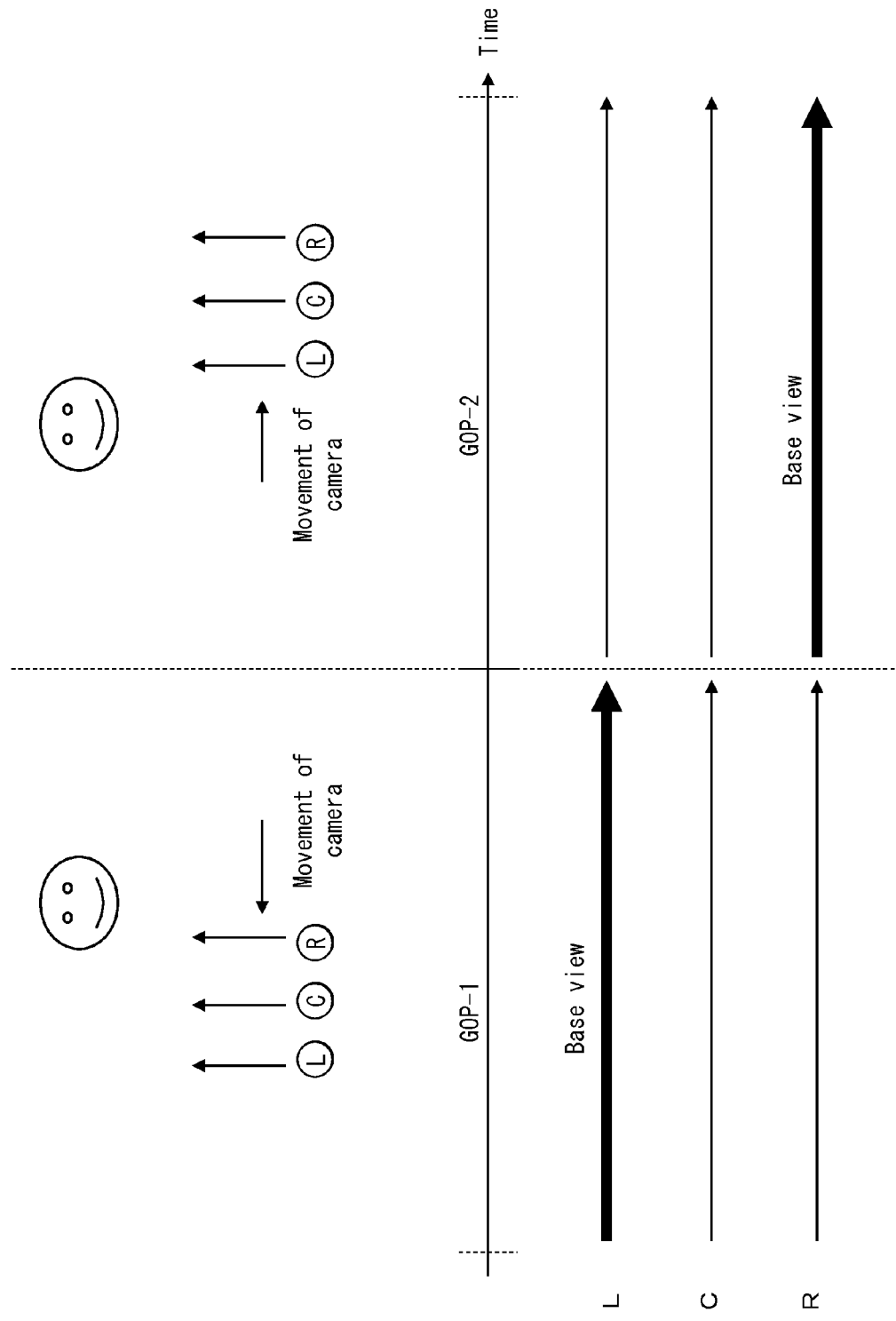
FIG. 34 is a conceptual diagram illustrating an example of a case where the standard viewpoint is changed.

FIG. 34 schematically illustrates a case where the standard viewpoint is changed from a viewpoint video to another viewpoint video in the middle of encoding.

In the example illustrated in FIG. 34, viewpoint videos L, C and R are shot at the same time by three cameras fixed at left, center and right positions (L, C and R cameras), respectively. FIG. 34 indicates that a video shot while all the cameras are panning leftward continues to a video shot while all the cameras are panning rightward.

In the case where a video is shot while all the cameras are being panned leftward, an image shot by the L camera is shot by the C and R cameras with some delays. Therefore, when the viewpoint video L is encoded as a viewpoint video of the standard viewpoint, and the viewpoint videos C and R are encoded by referencing the encoded viewpoint video, the whole encoding compression efficiency is, in general, higher than the case where the viewpoint video C or R is encoded as a viewpoint video of the standard viewpoint and the othere viewpoint videos are encoded by referencing the encoded viewpoint video. Conversely, in the case where a video is shot while all the cameras are being panned rightward, it is preferable that the viewpoint video R is encoded as a viewpoint video of the standard viewpoint. Thus, when the base view is generated by encoding the viewpoint video of the standard viewpoint by switching the viewpoint video of the standard viewpoint from the viewpoint video L to the viewpoint video R at the timing when the movement of the camera changes, the total data amount of the whole viewpoint videos is further reduced.

Furthermore, the encoding may be performed such that encoded data is stored in the same GOP while the same standard viewpoint is used, and encoded data is stored in a different GOP when the standard viewpoint is changed. In that case, information indicating that the viewpoint video is the standard viewpoint may be described in the supplementary data of AU which is obtained when a viewpoint video of the standard viewpoint is encoded. The playback device can recognize the viewpoint video of the standard viewpoint encoded as the base view, by referencing the information described in the supplementary data.

(5) In the above embodiment, the playback device determines the reference relation between the base view and the dependent view based on the view_ids described in the view_ids_refers_to_this_view[ ] and the view_ids_referred_to_by_this_view[ ] in the MVC multi-view descriptor. Information used to verify whether or not the reference relation is correct may further be added so that the playback device can verify whether or not the reference relation described in the view_ids in the MVC multi-view descriptor is correct.

This will be described taking as an example a case where a base view A1 and a dependent view A2 have been obtained by compress-encoding a series of viewpoint videos of two viewpoints, and a base view B1 and a dependent view B2 have been obtained by compress-encoding another series of viewpoint videos of two viewpoints in the same condition. When a stream containing the above views is distributed, a bit corruption may occur during a communication depending on the communication condition. When such a bit corruption occurs to a portion corresponding to description of the reference relation in the descriptor, it may be interpreted that the dependent view B2 references the base view A1. In that case, the playback device cannot judge whether or not the reference relation is correct, and the decoding process itself is performed normally based on the reference relation described there. However, a picture obtained by performing the decoding process based on the wrong reference relation may not be a picture of an originally intended viewpoint.

Figure 35:
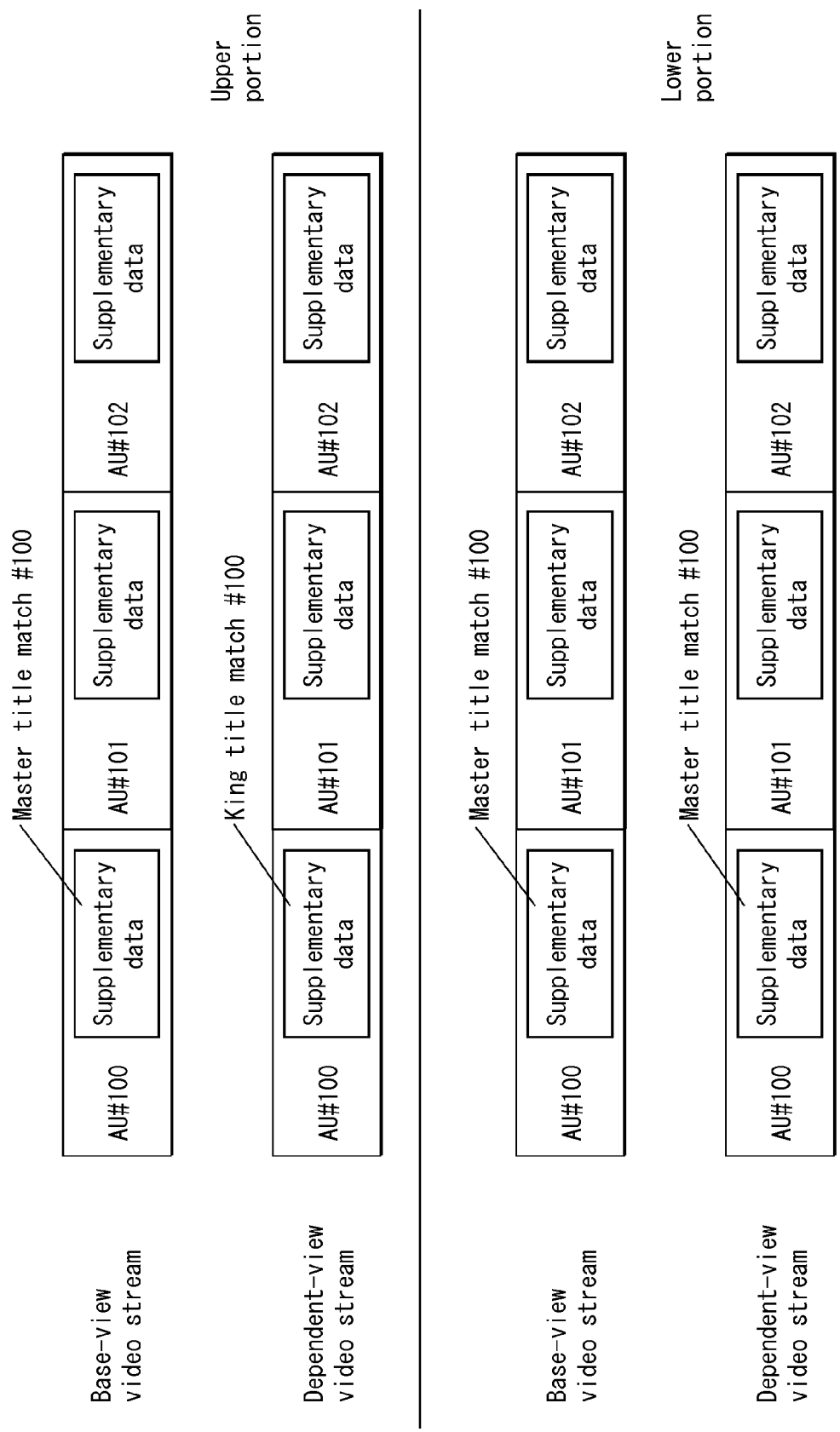
FIG. 35 is a conceptual diagram illustrating an example of supplementary data used for the verification of the reference relation between the base view and the dependent view.

In view of this, as illustrated in FIG. 35, for the verification of the reference relation between the base-view video stream and the dependent-view video stream, information identifying an AU may be stored in the supplementary data of each AU, for example. In the example of FIG. 35, a title name and an AU serial number (for example, "#100" denotes the $100^{th}$ AU) are stored in the supplementary data.

When decoding a picture of the dependent-view video stream, the playback device references the supplementary data in the AU of the base-view video stream having the same AU number, and compares the description thereof with the description of the supplementary data in the AU of the decoding target picture of the dependent-view video stream, thereby judging whether or not the reference relation is correct. In the upper portion of FIG. 35, the title name described in the supplementary data in the $100^{th}$ AU of the dependent-view video stream is "King title match"; and the title name described in the supplementary data in the $100^{th}$ AU of the base-view video stream, which is referenced by the dependent-view video stream, is "Master title match". Since the title names do not match, the playback device judges that the referenced video stream is wrong. In that case, the playback device may not decode the dependent-view video stream and display a message to the user that the dependent-view video stream is not decoded, or may play back only the base-view video stream, for example.

(6) In the above-described embodiment, in one example of the playback process performed by the playback device, a viewpoint video closest to the user viewpoint is decoded and played back. However, the video to be played back is not limited to the viewpoint video closest to the user viewpoint. A video at a certain viewpoint position may be generated by interpolation by using a viewpoint video that is closest to the user viewpoint, and the generated video may be played back.

For example, in the example illustrated in FIG. 7, a video at the user viewpoint X is generated by referencing pictures that are obtained by decoding the viewpoint videos "a" and "b", which are viewpoint videos at two viewpoint positions that are closest to the user viewpoint X, among a plurality of viewpoint positions sandwiching the user viewpoint X. As one example of the method for generating a video at the user viewpoint by interpolation, a technology using the depth map of viewpoint videos is known. According to the method of using the depth map, first the depth maps of the respective viewpoint videos are generated by extracting the correspondence between the features of the object in the two viewpoint videos, and calculating the depths the features by using the disparity information or the like. Subsequently, for example, a ratio of the distances between the target video and the two viewpoint positions is obtained by internally dividing the distance between the two viewpoint positions by the viewpoint position of the target video based on the depth maps and information of two viewpoint positions, and the shift amount of the object in the target video is calculated based on the obtained ratio of the distances between the target video and the two viewpoint positions. Lastly, the video at the user viewpoint is generated by shifting the object in each of the viewpoint videos in accordance with the calculated shift amount.

Furthermore, when the user viewpoint is moving from the standard viewpoint A leftward, the video at the user viewpoint may be generated not by using viewpoint videos at the two viewpoint positions which are closest to the user viewpoint among a plurality of viewpoint sandwiching the user viewpoint, but by using an SI picture video and an SP picture video sandwiching the user viewpoint obtained by encoding respective viewpoint videos.

Figure 36:
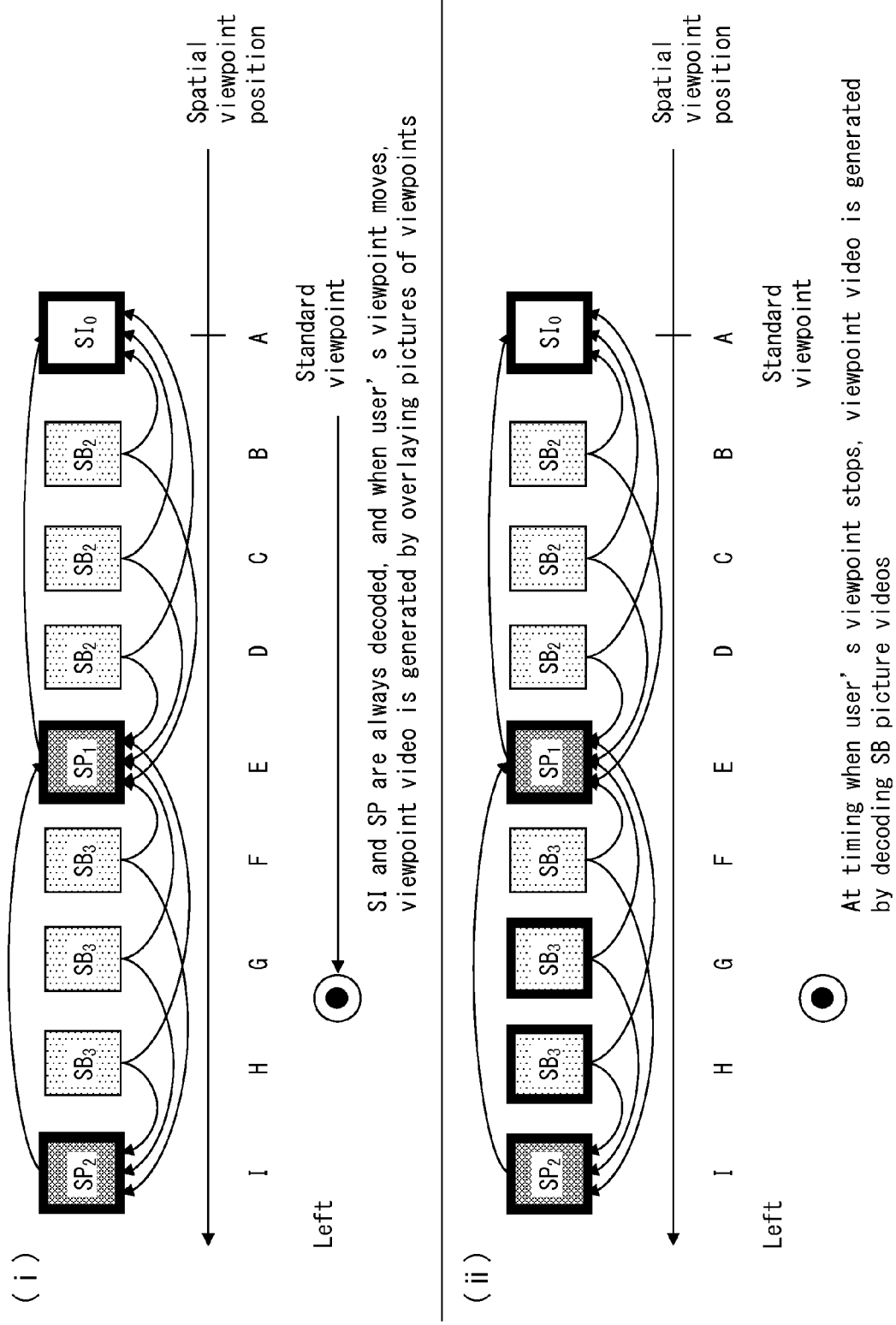
FIG. 36 is a conceptual diagram illustrating one example of viewpoint videos used when a video shot at the viewpoint position of the user is generated: (i) illustrating the case where the user viewpoint position is moving; and (ii) illustrating the case where the user viewpoint position is not moving.

The portion (i) of FIG. 36 illustrates the case where the user viewpoint moves from the standard viewpoint A to a viewpoint position between the viewpoint videos G and H.

Originally, a video of the user viewpoint is generated by using SB picture videos of the viewpoint videos B and C when the user viewpoint, while moving, is at a position between the viewpoint videos B and C. However, to decode the SB picture videos of the viewpoint videos B and C, first an SI picture video of the viewpoint video A and an SP picture video of the viewpoint video E need to be decoded, and then the SB picture videos need to be decoded and played back. Also, when the user viewpoint is moving, the time period for which the user viewpoint is positioned between the viewpoint videos B and C is considered to be short. Thus the viewpoint video to be used to generate the video of the user viewpoint must be changed in a short time period. This imposes a heavy load on the playback device performing the decoding process.

In view of this, during the process of generating a video of a user viewpoint while the user viewpoint is moving, the video of the user viewpoint may be generated by using the SI picture video of the viewpoint video A and the SP picture video of the viewpoint video E. Also, when the user viewpoint further moves and is positioned between the viewpoint positions E and I, the video of the user viewpoint may be generated by using the SP picture videos of the viewpoint videos E and I. This reduces the load imposed on the playback device since the process of decoding the SB picture videos can be omitted.

Subsequently, when no movement of the user viewpoint is detected, the video of the user viewpoint can be generated by using the picture videos of two viewpoint videos that are closest to the user viewpoint, among a plurality of viewpoint positions sandwiching the user viewpoint. The portion (ii) of FIG. 36 illustrates the case where the user viewpoint stays at a position between the viewpoint videos G and H. In this case, the video of the user viewpoint is generated by using pictures that are obtained by decoding the SB picture videos of the viewpoint videos G and H.

Furthermore, a viewpoint video generated by interpolation is not limited to a 2D viewpoint video.

Different viewpoint videos may be generated respectively for the left-eye and right-eye viewpoint positions, and the generated viewpoint videos may be played back as a 3D stereoscopic video.

FIG. 37 illustrates one example of the distance between viewpoint positions of viewpoint videos to be encoded when viewpoint videos are generated respectively for the left eye and right eye.

Generally, the distance between human eyes is approximately 6 cm. In view of this, when the distance between viewpoint positions of viewpoint videos is (for example, 4 cm) smaller than 6 cm, the viewpoint videos A and B need to be decoded to generate the viewpoint video for the left eye and the viewpoint videos C and D need to be decoded to generate the viewpoint video for the right eye, depending on the user position, as illustrated in the portion (i) of FIG. 37. That is say, up to four different viewpoint videos need to be decoded depending on the user viewpoint position. On the other hand, when the distance between viewpoint positions of viewpoint videos is (for example, 7 cm) slightly larger than 6 cm, the viewpoint video for the left eye can be generated by using the viewpoint videos A and B and the viewpoint video for the right eye can be generated by using the viewpoint videos B and C, as illustrated in the portion (ii) of FIG. 37. That is to say, regardless of where the user viewpoint position is, the viewpoint videos for the left and right eyes can be generated by decoding up to three viewpoint videos of different viewpoint positions. By encoding the viewpoint videos with the above distance therebetween, the number of viewpoint videos to be decoded by the playback device is decreased. This reduces the load on the playback device.

Meanwhile, when the distance between viewpoint videos is too large, it is difficult to generate an interpolation video accurately due to a large difference between the viewpoint videos. It is thus desirable that the distance between viewpoint positions of viewpoint videos to be encoded is larger than an assumed distance between left and right eyes (for example, 6 cm) and smaller than double the assumed distance between left and right eyes (for example, 12 cm).

Figure 27:
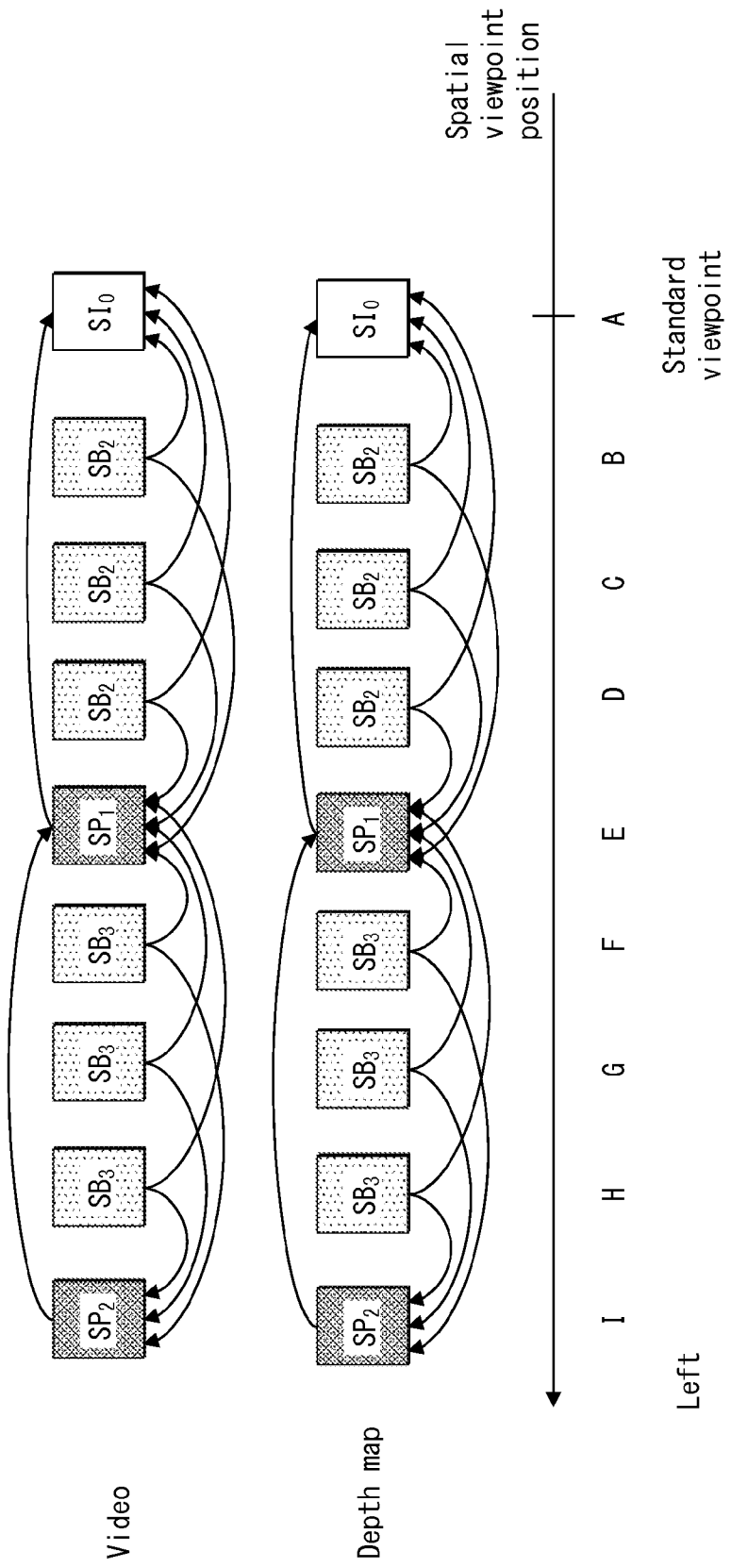
FIG. 27 illustrates reference relation between viewpoints of viewpoint videos, and reference relation between viewpoints of depth maps of the respective viewpoint videos.

(7) When encoding a plurality of viewpoint videos, the encoding device 2600 may generate a plurality of depth maps in one-to-one correspondence with the plurality of viewpoint videos. When encoding depth maps, the encoding device 2600 references depth maps at viewpoint positions that were referenced when the viewpoint videos were encoded, as illustrated in FIG. 27. The encoding device 2600 then may generate a multi-view video stream by multiplexing including the stream data of the generated depth maps.

When a video of the user viewpoint is generated by interpolation by using depth maps as described in the above (6), a transport stream, which includes a multi-view video stream including depth maps encoded by the encoding device 2600 in correspondence with respective viewpoint videos, may be distributed. With this structure, the playback device 2800, upon receiving the transport stream, can omit the process of generating the depth maps. This reduces the load on the playback process.

(8) In the above embodiment, the playback device 2800 includes three TBs, three MBs and three EBs. However, the number of TBs, MBs or EBs is not limited to three. The number of TBs, MBs or EBs may be increased or decreased based on the number of views included in a transport stream. For example, when the number of TBs, MBs or EBs is increased, the number of views that can be processed at the same time can be increased.

(9) In the above embodiment, the description is provided on an assumption that viewpoint positions of a plurality of viewpoint videos are arranged at regular intervals. However, the intervals between viewpoint positions of viewpoint videos are not limited to regular intervals. The distance between each pair of adjacent viewpoint videos may not be constant.

For example, the intervals between viewpoint positions of viewpoint videos may be reduced in the surrounding area of a viewpoint position that is assumed to be mainly viewed by the user (for example, a viewpoint position corresponding to the front of the monitor screen), and increased in areas located away from the viewpoint position that is assumed to be mainly viewed by the user. That is to say, it is possible to play back video accurately by encoding a larger number of viewpoint videos of viewpoint positions in the surrounding area of a viewpoint position which the provider of the multi-viewpoint video assumes to be mainly viewed by the user.

(10) In the above embodiment, it is assumed that the conditions pertaining to the image quality of each of a plurality of viewpoint videos (for example, resolution) are the same. However, the conditions pertaining to the image quality may be different among the plurality of viewpoint videos.

For example, a lower resolution may be assigned to viewpoint videos at viewpoint positions other than the surrounding of a viewpoint position that is assumed to be mainly viewed by the user (for example, a viewpoint position corresponding to the front of the monitor screen). When the resolution is lowered in the case where there are a plurality of viewpoint videos in the horizontal direction, it is preferable that the resolution in the horizontal direction of the screen is lowered. This is because, when the viewpoint position moves in the horizontal direction, the vertical change of the object is small among the plurality of viewpoint videos, and the object viewed from a position that is distanced away horizontally from the front position is a horizontally compressed image, thus even if the resolution is lowered, the viewer has a feeling of less strangeness. Lowering the resolution of the viewpoint video as above reduces the total data amount.

(11) In the above embodiment, the MVC Stereo 3D descriptor and the MVC Stereo 3D stream descriptor are described in the PMT. However, the location where these information is described is not limited to the PMT. The MVC Stereo 3D descriptor and the MVC Stereo 3D stream descriptor may be described in any other place as far as they are described in the distributed stream. For example, all or part of these information may be stored in a system packet or supplementary data of each video stream or the like, not in the PMT packet.

(12) In the above embodiment, the SP picture type is defined as a picture that is obtained by encoding a picture by referencing a picture of one other view, and the SB picture type is defined as a picture that is obtained by encoding a picture by referencing pictures of two other views. However, definition of picture types is not limited to this.

The SI, SP and SB pictures may be defined as illustrated in FIG. 52. The upper portion of FIG. 52 illustrates the reference relation among a plurality of views, and the arrows indicate the reference relation among pictures. For example, the picture at the position E is referencing the picture at the position A. The picture at the position C is referencing the pictures at the positions A and E. Here, the arrows in the middle portion of FIG. 52 represent reference space vectors. The reference space vector is a directional vector extending from a point toward a reference picture that is used when a picture at the point is encoded. For example, the thick solid arrow line in the middle portion of FIG. 52 represents a reference space vector extending from a picture at the point E. Also, the dotted arrow lines in the middle portion of FIG. 52 represent reference space vectors extending from a picture at the point C. The SP and SB pictures may be defined by using the above-described reference space vectors.

That is to say, the SP picture may be defined as "a picture that references other views in a space, and has one direction for the reference space vector"; and the SB picture may be defined as "a picture that references other views in a space, and has two directions for the reference space vector". Based on the above definition, the picture at the point E is identified as an SP picture since the reference space vector represented by the thick solid arrow line in the middle portion of FIG. 52 has one direction; and the picture at the point C is identified as an SB picture since the reference space vectors represented by the dotted arrow lines in the middle portion of FIG. 52 have two directions.

In the case of the above definition, there is no limit to the number of pictures referenced by an SP picture. For example, the SP picture at the point I may reference the SP picture at the point E, as well as the SI picture at the point A. In the case of this structure, the SP picture has two reference space vectors, but they are extending in the same direction. Note that, to judge whether or not two reference space vectors have the same direction, the angle between the vectors may be calculated. It may be judged that the vectors have the same direction when the angle therebetween is 0 degree, or when, for example, the angle therebetween is in a range from −10 to +10 degrees.

Furthermore, a restriction may be imposed that a SB picture video cannot reference a picture video that is located farther away therefrom than an SI or SP picture video that is closest thereto in the space. For example, in the case of the upper portion of FIG. 52, SI and SP picture videos closest to the point C on the left and right sides thereof are the SI picture video at the point A and the SP picture video at the point E. Thus the SB picture at the point C should not reference a picture video that spatially exceeds these picture videos, such as the SP picture video at the point I. By imposing this restriction, it is possible to prevent a picture from referencing another picture that is located far away from the picture, and reduce the load on the playback device.

(13) A control program that causes an encoding device or a playback device to execute the processes (processes illustrated in FIGS. 19 and 21) described in the above embodiment may be recorded on a recording medium and distributed in that form or via any of various types of communication paths. Such recording mediums include an IC card, a hard disk, an optical disc, a flexible disc, a ROM, and a flash memory. The control program distributed as such may be stored in a memory or the like that can be read by the processor of the device for use, and the functions described in the embodiment are realized when the processor executes the control program.

(14) A part or all of the following structural elements of the encoding device may be realized as one or more integrated circuits on one chip or a plurality of chips, or as computer program, or in any other form: control unit 2601, base-view video encoder 2602, dependent-view video encoder 2603, video decoder 2605, base-view video stream generating unit 2611, dependent-view video stream generating unit 2612, PMT generating unit 2613, multiplexer 2614, and transport stream output unit 2615.

Also, a part or all of the following structural elements of the playback device may be realized as one or more integrated circuits on one chip or a plurality of chips, or as computer program, or in any other form: user position obtaining unit 2801, view video stream determining unit 2802, multi-view video decoder 2822, and audio decoder 2824.

(15) The present invention may be any combination of the above-described embodiment and modifications.

3. Supplementary Notes

The following further describes an encoding device and a decoding device as embodiments of the present invention and the modifications and effects thereof.

(a) An aspect of the present invention is an encoding device for generating a video stream by encoding a plurality of frame image groups which represent a plurality of scenes respectively viewed from a plurality of viewpoints over a predetermined time period, the encoding device comprising: an input unit configured to receive the plurality of frame image groups; a base view encoding unit configured to set one of the plurality of frame image groups as a frame image group of a standard viewpoint, and generate a base-view video stream by encoding the frame image group of the standard viewpoint without using, as a reference image, any frame image of a viewpoint other than the standard viewpoint; a first dependent view encoding unit configured to generate a first-type dependent-view video stream by encoding a frame image group of a first-type viewpoint by using, as a reference image, a frame image of a same time of the base-view video stream or of another first-type dependent-view video stream, the first-type viewpoint being positioned such that at least one viewpoint is present between the first-type viewpoint and the standard viewpoint; a second dependent view encoding unit configured to generate a second-type dependent-view video stream by encoding a frame image group of a second-type viewpoint by using, as reference images, frame images of a same time of two viewpoints sandwiching the second-type viewpoint, the second-type viewpoint being neither the standard viewpoint nor the first-type viewpoint; and a video stream output unit configured to output the base-view video stream, the first-type dependent-view video stream, and the second-type dependent-view video stream.

In the above description, a "frame image" means to be not only one of images constituting a frame, but also one of images constituting a field.

With the above structure, when encoding, as a dependent view, a viewpoint video sandwiched by two different viewpoint videos, the encoding device can reference frame images of the two viewpoint videos sandwiching the viewpoint video. This makes it possible to generate a video stream that enables the amount of data of the whole video streams to be reduced when encoding a multi-viewpoint video.

(b) In the above-described encoding device, the two frame images used as the reference images by the second dependent view encoding unit may correspond respectively to the standard viewpoint and the first-type viewpoint, or to two different first-type viewpoints.

With the above structure, when the second-type dependent-view video stream is generated, frame images respectively corresponding to the standard viewpoint and the first-type viewpoint are used as the reference images. It is thus possible to generate the second-type dependent-view video stream based on (i) a viewpoint video that can be decoded independently without referencing other viewpoint videos, and (ii) a viewpoint video that can be decoded by referencing one other viewpoint video.

(c) In the above-described encoding device, the two frame images used as the reference images by the second dependent view encoding unit may correspond respectively to two viewpoints that satisfy a condition that the two viewpoints and the second-type viewpoint are arranged on a straight line.

With the above structure, (i) the viewpoint position of the viewpoint video of the second-type viewpoint and (ii) the two viewpoints of the referenced viewpoint videos are both on a straight line, and the two viewpoints of the referenced viewpoint videos sandwich the viewpoint position of the second-type viewpoint.

It is thus possible to encode the viewpoint video of the second-type viewpoint by referencing the frame images of two viewpoint videos that are respectively located on both sides of the encode-target viewpoint video on the straight line. This makes it possible to encode the viewpoint video with a high compression rate.

(d) In the above-described encoding device, the two frame images used as the reference images by the second dependent view encoding unit correspond respectively to two viewpoints that satisfy a condition that the two viewpoints are arranged in two different directions from the second-type viewpoint and are each closest to the second-type viewpoint among one or more viewpoints arranged in each of the directions.

With the above structure, the viewpoint positions of the viewpoint videos that are referenced when a viewpoint video of the second-type viewpoint is encoded are frame images of the two viewpoint videos at the viewpoint positions that are arranged in two different directions from the second-type viewpoint and are each closest to the second-type viewpoint. This makes it possible to perform encoding by using frame images of viewpoint videos that are considered to have the highest correlation with the frame image of the encoding-target viewpoint video, among a plurality of viewpoint videos. This makes it possible to encode the viewpoint video with a high compression rate.

(e) In the above-described encoding device, the input unit may receive a plurality of frame image groups which correspond one-to-one to a plurality of viewpoints that are arranged on a straight line, the base view encoding unit may generate the base-view video stream by encoding a predetermined frame image group among the plurality of frame image groups, the predetermined frame image group corresponding to the standard viewpoint which, among the plurality of viewpoints, has the smallest value of a difference between distances from a viewpoint to two viewpoints at opposite ends of the straight line, and the first dependent view encoding unit may generate the first-type dependent-view video stream for each of the two viewpoints at opposite ends of the straight line by encoding each frame image constituting, among the plurality of frame image groups, frame image groups that respectively correspond to the two viewpoints at opposite ends of the straight line, by using, as a reference image, a corresponding frame image of the base-view video stream.

With the above structure, the encoding device generates the base view by encoding a viewpoint video which is, among a plurality of viewpoint videos arranged on a straight line, in the vicinity of the center and is set as the standard viewpoint, and generates the first-type dependent views by encoding viewpoint videos at the viewpoints that are farthest from the standard viewpoint in the opposite directions from the standard viewpoint respectively.

This makes it possible to generate a video stream that enables the amount of data of the whole multi-view video stream to be reduced.

(f) In the above-described encoding device, the input unit may receive a plurality of frame image groups which correspond one-to-one to a plurality of viewpoints that are arranged at regular intervals in a two-dimensional matrix on a plane with the standard viewpoint at the center of the matrix, a normal vector being defined to be a vector extending from the standard viewpoint in a direction of a view line, the first dependent view encoding unit may encode each frame image constituting, among the plurality of frame image groups, first-type frame image groups that respectively correspond to first-type viewpoints that are located farthest from the standard viewpoint in upward, downward, leftward, rightward, and oblique directions, by using, as a reference image, each frame image of a same time of the standard viewpoint, and the second dependent view encoding unit may encode each frame image constituting, among the plurality of frame image groups, all frame image groups corresponding to viewpoints excluding the standard viewpoint and the first-type viewpoints, by using, as reference images, frame images of a same time of respective frame image groups of viewpoints that are sandwiched by the standard viewpoint and the first-type viewpoints.

With the above structure, the encoding device generates a multi-view video stream composed of viewpoint videos corresponding one-to-one to viewpoints arranged in a two-dimensional matrix.

The encoding device thus can generate a multi-view video stream in response to the user viewpoint position moving vertically, as well as horizontally.

(g) The above-described encoding device may further comprise a depth map generating unit configured to generate a depth map indicating, in units of pixels, depths of the plurality of frame image groups that correspond one-to-one to the plurality of viewpoints.

With the above structure, when encoding a viewpoint video, the encoding device generates a depth map of the viewpoint video as well.

This enables the playback device to use depth information provided in a depth map when it plays back a 3D video at a viewpoint, thereby reducing the load of the process of generating the 3D video at the viewpoint.

(h) In the above-described encoding device, the base view encoding unit may encode the predetermined frame image group, which corresponds to the standard viewpoint, in conformance with a base view defined in MPEG-4 MVC, the first dependent view encoding unit may encode the first-type frame image group in conformance with a dependent view defined in the MPEG-4 MVC, and the second dependent view encoding unit may encode the second-type frame image group in conformance with the dependent view defined in the MPEG-4 MVC, and generates a video stream having a syntax that has been extended in conformance with the MPEG-4 MVC to describe information indicating two viewpoints that are referenced when the second-type frame image group is encoded.

With the above structure, the encoding device compress-encodes viewpoint videos at a plurality of viewpoint positions in conformance with the MPEG-4 MVC.

This makes it possible to generate a video stream with a reduced amount of data, compared with the case where the video stream is generated by encoding a plurality of viewpoint videos independently.

(i) The above-described encoding device may further comprise a standard viewpoint changing unit configured to change the standard viewpoint from a viewpoint to another viewpoint among the plurality of viewpoints at predetermined intervals in accordance with a change in contents of frame images of each viewpoint over time With the above structure, the encoding device performs the encoding by changing the standard viewpoint from a viewpoint to another viewpoint at predetermined intervals of time. It is accordingly possible to select, as the standard viewpoint at each interval, a viewpoint video that enables the amount of data of the whole viewpoint videos to be reduced.

(j) In the above-described encoding device, the base view encoding unit, the first dependent view encoding unit, and the second dependent view encoding unit may change GOPs (Groups Of Pictures) to which encoded frame images are stored, each time the standard viewpoint changing unit changes the standard viewpoint from a viewpoint to another viewpoint, the GOPs being included in the video stream.

With the above structure, the encoding device encodes frame image groups by using different standard viewpoints, and includes the encoded frame image groups into different GOPs of the video stream.

This makes it possible to manage, in units of GOPs, a plurality of portions in a video stream that have been encoded by using different standard viewpoints, and thus generate a video stream that reduces the load on the playback device in performing the decoding for a special playback such as a direct playback.

(k) The above-described encoding device may further comprise: a multi-view video stream generating unit configured to generate a multi-view video stream by using the base-view video stream, the first-type dependent-view video stream, and the second-type dependent-view video stream; a stream reference information generating unit configured to generate stream reference information for each of a plurality of video streams, the stream reference information indicating reference relation among the plurality of video streams; and a stream transmitting unit configured to transmit a transport stream in which the multi-view video stream and the stream reference information are multiplexed.

With the above structure, the encoding device outputs a transport stream in which a plurality of video streams, which have been obtained by encoding a plurality of viewpoint videos, are multiplexed.

It is thus possible to distribute, via broadcast waves or the like, a transport stream including a plurality of encoded viewpoint videos of viewpoint positions.

(1) Another aspect of the present invention is a decoding device comprising: an obtaining unit configured to obtain the stream data generated by the encoding device defined above; a base view decoding unit configured to obtain a frame image group of the standard viewpoint by decoding the base-view video stream included in the stream data; a first dependent view decoding unit configured to obtain each frame image constituting the first-type frame image group by first obtaining frame images constituting a frame image group of a view point to be referenced, and decoding encoded frame images constituting the first-type dependent-view video stream by referencing the obtained frame images of a same time; a second dependent view decoding unit configured to obtain each frame image constituting the second-type frame image group by first obtaining each pair of frame images of a same time constituting respective two frame image groups of two viewpoints to be referenced, and decoding each encoded frame image constituting the second-type dependent-view video stream by referencing the obtained each pair of frame images; and an output unit configured to output the frame image groups obtained by the base view decoding unit, the first dependent view decoding unit, and the second dependent view decoding unit.

With the above structure, the decoding device decodes video streams that correspond to viewpoint videos of respective viewpoints, based on the reference relation between a plurality of viewpoint videos, and plays back the decoded video streams.

It is accordingly possible to decode and play back the multi-viewpoint video stream encoded in (a) above.

(m) A still another aspect of the present invention is a playback device for receiving and playing back the transport stream transmitted from the encoding device defined above, the playback device comprising: a stream receiving unit configured to receive the transport stream; a base view decoding unit configured to obtain a frame image group of the standard viewpoint by decoding the base-view video stream included in the transport stream; an attribute information extracting unit configured to extract attribute information from the transport stream; a first dependent view decoding unit configured to obtain a frame image group by decoding the first-type dependent-view video stream included in the transport stream based on the attribute information; a second dependent view decoding unit configured to obtain a frame image group by decoding the second-type dependent-view video stream included in the transport stream based on the attribute information; and a playback unit configured to play back the frame image groups obtained by the base view decoding unit, the first dependent view decoding unit, and the second dependent view decoding unit.

With the above structure, the playback device receives a transport stream, which includes video streams that have been obtained by encoding a plurality of viewpoint videos, decodes the encoded video streams, and plays back the decoded video streams. Thus the playback device can decode and play back the transport stream output from the encoding device described in the above (k).

(n) The above-described playback device may further comprise: a user viewpoint position detecting unit configured to detect a viewpoint position of a user; a user viewpoint frame image group generating unit configured to generate a frame image group corresponding to the viewpoint position of the user detected by the user viewpoint position detecting unit; and a video stream selecting unit configured to select a video stream used by the user viewpoint frame image group generating unit, wherein the user viewpoint frame image group generating unit generates the frame image group corresponding to the viewpoint position of the user by using frame image groups obtained by decoding the video stream selected by the video stream selecting unit, and the playback unit plays back the frame image group corresponding to the viewpoint position of the user.

With the above structure, the playback device detects the viewpoint position of the user, generates a video corresponding to the viewpoint position of the user by using the received video streams that have been obtained by encoding a plurality of viewpoint videos, and plays back the generated video.

Accordingly, even if the viewpoint position of the user does not match any of viewpoint positions of video streams included in the transport stream, the playback device can play back a video corresponding to the viewpoint position of the user.

(o) The above-described playback device may further comprise a frame image group storage unit configured to store the frame image groups obtained by the base view decoding unit and the first dependent view decoding unit, wherein the video stream selecting unit selects the video stream, which is used by the user viewpoint frame image group generating unit, from among the base-view video stream and the first-type dependent-view video stream while the user viewpoint position detecting unit continues to detect a movement of the viewpoint position of the user, and the video stream selecting unit selects the video stream from among the base-view video stream, the first-type dependent-view video stream, and the second-type dependent-view video stream when the user viewpoint position detecting unit detects no movement of the viewpoint position of the user.

With the above structure, while the viewpoint position of the user is moving, the playback device plays back a video corresponding to the viewpoint position of the user by using frame images of viewpoint videos that were encoded as the base-view video stream and the first-type dependent-view video stream, not using frame images of a viewpoint video that was encoded as the second-type dependent-view video stream.

Accordingly, when the playback device plays back a video while the viewpoint position of the user is moving, it is possible to simplify the decoding process and reduce the load on the playback device.

4. Supplementary Explanation

The following is a supplementary explanation about the stream format and the video compression technology used in the present embodiment.

<Stream Data>

In the data transfer using broadcast waves for digital TV, digital streams conforming to the MPEG-2 transport stream format are transferred.

The MPEG-2 transport stream is a standard for transferring a stream in which various streams such as a video stream and an audio stream are multiplexed. The MPEG-2 transport stream has been standardized by the ISO/IEC13818-1 and the ITU-T Recommendation H222.0. It is assumed in the present embodiment that transport streams of this format are generated.

Figure 38:
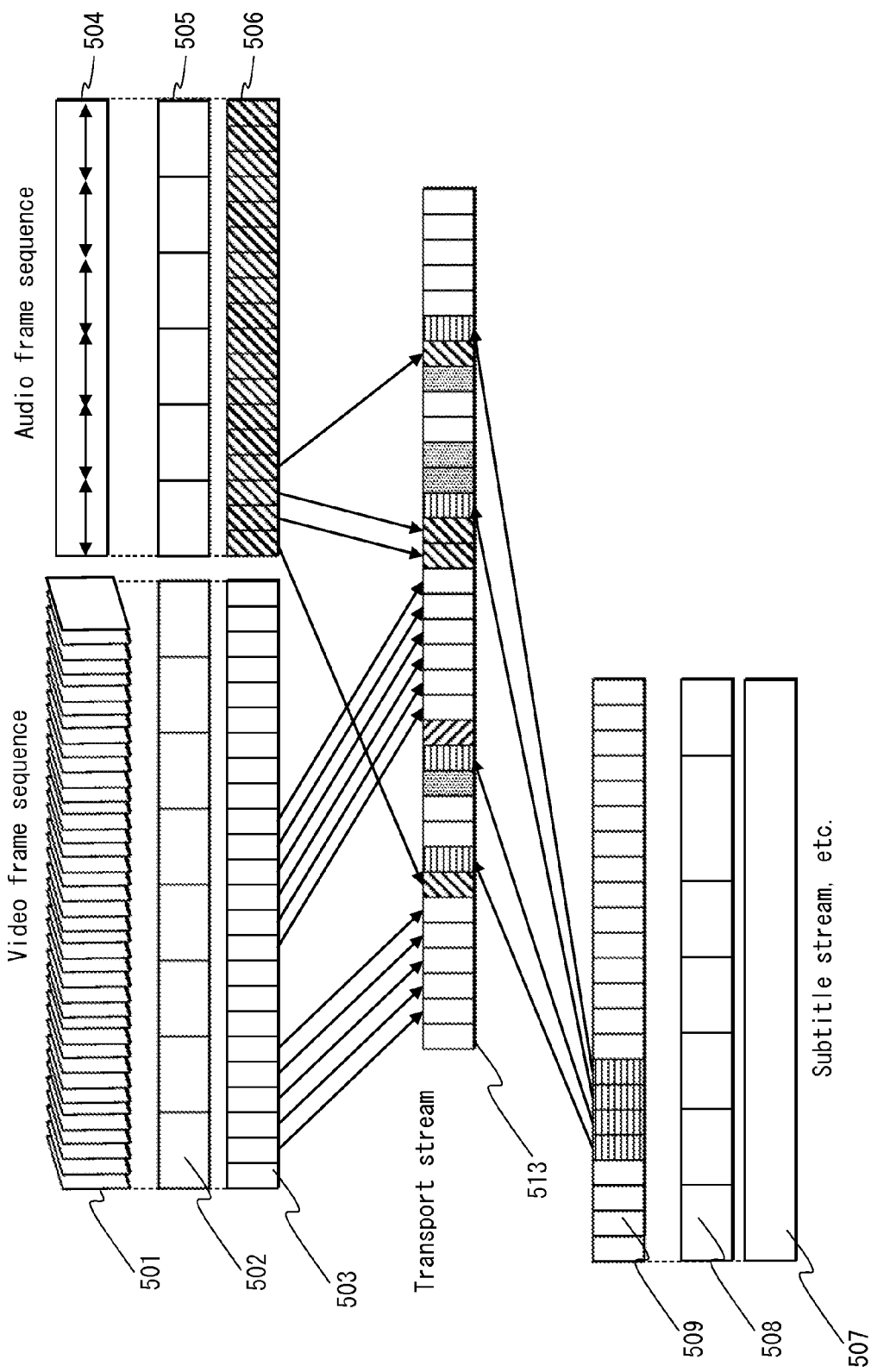
FIG. 38 is a conceptual diagram illustrating a digital stream structure in the transport stream format.

FIG. 38 illustrates a digital stream structure in the MPEG-2 transport stream format.

As illustrated in FIG. 38, TS (Taransport Stream) packets 503 of video, TS packets 506 of audio, and TS packets 509 of a subtitle stream are multiplexed to form a transport stream 513. The video TS packets 503 store a main video of a broadcast program, the audio TS packets 506 store main and secondary audio parts of the broadcast program, and the subtitle stream TS packets 509 store subtitle information of the broadcast program.

A video frame sequence 501 is compress-encoded by a video encoding method such as MPEG-2 or MPEG-4 AVC. An audio frame sequence 504 is compress-encoded by an audio encoding method such as Dolby AC-3, MPEG-2 AAC, MPEG-4 AAC, or HE-AAC.

Each stream included in the transport stream is identified by a stream ID called PID. It is possible for a playback device for extract a processing target stream by extracting packets having the same PID. Information indicating correspondence between PIDs and streams is stored in a descriptor in a PMT packet which is explained below.

To generate a transport stream, first a video frame sequence 501 composed of a plurality of video frames and an audio frame sequence 504 composed of a plurality of audio frames are converted into PES packet sequences 502 and 505, respectively. Next, the PES packet sequences 502 and 505 are converted into TS packet sequences 503 and 506, respectively. Similarly, data of a subtitle stream 507 is converted into a PES packet sequence 508, and further into a TS packet sequence 509. The above TS packet sequences are multiplexed into one stream as a transport stream 513. The PES packet and the TS packet are described below.

<Data Structure of Video Stream>

The following explains the data structure of the video stream obtained by compress-encoding images by the above-described encoding method.

Figure 39:
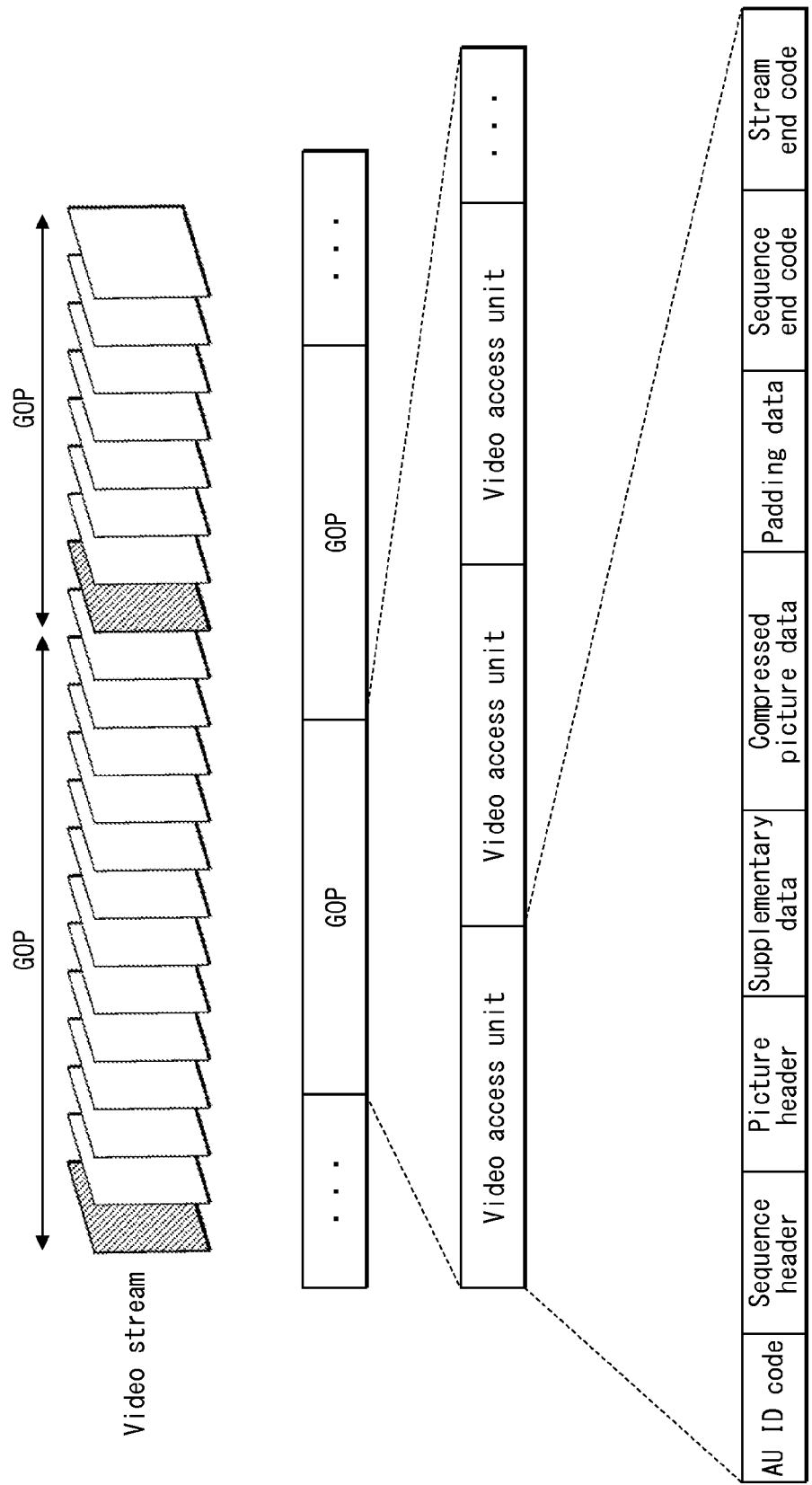
FIG. 39 is a conceptual diagram illustrating a video stream structure.

The video stream is data having a hierarchical structure as illustrated in FIG. 39. The video stream is composed of a plurality of GOPs. The GOP is treated as the basic unit in the compress-encoding process, which makes it possible to edit video or perform a random access.

The GOP includes one or more AUs. Each AU includes an AU ID code, a sequence header, a picture header, supplementary data, compressed picture data, padding data, sequence end code, and stream end code. The data constituting the AU are stored in units of NAL units in the case of the MPEG-4 AVC.

The AU ID code is a code indicating the head of the access unit.

The sequence header is a header storing information, such as resolution, frame rate, aspect ratio, and bit rate, that are common through the whole playback sequence composed of a plurality of video access units.

The picture header is a header storing information such as an encoding method through the whole picture.

The supplementary data is additional information, such as character information of the closed caption displayed on TV in synchronization with the video and the GOP structure information, that are not necessarily required for decoding compressed picture data.

The compressed picture data stores data of compress-encoded picture data.

The padding data stores data for maintaining the format. For example, the padding data is used as stuffing data for keeping a predetermined bit rate.

The sequence end code is data indicating the end of a playback sequence.

The stream end code is data indicating the end of a bitstream.

The data structures of the AU ID code, sequence header, picture header, supplementary data, compressed picture data, padding data, sequence end code, and stream end code are different depending on the video encoding method.

In the case of the MPEG-4 AVC, the AU ID code corresponds to the AU delimiter (Access Unit Delimiter), the sequence header to the SPS (Sequence Parameter Set), the picture header to the PPS (Picture Parameter Set), the compressed picture data to a plurality of slices, the supplementary data to the SEI (Supplemental Enhancement Information), the padding data to the FillerData, the sequence end code to the End of Sequence, and the stream end code to the End of Stream.

Also, in the case of the MPEG-2 format, the sequence header corresponds to the sequence_Header, sequence_extension, group_of_picture_header, the picture header to the picture_header, picture_coding_extension, the compressed picture data to a plurality of slices, the supplementary data to the user_data, and the sequence end code to the sequence_end_code. Although the AU ID code is not present in the above, but it is possible to determine a boundary between access units by using the start code of each header.

The above data of the attribute information are not always necessary. For example, when encoding is performed, the sequence header is necessary only in the video access unit at the head of the GOP, not added in other video access units. Also, it is possible to omit a picture header in a video access unit, by causing the video access unit to reference a picture header in a video access unit that precedes the present video access unit in the encoding order.

Figure 40:
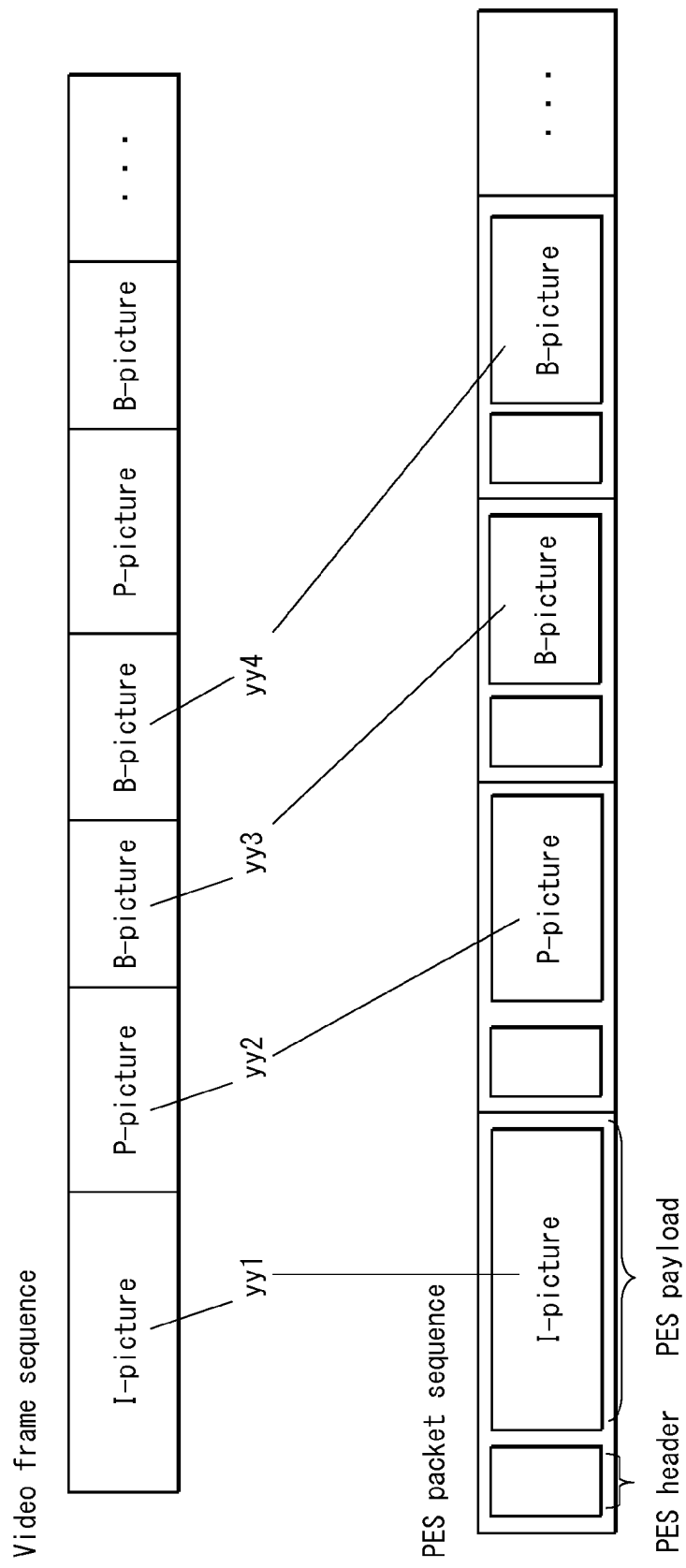
FIG. 40 is a conceptual diagram illustrating a PES packet structure.

FIG. 40 illustrates how the video stream is stored in the PES packet sequence.

The first row of FIG. 40 indicates a video frame sequence of the video stream. The second row of FIG. 40 indicates a PES packet sequence.

As indicated by arrows yy1, yy2, yy3 and yy4 in FIG. 40, the I-pictures, B-pictures and P-pictures, which are a plurality of video presentation units in the video stream, are separated from each other and stored in the payloads of the PES packets.

Each PES packet includes a PES header storing a PTS and a DTS, wherein the PTS indicates a display time of a picture, and the DTS indicates a decode time of the picture.

Figure 41:
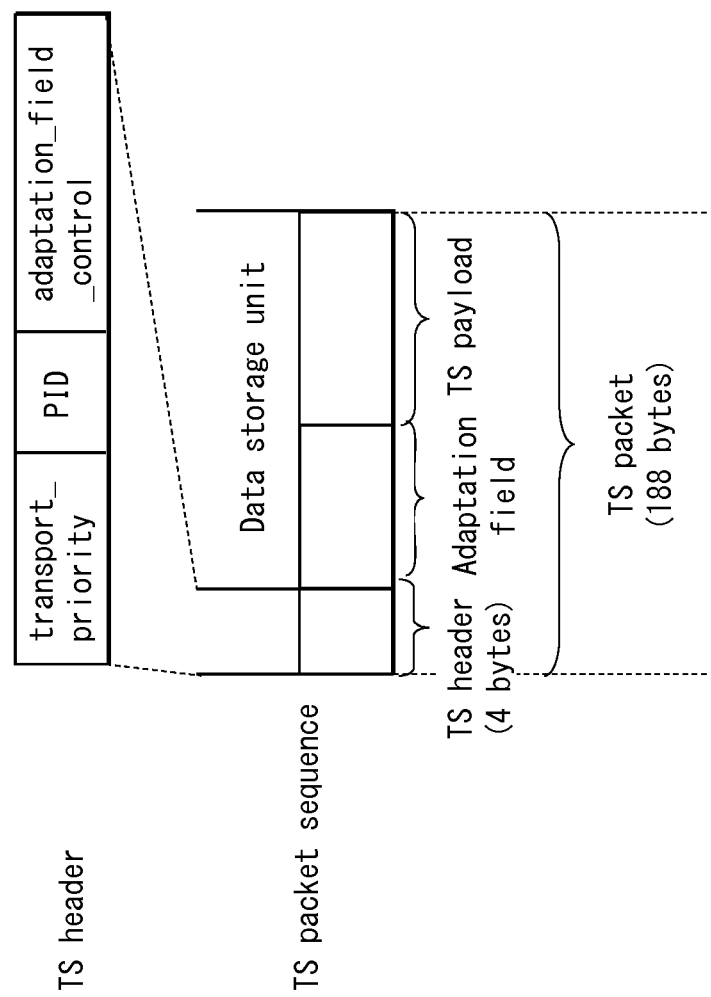
FIG. 41 illustrates the data structure of the TS packet in a TS packet sequence constituting a transport stream.

FIG. 41 illustrates the data structure of the TS packet in a TS packet sequence constituting a transport stream.

The TS packet is a packet having a fixed length of 188 bytes and includes a TS header of four bytes, an adaptation field, and a TS payload. The TS header includes a transport_priority, a PID, and an adaptaion_field_control. As described above, the PID is an ID for identifying a stream multiplexed in a transport stream.

The transport_priority is information for identifying a type of a packet in TS packets having the same PID.

The adaptaion_field_control is information for controlling the structure of the adaptation field and the TS payload. There is a case where either of the adaptation field and the TS payload is present, and a case where both of the adaptation field and the TS payload are present. The adaptaion_field_control indicates one among these cases.

When the adaptaion_field_control has a value "1", it indicates that only the TS payload is present; when the adaptaion_field_control has a value "2", it indicates that only the adaptaion field is present; and when the adaptaion_field_control has a value "3", it indicates that both of the adaptation field and the TS payload are present.

The adaptation field is an area for storing information such as PCR (Program Clock Reference), and storing stuffing data so that the TS packet has the fixed length of 188 bytes. The TS payload stores a PES packet in a divided form.

The transport stream includes, as well as the TS packets constituting video, audio, and subtitle streams, TS packets constituting PAT (Program Association Table), PMT, and PCR. These packets are called PSI (Program Specific Information).

The PAT indicates a PID of a PMT used in the transport stream, and the PID of the PAT itself is "0".

Figure 42:
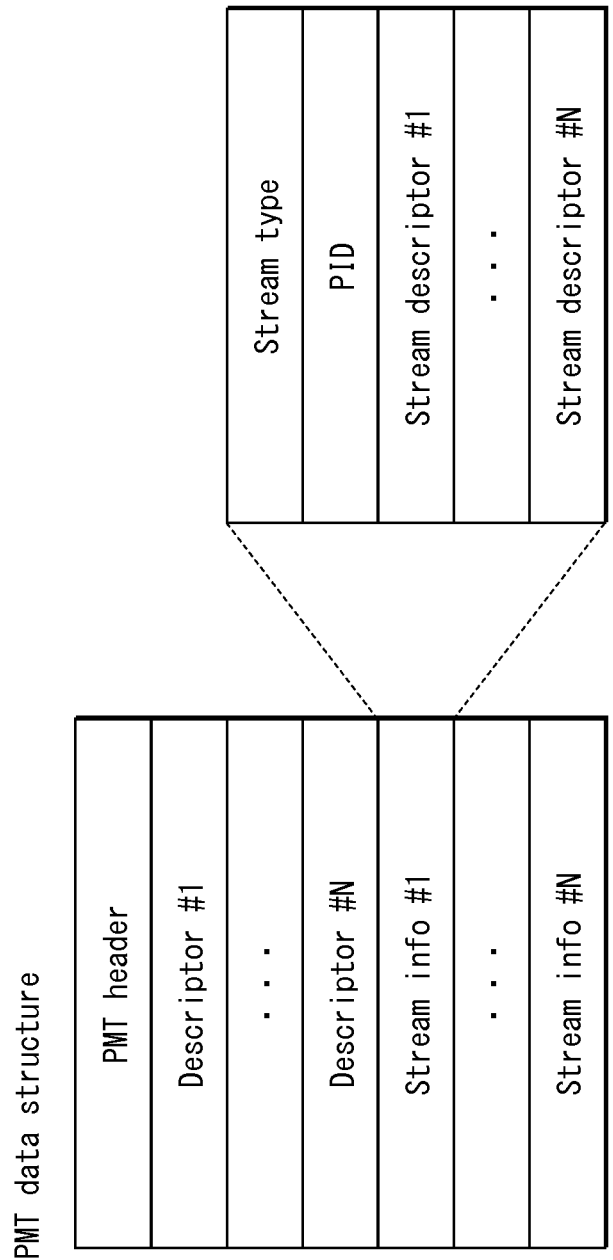
FIG. 42 illustrates the data structure of the PMT.

FIG. 42 illustrates the data structure of the PMT.

The PMT includes: a PMT header; various descriptors pertaining to the transport stream; and stream information pertaining to streams of video, audio, subtitle, etc. contained in the transport stream.

The PMT header stores information such as the length of data included in the PMT.

Information such as copy control information, which indicates whether or not copying a stream such as a video stream or an audio stream is permitted, is recorded in the descriptors pertaining to the transport stream.

Each piece of stream information pertaining to each stream includes: a stream type for identifying the compress-encoding method of the stream; the PID of the stream; and a plurality of stream descriptors in which attribute information of the stream (frame rate, aspect ratio, etc.) is described.

Each PCR packet has information of an STC (System Time Clock) time corresponding to a time at which the PCR packet is transferred to the decoder, so that a time at which a TS packet arrives at the decoder can be synchronized with the STC which is a time axis of PTS and DTS.

<Explanation of Video Compression Technology>
<3D Video Using Disparity Images>

In a stereoscopic viewing method using disparity images, the stereoscopic viewing is realized by preparing a right-eye image (R image) and a left-eye image (L image) and performing a control such that the right and left eyes of the user receive only the right-eye image and the left-eye image, respectively.

A video composed of the right-eye images are called right-view video, and a video composed of the left-eye images are called left-view video.

FIGS. 43A-43D illustrate a 3D digital TV 20 that can play back a 3D video, and a 2D digital TV 20 that can play back only a 2D video, not supporting playback of the 3D video.

Figure 43D:
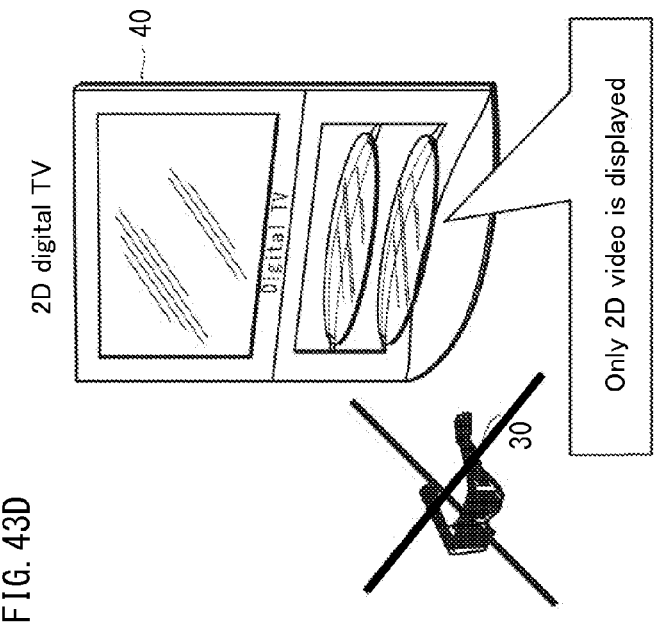
Figure 43A:
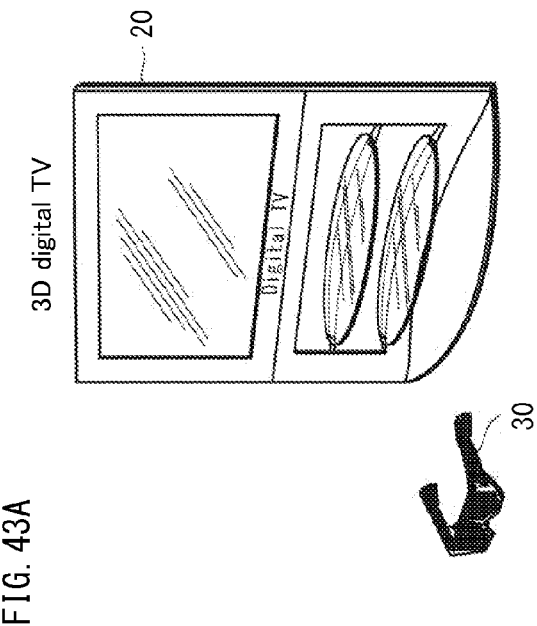

As illustrated in FIG. 43A, the user views the 3D video by using the 3D digital TV 20 and 3D glasses 30.

The 3D digital TV 20 can display both the 2D and 3D videos, and displays the videos by playing back streams included in the received broadcast waves. More specifically, the 3D digital TV 20 plays back a 2D video stream that has been compress-encoded in the MPEG-2 format, and plays back a base-view video stream and a dependent-view video stream for 3D that have been compress-encoded in the MPEG-4 MVC format.

The 3D digital TV 20 plays back the 3D video by alternately displaying a left-eye image and a right-eye image, wherein the left-eye image is obtained by decoding the base-view video stream and the right-eye image is obtained by decoding the dependent-view video stream.

The user can view the video as a stereoscopic video by wearing the 3D glasses 30 and watching the video played back on the 3D digital TV 20 through the 3D glasses 30.

FIG. 43B illustrates the state of the 3D glasses 30 when a left-eye image is displayed.

At the instant the left-eye image is displayed on the screen, in the 3D glasses 30, the liquid-crystal shutter for the left eye is in the light transmission state, and the liquid-crystal shutter for the right eye is in the light block state.

FIG. 43C illustrates the state of the 3D glasses 30 when a right-eye image is displayed.

At the instant the right-eye image is displayed on the screen, in the 3D glasses 30, the liquid-crystal shutter for the right eye is in the light transmission state, and the liquid-crystal shutter for the left eye is in the light block state.

The 2D digital TV 40 illustrated in FIG. 43D supports playback of a 2D video, and plays back a 2D video that is obtained by decoding a video stream for 2D, among video streams included in the transport stream.

Figure 44:
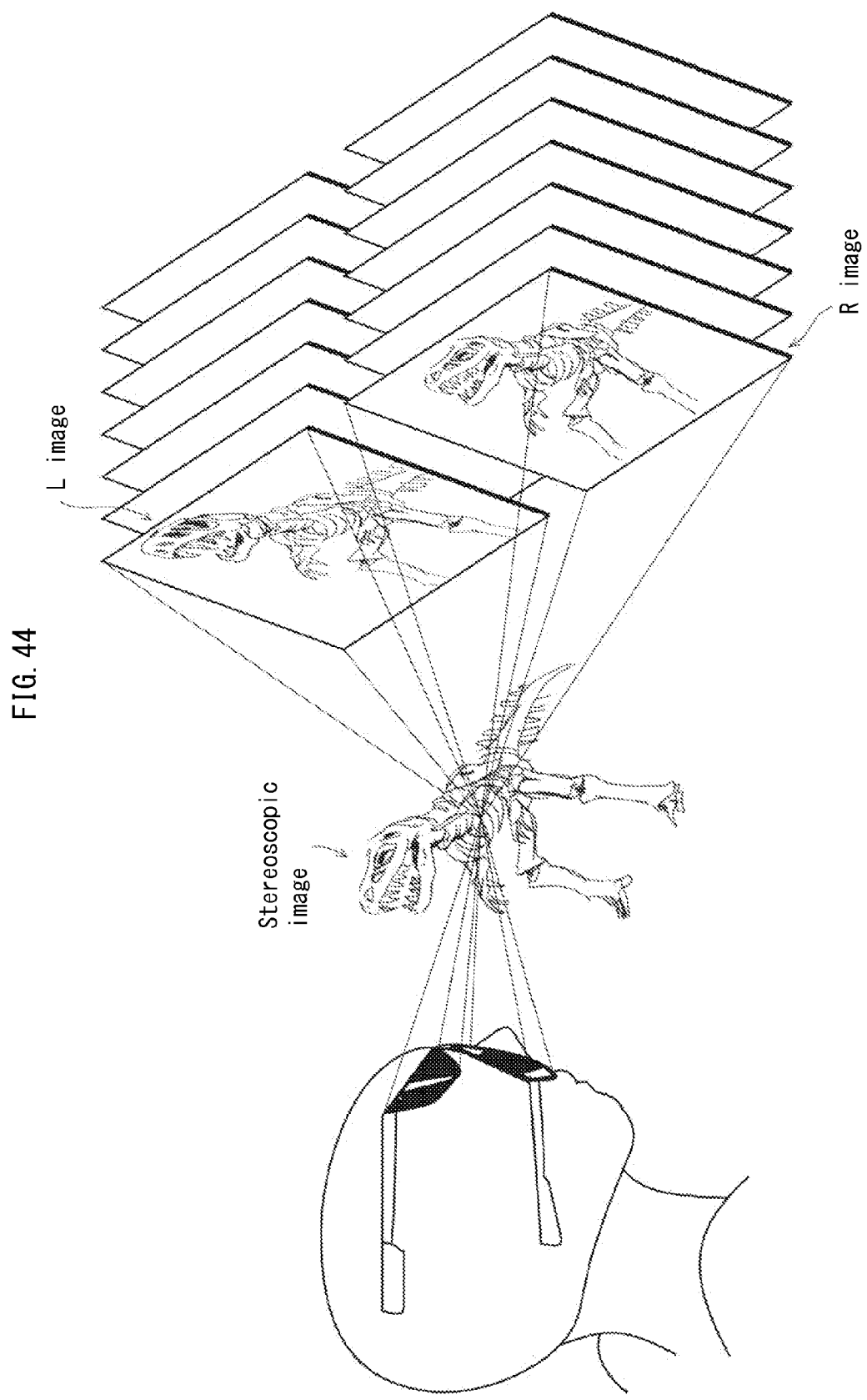
FIG. 44 illustrates an example of how a stereoscopic image is displayed.

FIG. 44 illustrates an example of how a stereoscopic image is displayed. FIG. 44 illustrates an example of displaying left-eye images and right-eye images of a dinosaur skeleton. When the light transmission and block are repeated alternately for the right and left eyes, the left and right scenes are overlaid in the brain of the user by the effect of residual images of eyes, and the overlaid image is recognized as a stereoscopic image appearing in front of the user.

The 3D video methods for compress-encoding the left-view and right-view videos include the frame compatible method and the multi-view encoding method.

Figure 45:
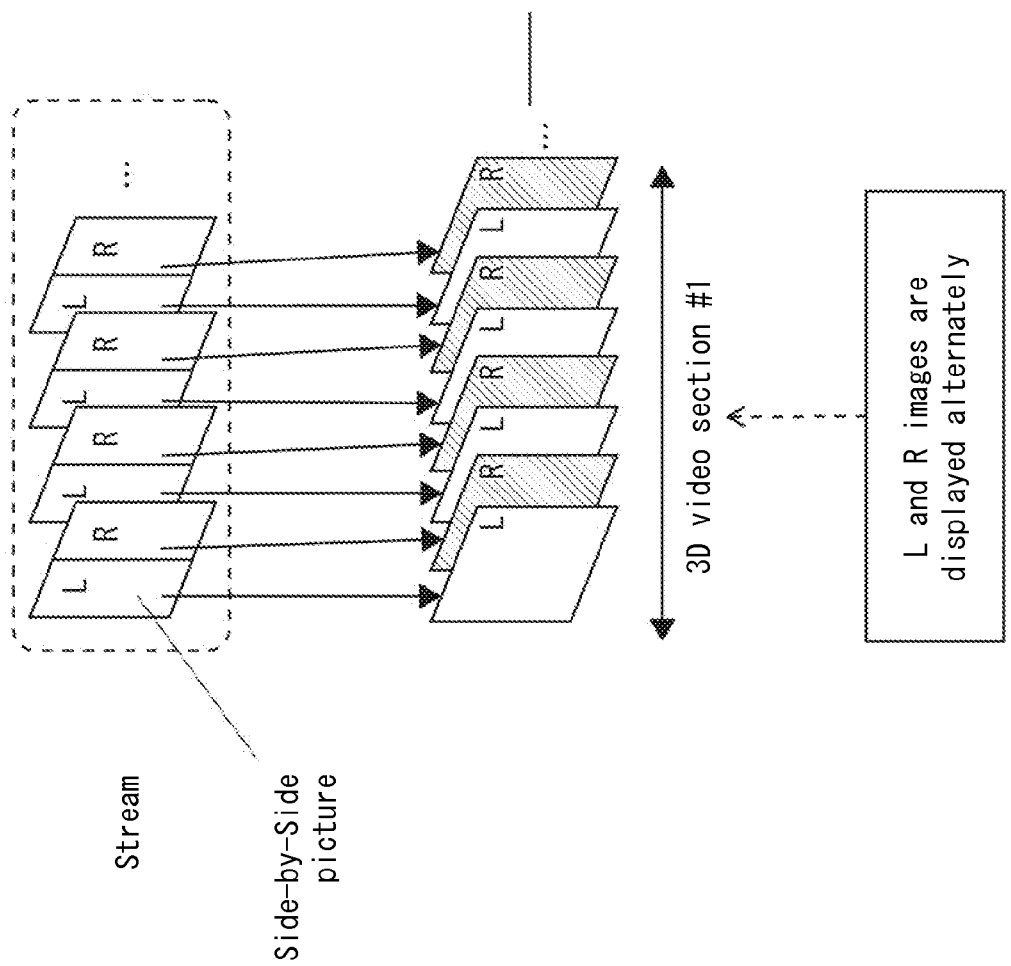
FIG. 45 is a conceptual diagram illustrating the Side-by-Side method.

According to the frame compatible method, pictures corresponding to images of the same time in the left-view and right-view videos are thinned out or reduced and then combined into one picture, and the combined picture is compress-encoded. One example of this is the Side-by-Side method illustrated in FIG. 45. According to the Side-by-Side method, the pictures corresponding to images of the same time in the left-view and right-view videos are each reduced to ½ in size horizontally, and are arranged in parallel horizontally to be combined into one picture. A video image composed of the combined pictures is compress-encoded by a compress-encoding method for 2D video (for example, MPEG-2), thereby a video stream is generated. On the other hand, when the video stream is played back, the video stream is decoded by the same compress-encoding method as when the video stream is generated. The decoded pictures are divided into left and right images, the left and right images are extended double in size horizontally, thereby pictures corresponding to the left-view and right-view videos are obtained. The stereoscopic image as illustrated in FIG. 44 is realized when the obtained pictures for the left-view and right-view videos (L image and R image) are alternately displayed.

On the other hand, according to the multi-view encoding method, the pictures for the left-view and right-view videos are independently compress-encoded, without being combined into one picture.

On the other hand, according to the multi-view encoding method, the pictures for the left-view and right-view videos are independently compress-encoded, without being combined into one picture. One example of this method is MPEG-4 MVC.

<Multi-View Video Compression Technology>

The following is a brief description of a compress-encoding method in the MPEG-4 MVC format that is used by the encoding device and decoding device in the present embodiment.

According to this compress-encoding method, video data is encoded by compressing the data amount by using the redundancy in the video image in the spatial and time directions.

One method that takes advantage of the redundancy of the video is inter-picture predictive encoding. According to the inter-picture predictive encoding, when a certain picture is encoded, another picture to be displayed before or after said certain picture is designated as a reference picture. Subsequently, the amount of motion from the reference picture is detected, and a difference between a motion-compensated picture and an encoding-target picture is compress-encoded.

Figure 46:
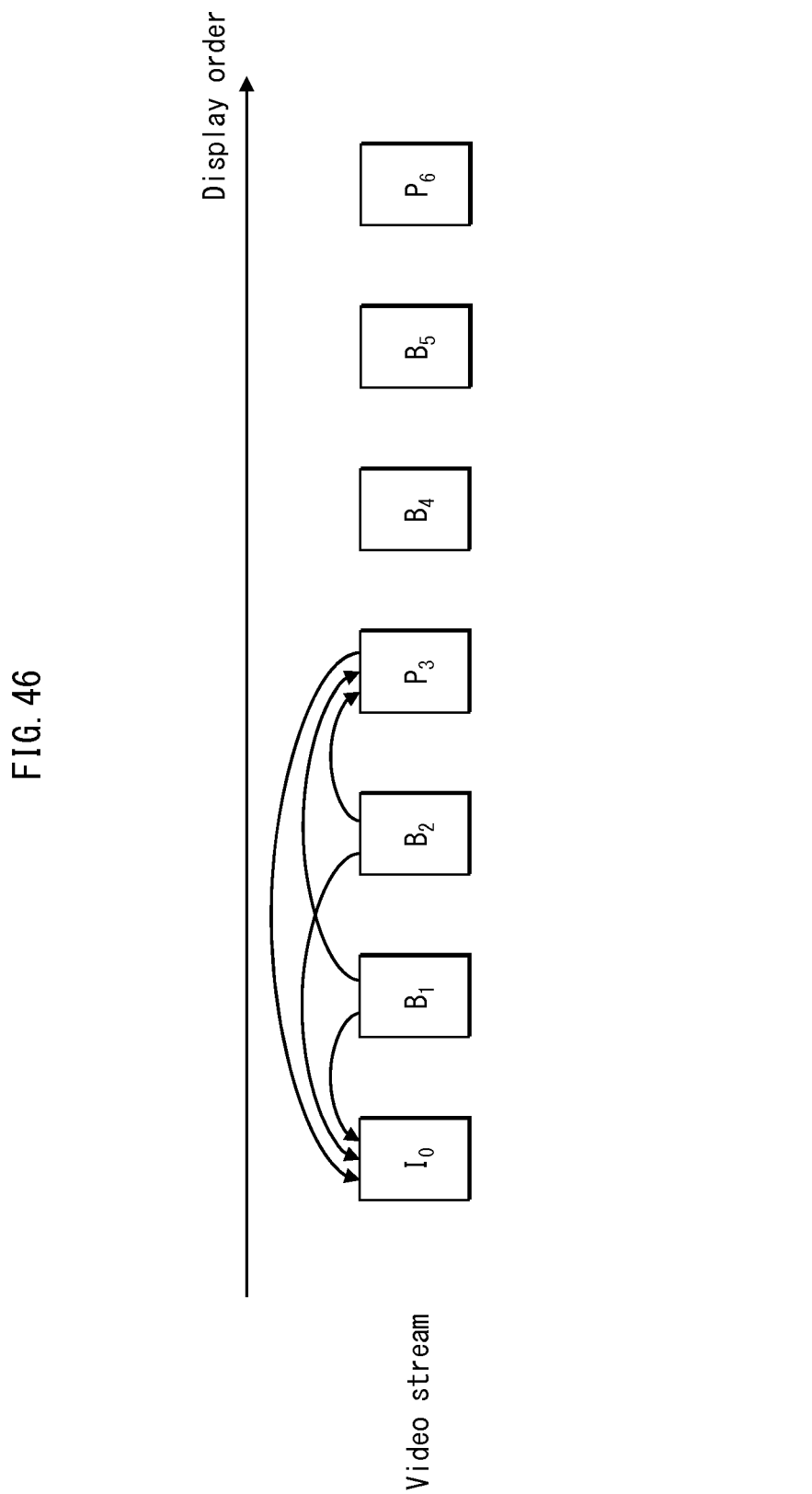
FIG. 46 illustrates a reference relation between pictures in a time direction of a video stream.

FIG. 46 illustrates a reference relation between pictures in a time direction of a video stream. In the example illustrated in FIG. 46, picture P3 is compress-encoded by referencing picture I0, and pictures B1 and B2 are compress-encoded by referencing pictures I0 and P3.

Furthermore, in the MPEG-4 MVC, the spatial redundancy as illustrated in FIG. 6 is used as well. That is to say, the dependent view is compress-encoded by referencing a picture of the same time in the base view. In this way, a compress-encoding with high compression rate can be realized by using the time and spatial redundancy.

<Data Structure of Video Stream in MPEG-4 MVC Format>

The following describes the video stream in the MPEG-4 MVC format.

Figure 47:
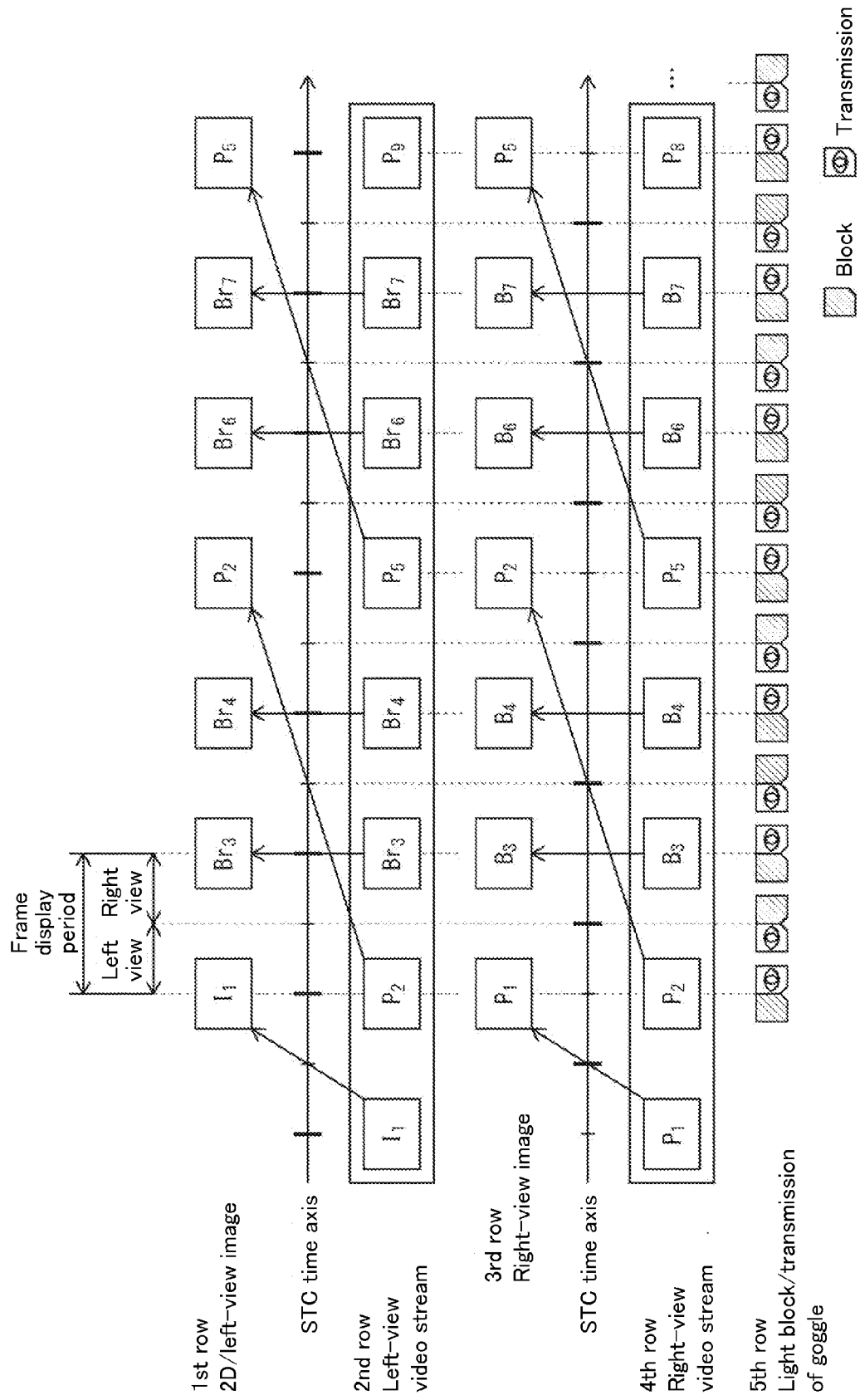
FIG. 47 illustrates one example of the internal structure of the video stream in the MPEG-4 MVC format.

FIG. 47 illustrates one example of the internal structure of the video stream in the MPEG-4 MVC format.

As illustrated in FIG. 47, the pictures constituting the right-view video stream are compress-encoded by referencing corresponding pictures, which have the same display times, of the left-view video stream. Pictures P1 and P2 of the right-view video stream are compress-encoded by referencing pictures I1 and P2 of the left-view video stream, and pictures B3, B4, B6, B7 of the right-view video stream are compress-encoded by referencing pictures Br3, Br4, Br6, Br7 of the left-view video stream.

The second row of FIG. 47 illustrates the internal structure of the left-view video stream. The left-view video stream includes pictures I1, P2, Br3, Br4, P5, Br6, Br7, and P9. These pictures have been obtained by decoding encoded pictures in the order of the time set in the DTS.

The first row illustrates left-eye images to be displayed on a display device or the like. The left-eye images are displayed by displaying the decoded pictures I1, P2, Br3, Br4, P5, Br6, Br7, and P9 in the order of the time set in the PTS, namely, in the order of I1, Br3, Br4, P2, Br6, Br7, and P5.

The fourth row of FIG. 47 illustrates the internal structure of the right-view video stream. The right-view video stream includes pictures P1, P2, B3, B4, P5, B6, B7, and P8. These pictures have been obtained by decoding encoded pictures in the order of the time set in the DTS.

The third row illustrates right-eye images to be displayed on a display device or the like. The right-eye images are displayed by displaying the decoded pictures P1, P2, B3, B4, P5, B6, B7, and P8 in the order of the time set in the PTS, namely, in the order of P1, B3, B4, P2, B6, B7, and P5. It should be noted here that either a left-eye image and a right-eye image whose PTSs have the same time is displayed with a delay of half the interval between times of two consecutive PTSs.

The fifth row shows how the state of the 3D glasses 30 is changed. As shown in the fifth row, when the left-eye image is viewed, the shutter for the right eye is closed, and when the right-eye image is viewed, the shutter for the left eye is closed.

Figure 48:
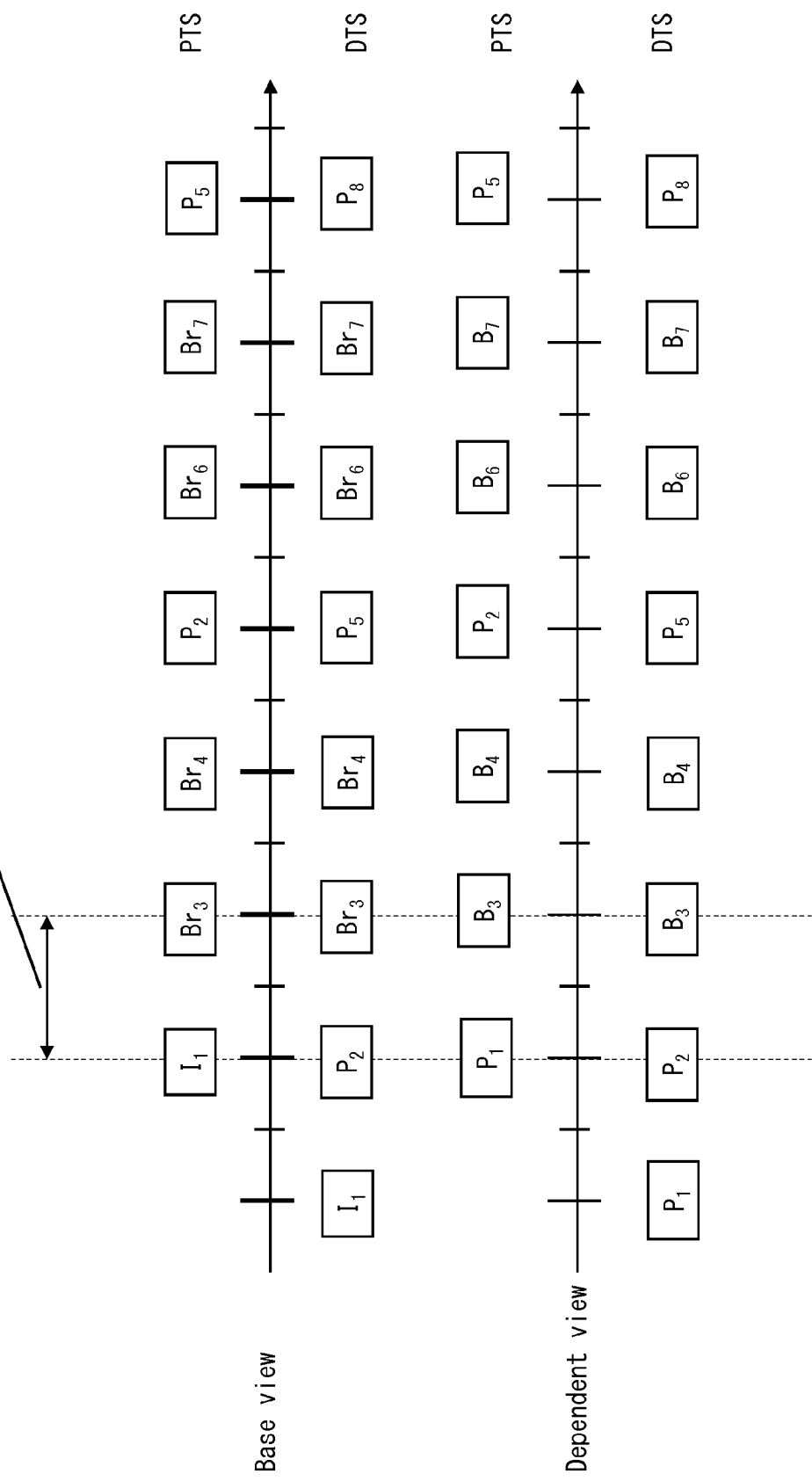
FIG. 48 illustrates one example of the relationship between PTSs and DTSs assigned to the video access units constituting the base-view video stream and the dependent-view video stream included in the video stream.

FIG. 48 illustrates one example of the relationship between PTSs and DTSs assigned to the video access units constituting the base-view video stream and the dependent-view video stream included in the video stream.

The pictures included in the base-view and dependent-view video streams storing disparity images representing views of the same time are set such that the DTS and PTS thereof have the same value.

With this structure, when decoding pictures included in the base-view and dependent-view video streams, the playback device can decode the pictures in units of 3D video access units and display the decoded pictures.

<Generation of 3D Video with Use of Depth Map>

Figure 49:
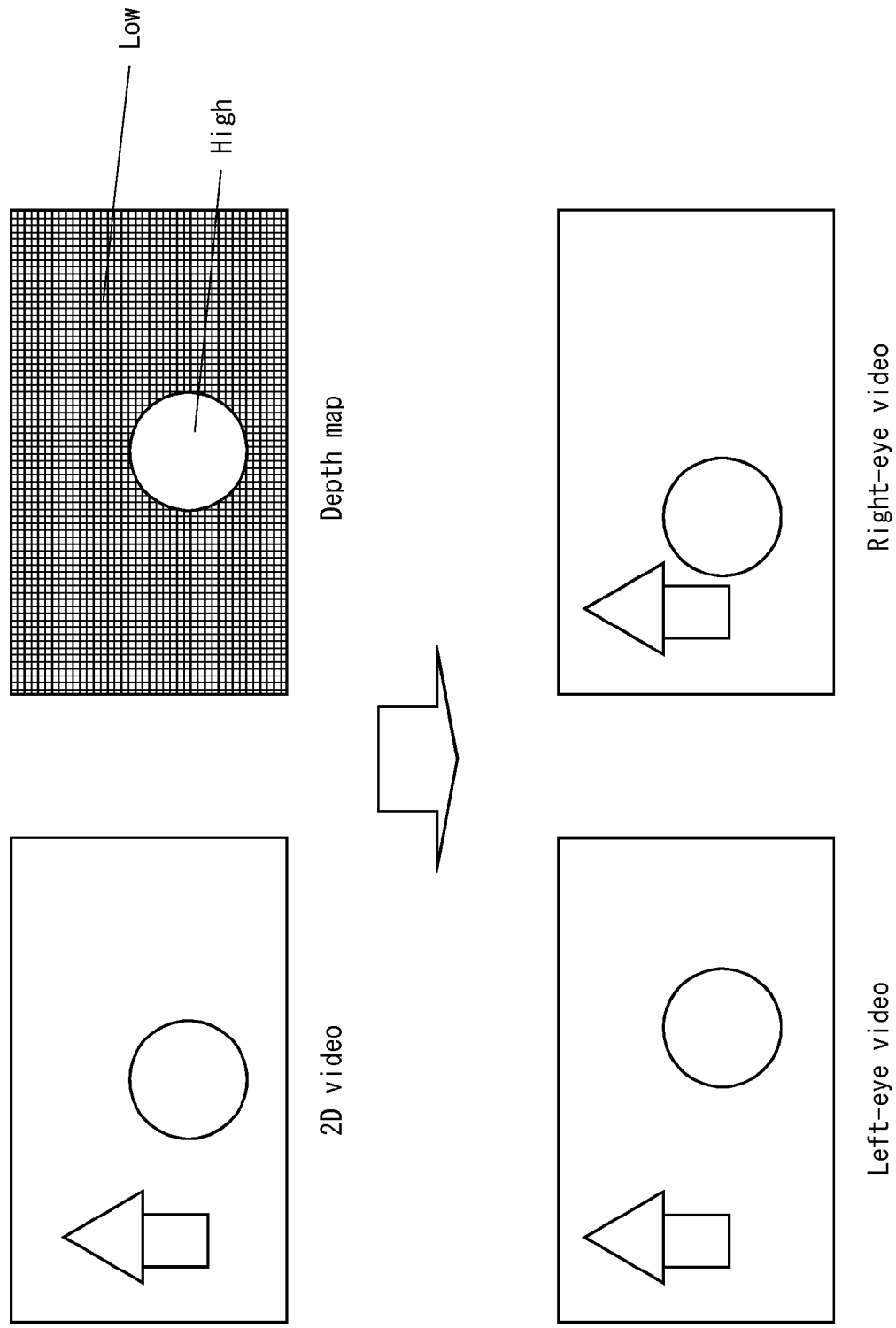
FIG. 49 is a conceptual diagram illustrating a case where disparity images of left-eye and right-eye images are generated from a 2D video and a depth map.

FIG. 49 is a schematic diagram illustrating one example of generating disparity images of left-eye and right-eye images from a 2D video and a depth map.

The depth map includes depth values that respectively correspond to pixels constituting each image of a 2D video. In the example illustrated in FIG. 49, information indicating closeness (depth value "High") is assigned to a circular object in the 2D video, and information indicating remoteness (depth value "Low") is assigned to the other area in the 2D video. This information may be stored as a bit sequence for each pixel, or as an image (for example, a "black" portion of the image indicates that the depth is "Low", and a "white" portion of the image indicates that the depth is "High"). A disparity image can be created by adjusting the disparity amount of a 2D video based on the depth values included in the depth map. In the example illustrated in FIG. 49, the circular object in the 2D video has a "High" depth value, thus the disparity amount of the pixels constituting the circular object is increased when a disparity image is created. On the other hand, the other area in the 2D video has a "Low" depth value, thus left-eye and right-eye images are created by decreasing the disparity amount of the pixels constituting the area excluding the circular object. When the left-eye and right-eye images are displayed by the sequential segregation method or the like, a stereoscopic viewing is realized.

<Adjustment of Cropping and Scaling>

Encoding methods conforming to the MPEG-2 or MPEG-4 MVC make it possible to change an actually displayed area within a compress-encoded frame area.

As a result, when a pictrure of the dependent-view video stream is decoded by referencing a picture of a video stream of a different viewpoint video, the attribute information needs to be adjusted such that the views of the same time have values indicating the same cropping area and scaling area.

Figure 50:
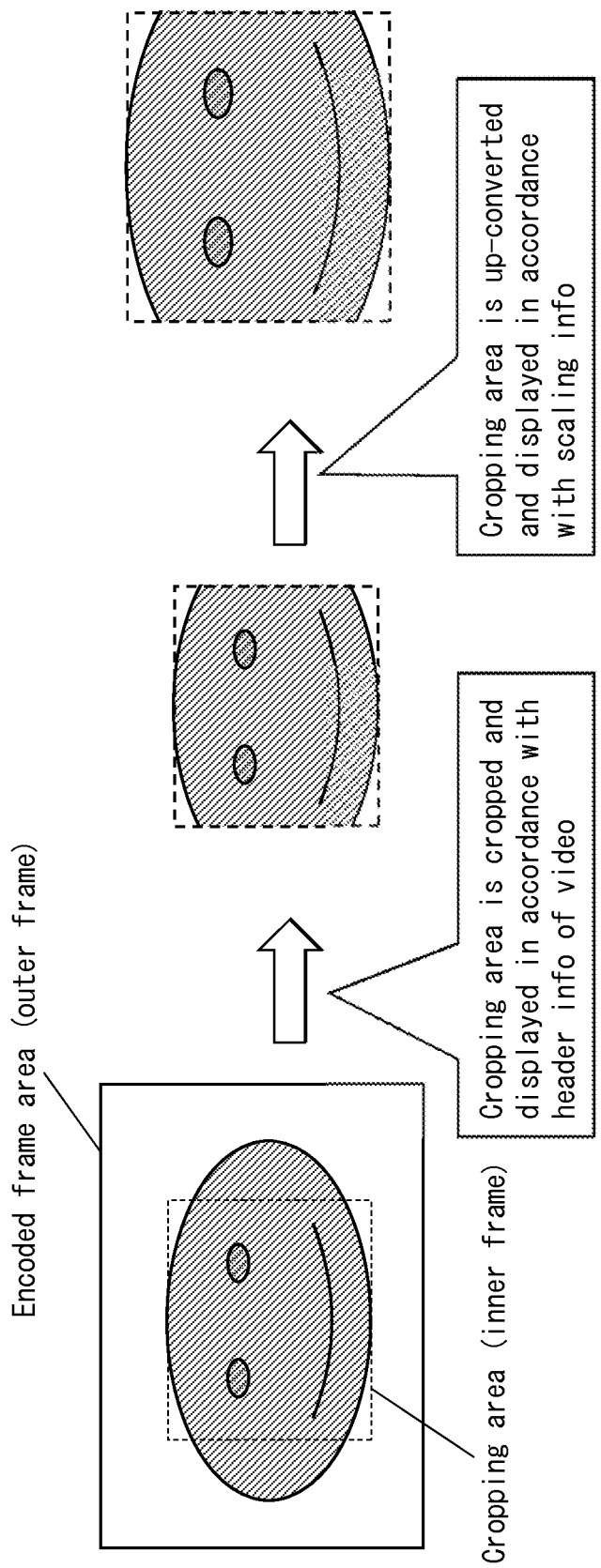
FIG. 50 is a conceptual diagram of the cropping area information and the scaling information.

The following describes cropping area information and scaling information with reference to FIG. 50.

As illustrated in FIG. 50, an actually displayed area among a compress-encoded frame area can be specified as a cropping area. In the MPEG-4 AVC, the area is specified by using the frame_cropping information stored in the SPS. The frame_cropping information, as illustrated in the left portion of FIG. 51, respective differences between the upper lines, lower lines, left lines, and right lines of the cropping area and the compress-encoded frame area are specified as the upper, lower, left, and right crop amounts. More specifically, when the croppin area is specified, the frame_cropping_flag is set to "1", and the upper, lower, left, and right crop amounts are specified in the frame_crop_top_offset, frame_crop_bottom_offset, frame_crop_left_offset, and frame_crop_right_offset, respectively.

Figure 51:
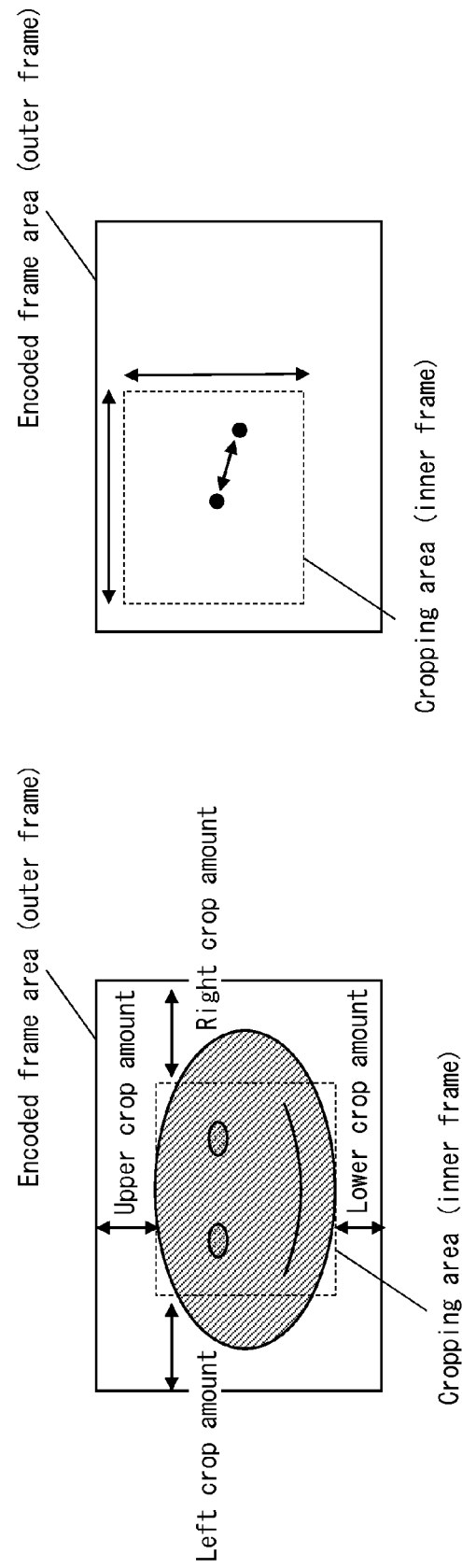
FIG. 51 illustrates detailed methods for specifying the cropping area information and the scaling information.

In the case of the MPEG-2 format, as illustrated in the right portion of FIG. 51, the cropping area is specified by the vertical and horizontal sizes of the cropping area (the display_horizontal_size and the display vertical size of the sequence_display_extension) and information indicating the difference between the center of the compress-encoded frame area and the center of the cropping area (the frame_centre_horizontal_offset and the frame_centre_vertical_offset of the picture_display_extension). Furthermore, an aspect ratio is set as the scaling information that indicates the scaling method by which the cropping area is actually displayed on the TV or the like. The playback device up-converts the cropping area by using the aspect ratio having been set as the scaling information and displays the up-converted cropping area. In the case of the MPEG-4 AVC, information of the aspect ratio (aspect_ratio_idc) is stored in the SPS, as the scaling information. For example, to display a 1440×1080 cropping area by expanding it to a size of 1920×1080, the aspect ratio is specified as 4:3. With this specification of the aspect ratio, the horizontal size is up-converted 4/3 times (1440×4/3=1920), and a 1920×1080 cropping area expanded from 1440×1080 is displayed.

In the case of the MPEG-2 format, similarly, attribute information including the information of aspect ratio (aspect_ratio_information) is stored in the sequence_header, and a process similar to the above process can be realized by setting the attribute information to appropriate values.

INDUSTRIAL APPLICABILITY

The encoding device of the present invention provides encoding with reduced data amount compared with the case where videos of a multi-viewpoint video are encoded independently. The decoding device of the present invention provides decoding of encoded data obtained by encoding such a multi-viewpoint video. The present invention is usefully applicable to an encoding device for generating a video stream supporting the multi-viewpoint video, or a playback device for playing back the video stream.

REFERENCE SIGNS LIST

2600 encoding device
2601 control unit
2602 base-view video encoder
2603 dependent-view video encoder
2604 encoder selector
2605 video decoder 2606 picture memory
2607 view video encoding information storage unit
2608 decode video selector
2609 view video storage unit
2610 reference information storage unit
2611 base-view video stream generating unit
2612 dependent-view video stream generating unit
2613 PMT generating unit
2614 multiplexer
2615 transport stream output unit
2800 playback device
2801 user position obtaining unit
2802 view video stream determining unit
2803 PID filter
2804 data selector
2806 TB(1)
2807 MB(1)
2808 EB(1)
2809 TB(2)
2810 MB(2)
2811 EB(2)
2812 TB(3)
2813 MB(3)
2814 EB(3)
2815 decode switch
2816 inter-view buffer
2817 D2 (multi-view video compressed video decoder)
2818 DPB (Decoded Picture Buffer)
2820 plane memory
2822 multi-view video decoder

The invention claimed is:

1. A playback device that plays back received stream data corresponding to a multi-viewpoint video, the stream data generated by multiplexing a plurality of video streams generated by encoding a plurality of frame image groups respectively corresponding to a plurality of viewpoints of the multi-viewpoint video, the playback device comprising:
an input unit configured to receive the plurality of frame image groups which correspond one-to-one to a plurality of viewpoints that are arranged on a straight line;
a user viewpoint position detecting unit configured to take an image of a user viewing the multi-viewpoint video and detect a viewpoint position of the user;
a video stream selecting unit configured to select, based on the viewpoint position of the user, a decode-target video stream among the plurality of video streams;
a decoding unit configured to decode the decode-target video stream to acquire a frame image group corresponding to the decode-target video stream;
a user viewpoint frame image group generating unit configured to generate a frame image from the viewpoint position of the user by using the frame image group corresponding to the decode-target video stream;
a base view encoding unit configured to set one of the plurality of viewpoints as a standard viewpoint, and generate a base-view video stream by encoding a predetermined frame image group among the plurality of frame image groups, the predetermined frame image group corresponding to the standard viewpoint which, among the plurality of viewpoints, has the smallest value of a difference between distances from a viewpoint to two viewpoints at opposite ends of the straight line, and
a first dependent view encoding unit configured to set, as a first-type viewpoint, one of the plurality of viewpoints positioned such that at least one viewpoint is present between the first-type viewpoint and the standard viewpoint, and generate a first-type dependent-view video stream for each of the two viewpoints at opposite ends of the straight line by encoding each frame image constituting, among the plurality of frame image groups, frame image groups that respectively correspond to the two viewpoints at opposite ends of the straight line, by using, as a reference image, a corresponding frame image of the base-view video stream.

2. The playback device of claim 1, wherein
the stream data includes the base-view video stream, the first-type dependent-view video stream, and a second-type dependent view video stream,
the base-view video stream is generated by encoding a frame image group of one viewpoint without referring to any frame image of any other viewpoint,
the first-type dependent-view video stream is generated by encoding a frame image group of one viewpoint by referring to a frame image group of one other viewpoint, and
the second-type dependent-view video stream is generated by encoding a frame image group of one viewpoint by referring to frame image groups of two other viewpoints,
the user viewpoint position detecting unit is further configured to determine whether or not the viewpoint position of the user is moving, and
the video stream selecting unit
selects one of the base-view video stream or first-type dependent-view video stream as the decode-target video stream while the user viewpoint position detecting unit is determining that the viewpoint position of the user is moving, and
selects one of the base-view video stream, first-type dependent-view video stream, or second-type dependent-video stream as the decode-target video stream while the user viewpoint position detecting unit is determining that the viewpoint position of the user is not moving.

3. An encoding device for generating the stream data of claim 1, the encoding device comprising:
a second dependent view encoding unit configured to set, as a second-type viewpoint, one of the plurality of viewpoints that is neither the standard viewpoint nor the first-type viewpoint and that is sandwiched between two other viewpoints, and generate a second-type dependent-view video stream by encoding a frame image group of the second-type viewpoint by using, as reference images, frame images of two other viewpoints sandwiching the second-type viewpoint; and
a multiplexing unit configured to multiplex the base-view video stream, the first-type dependent-view video stream, and the second-type dependent-view video stream.

4. The encoding device of claim 3, wherein
the two frame images used as the reference images by the second dependent view encoding unit correspond respectively to the standard viewpoint and the first-type viewpoint, or to two different first-type viewpoints.

5. The encoding device of claim 4, wherein
the two frame images used as the reference images by the second dependent view encoding unit correspond respectively to two viewpoints that satisfy a condition that the two viewpoints and the second-type viewpoint are arranged on a straight line.

6. The encoding device of claim 5, wherein
the two frame images used as the reference images by the second dependent view encoding unit correspond respectively to two viewpoints that satisfy a condition that the two viewpoints are arranged in two different directions from the second-type viewpoint and are each closest to the second-type viewpoint among one or more viewpoints arranged in each of the directions.

7. The encoding device of claim 6, wherein
the input unit receives a plurality of frame image groups which correspond one-to-one to a plurality of viewpoints that are arranged at regular intervals in a two-dimensional matrix on a plane with the standard viewpoint at the center of the matrix, a normal vector being defined to be a vector extending from the standard viewpoint in a direction of a view line,
the first dependent view encoding unit encodes each frame image constituting, among the plurality of frame image groups, first-type frame image groups that respectively correspond to first-type viewpoints that are located farthest from the standard viewpoint in upward, downward, leftward, rightward, and oblique directions, by using, as a reference image, each frame image of a same time of the standard viewpoint, and
the second dependent view encoding unit encodes each frame image constituting, among the plurality of frame image groups, frame image groups each corresponding to one viewpoint, among the plurality of viewpoints, that is neither the standard viewpoint nor the first-type viewpoints and is sandwiched by the standard viewpoint and one of the first-type viewpoints, by using, as reference images, frame images of a same time of the standard viewpoint and the one of the first-type viewpoints.

8. The encoding device of claim 6 further comprising:
a processor, and a memory having stored thereon a program that causes the encoding device to generate a depth map indicating, in units of pixels, depths of the plurality of frame image groups that correspond one-to-one to the plurality of viewpoints.

9. The encoding device of claim 6, wherein
the base view encoding unit encodes the predetermined frame image group, which corresponds to the standard viewpoint, in conformance with a base view defined in MPEG-4 MVC,
the first dependent view encoding unit encodes the first-type frame image group in conformance with a dependent view defined in the MPEG-4 MVC, and
the second dependent view encoding unit encodes the second-type frame image group in conformance with the dependent view defined in the MPEG-4 MVC, and generates a video stream having a syntax that has been extended in conformance with the MPEG-4 MVC to describe information indicating two viewpoints that are referenced when the second-type frame image group is encoded.

10. The encoding device of claim 9 further comprising
a processor, and a memory having stored thereon a program that causes the encoding device to change the standard viewpoint from a viewpoint to another viewpoint among the plurality of viewpoints at predetermined intervals in accordance with a change in contents of frame images of each viewpoint over time.

11. The encoding device of claim 10, wherein
the base view encoding unit, the first dependent view encoding unit, and the second dependent view encoding unit change GOPs (Groups Of Pictures) to which encoded frame images are stored, each time the standard viewpoint changing unit changes the standard viewpoint from a viewpoint to another viewpoint, the GOPs being included in the video stream.

12. The encoding device of claim 6 further comprising:
a multi-view video stream generating unit configured to generate a multi-view video stream by using the base-view video stream, the first-type dependent-view video stream, and the second-type dependent-view video stream;
a stream reference information generating unit configured to generate stream reference information for each of a plurality of video streams, the stream reference information indicating reference relation among the plurality of video streams; and
a stream transmitting unit configured to transmit a transport stream in which the multi-view video stream and the stream reference information are multiplexed.

13. A playback method comprising:
receiving stream data corresponding to a multi-viewpoint video, the stream data generated by multiplexing a plurality of video streams generated by encoding a plurality of frame image groups respectively corresponding to a plurality of viewpoints of the multi-viewpoint video;
taking an image of a user viewing the multi-viewpoint video and detecting a viewpoint position of the user;
selecting, based on the viewpoint position of the user, a decode-target video stream among the plurality of video streams;
decoding the decode-target video stream to acquire a frame image group corresponding to the decode-target video stream;
generating a frame image from the viewpoint position of the user by using the frame image group corresponding to the decode-target video stream;
setting one of the plurality of viewpoints as a standard viewpoint, and generating a base-view video stream by encoding a predetermined frame image group among the plurality of frame image groups, the predetermined frame image group corresponding to the standard viewpoint which, among the plurality of viewpoints, has the smallest value of a difference between distances from a viewpoint to two viewpoints at opposite ends of the straight line, and
setting, as a first-type viewpoint, one of the plurality of viewpoints positioned such that at least one viewpoint is present between the first-type viewpoint and the standard viewpoint, and generating a first-type dependent-view video stream for each of the two viewpoints at opposite ends of the straight line by encoding each frame image constituting, among the plurality of frame image groups, frame image groups that respectively correspond to the two viewpoints at opposite ends of the straight line, by using, as a reference image, a corresponding frame image of the base-view video stream.

14. An encoding method for generating the stream data of claim 13,
wherein said generating a base-view video stream is performed by encoding a frame image group of the standard viewpoint without using, as a reference image, any frame image of a viewpoint other than the standard viewpoint;
wherein the setting of the first-type viewpoint is done such that at least one viewpoint is present between the first-type viewpoint and the standard viewpoint, and the generating of the first-type dependent-view video stream is done by encoding a frame image group of the first-type viewpoint by using, as a reference image, a frame image of the standard viewpoint or a frame image of another first-type viewpoint;

said method further comprising:

setting, as a second-type viewpoint, one of the plurality of viewpoints that is neither the standard viewpoint nor the first-type viewpoint and that is sandwiched between two other viewpoints, and generating a second-type dependent-view video stream by encoding a frame image group of the second-type viewpoint by using, as reference images, frame images of two other viewpoints sandwiching the second-type viewpoint; and multiplexing the base-view video stream, the first-type dependent-view video stream, and the second-type dependent-view video stream.

* * * * *